United States Patent
Sivaraman et al.

(10) Patent No.: US 11,570,070 B2
(45) Date of Patent: Jan. 31, 2023

(54) NETWORK DEVICE CLASSIFICATION APPARATUS AND PROCESS

(71) Applicant: NewSouth Innovations Pty Limited, Sydney (AU)

(72) Inventors: Vijay Sivaraman, Sydney (AU); Hassan Habibi Gharakheili, Sydney (AU); Arunan Sivanathan, Sydney (AU)

(73) Assignee: Newsouth Innovations Pty Limited, Sydney (AU)

( * ) Notice: Subject to any disclaimer, the term of this patent is extended or adjusted under 35 U.S.C. 154(b) by 0 days.

(21) Appl. No.: 17/309,678

(22) PCT Filed: Dec. 13, 2019

(86) PCT No.: PCT/AU2019/051373
§ 371 (c)(1),
(2) Date: Jun. 14, 2021

(87) PCT Pub. No.: WO2020/118376
PCT Pub. Date: Jun. 18, 2020

(65) Prior Publication Data
US 2022/0086071 A1 Mar. 17, 2022

(30) Foreign Application Priority Data
Dec. 14, 2018 (AU) .................. 2018904759

(51) Int. Cl.
*H04L 43/065* (2022.01)
*H04L 43/062* (2022.01)

(52) U.S. Cl.
CPC .......... *H04L 43/065* (2013.01); *H04L 43/062* (2013.01)

(58) Field of Classification Search
CPC .......... H04L 43/00–0894; H04L 43/18; H04L 47/24–2491; H04L 43/065; H04L 43/062;
(Continued)

(56) References Cited

U.S. PATENT DOCUMENTS 9,094,444 B2 7/2015 Baltatu et al.
9,405,813 B1 * 8/2016 Qian .................. G06F 16/254
(Continued)

FOREIGN PATENT DOCUMENTS

WO WO 2005/017813 2/2005

OTHER PUBLICATIONS

Tahaei, Hamid, et al. "The rise of traffic classification in IoT networks: A survey." Journal of Network and Computer Applications 154 (2020): 102538. (Year: 2020).*
(Continued)

*Primary Examiner* — Mohamed A. Wasel
(74) *Attorney, Agent, or Firm* — Knobbe, Martens, Olson & Bear, LLP

(57) ABSTRACT

A network device classification process, including: monitoring network traffic of networked devices in a communications network to generate device behaviour data representing network traffic behaviours of the networked devices at different time granularities; processing the device behaviour data to classify a plurality of the networked devices as IoT devices, and others of the networked devices as non-IoT devices; accessing IoT device type data representing predetermined network traffic characteristics of respective known IoT device types; processing the device behaviour data of the IoT devices and the IoT device type data to classify each of the IoT devices as being a corresponding one of the plurality of known IoT device types; and for each of the IoT devices classified as a corresponding known IoT device type, classifying the IoT device as being in a corresponding
(Continued)

operating state based on network traffic behaviours of the IoT device at different time granularities.

22 Claims, 37 Drawing Sheets

(58) Field of Classification Search
CPC .. H04L 43/045; H04L 43/026; H04L 63/1425
See application file for complete search history.

(56) References Cited

U.S. PATENT DOCUMENTS

| | | | |
|---|---|---|---|
| 9,674,207 | B2 | 6/2017 | Di Pietro et al. |
| 10,623,289 | B1* | 4/2020 | McCorkendale ... H04L 43/0817 |
| 10,721,274 | B1* | 7/2020 | Prasad ................ H04L 9/50 |
| 2007/0063548 | A1 | 3/2007 | Eipper |
| 2008/0201278 | A1 | 8/2008 | Muller |
| 2011/0267964 | A1 | 11/2011 | Baltatu et al. |
| 2016/0028752 | A1 | 1/2016 | Di Pietro et al. |
| 2017/0149937 | A1* | 5/2017 | Ren ..................... H04W 4/70 |
| 2018/0103056 | A1 | 4/2018 | Kohout et al. |
| 2018/0191593 | A1* | 7/2018 | De Knijf ............. G06F 16/20 |
| 2018/0191746 | A1* | 7/2018 | De Knijf ............. H04L 63/102 |
| 2018/0278500 | A1* | 9/2018 | Feamster ............ H04L 63/1425 |
| 2018/0375887 | A1* | 12/2018 | Dezent ............... H04L 63/1458 |
| 2019/0020663 | A1* | 1/2019 | Bartos ................ H04L 67/42 |
| 2019/0089748 | A1* | 3/2019 | Manor ................ H04L 63/205 |
| 2019/0166091 | A1* | 5/2019 | Gupta ................ H04L 61/2571 |
| 2019/0182278 | A1* | 6/2019 | Das .................... H04W 12/121 |
| 2019/0215331 | A1* | 7/2019 | Anakata ............. G06N 20/00 |
| 2019/0222594 | A1* | 7/2019 | Davis, III ........... H04L 41/0816 |
| 2019/0253319 | A1* | 8/2019 | Kampanakis ....... H04L 41/0893 |
| 2019/0362076 | A1* | 11/2019 | Wang ................. G06F 21/44 |
| 2019/0387399 | A1* | 12/2019 | Weinberg ........... H04W 12/128 |
| 2020/0082231 | A1* | 3/2020 | Calo .................. H04W 4/70 |
| 2020/0177590 | A1* | 6/2020 | Levy .................. H04L 63/20 |

OTHER PUBLICATIONS

J. Zhang, C. Chen, Y. Xiang, W. Zhou and A. V. Vasilakos, "An Effective Network Traffic Classification Method with Unknown Flow Detection," in IEEE Transactions on Network and Service Management, vol. 10, No. 2, pp. 133-147, Jun. 2013, doi: 10.1109/TNSM .2013.022713.120250. (Year: 2013).*

L. Bai, L. Yao, S. S. Kanhere, X. Wang and Z. Yang, "Automatic Device Classification from Network Traffic Streams of Internet of Things," 2018 IEEE 43rd Conference on Local Computer Networks (LCN), 2018, pp. 1-9, doi: 10.1109/LCN.2018.8638232. (Year: 2018).*

Meidan, Yair, et al. "ProfilIoT: A machine learning approach for IoT device identification based on network traffic analysis." Proceedings of the symposium on applied computing. 2017. (Year: 2017).*

Bezawada, Bruhadeshwar, et al. "Iotsense: Behavioral fingerprinting of iot devices." arXiv preprint arXiv: 1804.03852 (2018). (Year: 2018).*

Miettinen, Markus, et al. "Iot sentinel: Automated device-type identification for security enforcement in iot." 2017 IEEE 37th International Conference on Distributed Computing Systems (ICDCS). IEEE, 2017. (Year: 2017).*

* cited by examiner (a) Raw output of clustering models.

(b) Refined output after conflict resolution.

(a) Belkin switch.

(b) Triby speaker.

(a) Original model (Dropcam).

(b) Re-trained model (Dropcam).

Figure 41

NETWORK DEVICE CLASSIFICATION APPARATUS AND PROCESS

TECHNICAL FIELD

The present invention relates to a network device classification apparatus and process, and in particular to a process for classifying IoT ("Internet of things") devices.

BACKGROUND

Networked devices continue to become increasingly ubiquitous in a wide variety of settings, including businesses and other organisations, and domestic settings. In particular, the addition of network connectivity to sensors and appliance-type devices generally dedicated to a specific task has created a new class of devices and interconnectivity, generally referred to as forming an 'Internet-of-things', or simply 'IoT'. Thus examples of IoT devices include lightbulbs, doorbells, power switches, weight scales, security cameras, air conditioning equipment, home automation and voice-activated Internet interfaces in the general form of audio speakers (e.g., Google Home and Amazon Echo) and other 'smart' devices, including a wide variety of networked sensors most commonly used to sense environmental parameters such as temperature, humidity, motion, smoke and air quality.

There are now so many such devices available that their management has become challenging, particularly from a security standpoint, for large networks such as those found in large enterprises and university campuses, for example. Such networks may include literally thousands of such devices which largely remain unidentified and may pose significant security risks to the network. Most IoT devices are relatively simple, and cannot defend themselves from cyber attacks. For example, a recent cyber attack on a casino relied upon compromised fish tank sensors, and a recent attack on a university campus network relied upon networked vending machines.

It is desired to provide a network device classification apparatus and process that alleviate one or more difficulties of the prior art, or that at least provide a useful alternative.

SUMMARY

In accordance with some embodiments of the present invention, there is provided a network device classification process, including:
  monitoring network traffic of networked devices in a communications network to generate device behaviour data representing network traffic behaviours of the networked devices at different time granularities;
  processing the device behaviour data to classify a plurality of the networked devices as IoT devices, and others of the networked devices as non-IoT devices;
  accessing IoT device type data representing predetermined network traffic characteristics of respective known IoT device types;
  processing the device behaviour data of the IoT devices and the IoT device type data to classify each of the IoT devices as being a corresponding one of the plurality of known IoT device types; and
  for each of the IoT devices classified as a corresponding known IoT device type, classifying the IoT device as being in a corresponding operating state based on network traffic behaviours of the IoT device at different time granularities.

In some embodiments, the device behaviour data includes network flow attributes generated from packet and byte counts of upstream and downstream flows at different time granularities.

In some embodiments, the processing includes identifying correlations between the generated attributes, selecting a subset of the attributes based on the correlations, and using the selected subset of attributes to classify the networked devices.

In some embodiments, the different time granularities are substantially in the form of a geometric series. In some embodiments, the different time granularities include at least four different time granularities.

In some embodiments, the device behaviour data includes network traffic attributes of the networked devices at a first set of different time granularities, and each IoT device is classified as being in a corresponding operating state based on network flow attributes of the IoT device at a second set of different time granularities different to the first set of different time granularities.

In some embodiments, the second set of different time granularities is a subset of the first set of different time granularities.

In some embodiments, the network device classification process includes generating an alert when a classification of a networked device other than operating state is different to a previous corresponding classification of the networked device.

In some embodiments, the network device classification process includes retraining one or more classifiers used to classify the networked devices to account for changes in network behaviours of the networked devices over time.

In some embodiments, the IoT devices are classified as known IoT device types by a multi-class classifier.

In other embodiments, the IoT devices are classified as known IoT device types by respective one-class classifiers.

In some embodiments, the network device classification process includes generating, for each of the one-class classifiers, a confidence score indicative of the classification confidence of the one-class classifier when classifying an IoT device as belonging to a cluster of the classifier, and in the event that two or more of the one-class classifiers generate respective outputs indicative of the IoT device as being successfully classified by those one-class classifiers, selecting, on the basis of the respective confidence scores, only one of those one-class classifiers to classify the IoT device.

In some embodiments, the confidence score is generated according to:

$$P_{[Ins|M_i(C_j(D_l))]}{}^{test} = P_{[C_j|M_i]}{}^{train} \times P_{[D_l|C_j]}{}^{train}$$

where $P_{[C_j|M_i]}{}^{train}$ is a likelihood of the nearest cluster Cj within the corresponding model Mi, and $P_{[D_l|C_j]}{}^{train}$ is a probability of an annular or circular distance band Dl inside the cluster Ci.

In some embodiments, the network device classification process includes generating consistency scores representing measures of the classification consistencies of the one-class classifiers over time, and labelling an unlabelled IoT device as being a corresponding known IoT device type when the consistency score of the corresponding one-class classifier satisfies a threshold consistency score.

In some embodiments, the network device classification process includes updating the consistency score for each one-class classifier over time to generate an updated value $S_t$ from the previous value $S_{t-1}$, according to:

$$S_t = \frac{S_{t-1} \times e^\lambda}{1 + S_{t-1} \times (e^\lambda - 1)}$$

where $\lambda$ is given by:

$$\lambda = \frac{\log\left(\frac{S^*}{1-S^*}\right)}{T}$$

where T is a time to reach a target score S* (between 0 and 1) from a mid-level score of 0.50.

In some embodiments, the device behaviour data represents network traffic behaviours of each networked device as successive instances of a set of network traffic attributes for each of a plurality of flows of the networked device, the network traffic attributes for each flow being generated from byte counts and packet counts of the flow for different time granularities.

In some embodiments, the network traffic behaviours of each of the networked devices include packet and byte counts of network flows of the device at different time granularities, the network flows being:
  (i) upstream and downstream DNS flows;
  (ii) upstream and downstream NTP flows;
  (iii) downstream SSDP flows;
  (iv) upstream and downstream remote network flows; and
  (v) upstream local network flows.

In accordance with some embodiments of the present invention, there is provided a network device classification apparatus configured to execute the process of any one of the above processes.

In accordance with some embodiments of the present invention, there is provided at least one computer-readable storage medium having stored thereon executable instructions and/or FPGA configuration data that, when the instructions are executed by at least one processor and/or when an FPGA is configured in accordance with the FPGA configuration data, cause the at least one processor and/or the FPGA to execute the device classification process of any one of the above processes.

In accordance with some embodiments of the present invention, there is provided a network device classification apparatus, including:
  a flow metric generator to generate device behaviour data representing network traffic behaviours of networked devices in a communications network at different time granularities;
  a first classifier component to process the device behaviour data to classify a plurality of the networked devices as IoT devices, and others of the networked devices as non-IoT devices;
  a second classifier component to access IoT device type data representing predetermined network traffic characteristics of respective known IoT device types, and to process the device behaviour data of the IoT devices and the IoT device type data to classify each of the IoT devices as being a corresponding one of the plurality of known IoT device types; and
  a third classifier component to classify each of the IoT devices classified as a corresponding known IoT device type as being in a corresponding operating state based on network traffic behaviours of the IoT device at different time granularities.

In some embodiments, the network traffic behaviours of the networked devices include packet and byte counts of upstream and downstream flows at different time granularities.

In some embodiments, the network device classification apparatus includes a component to identify correlations between the behaviours, and select a subset of the behaviours based on the correlations, wherein the classifiers use the selected subset of behaviours to classify the networked devices.

In some embodiments, the different time granularities are substantially in the form of a geometric series.

In some embodiments, the different time granularities include at least four different time granularities.

In some embodiments, the device behaviour data represents network traffic behaviours of the networked devices at a first set of different time granularities, and each IoT device is classified as being in a corresponding operating state based on network traffic behaviours of the IoT device at a second set of different time granularities different to the first set of different time granularities.

In some embodiments, the second set of different time granularities is a subset of the first set of different time granularities.

In some embodiments, the network device classification apparatus includes a device behaviour change detector to detect when a classification of a networked device other than its operating state is different to a previous corresponding classification of the networked device.

In some embodiments, the network device classification apparatus includes retraining one or more of the classifiers to account for changes in network behaviours of the networked devices over time.

In some embodiments, the second classifier component is a multi-class classifier.

In some embodiments, the second classifier component includes a set of one-class classifiers for respective known IoT device types.

In some embodiments, the network device classification apparatus includes one or more confidence score generators configured to generate, for each of the one-class classifiers, a corresponding confidence score indicative of the classification confidence of the one-class classifier when classifying an IoT device as belonging to a cluster of the corresponding model, and in the event that two or more of the one-class classifiers generate respective outputs indicative of the IoT device as being successfully classified by those one-class classifiers, selecting, on the basis of the respective confidence scores, only one of those one-class classifiers to classify the IoT device.

In some embodiments, the confidence score is generated according to:

$$P_{[Ins|M_i(C_j(D_l))]}{}^{test} = P_{[C_j|M_i]}{}^{train} \times P_{[D_l|C_j]}{}^{train}$$

where $P_{[C_j|M_i]}{}^{train}$ is a likelihood of the nearest cluster Cj within the corresponding model Mi, and $P_{[D_l|C_j]}{}^{train}$ is a probability of an annular or circular distance band $D_l$ inside the cluster Ci.

In some embodiments, the network device classification apparatus includes a consistency score generator configured to generate consistency scores representing measures of the classification consistencies of the one-class classifiers over time, wherein an unlabelled IoT device is labelled as a corresponding known IoT device type when the consistency score of the corresponding one-class classifier satisfies a threshold consistency score.

In some embodiments, the consistency score generator is configured to update the consistency score for each one-class classifier over time to generate an updated value $S_t$ from the previous value $S_{t-1}$, according to: $S_t$ from the previous value $S_{t-1}$, according to:

$$S_t = \frac{S_{t-1} \times e^\lambda}{1 + S_{t-1} \times (e^\lambda - 1)}$$

where $\lambda$ is given by:

$$\lambda = \frac{\log\left(\frac{S^*}{1-S^*}\right)}{T}$$

where T is a time to reach a target score S* (between 0 and 1) from a mid-level score of 0.50.

In some embodiments, the device behaviour data represents network traffic behaviours of each networked device as successive instances of a set of network traffic attributes for each of a plurality of flows of the networked device, the network traffic attributes for each flow including byte counts and packet counts of the flow for different time granularities.

In some embodiments, each of the one-class classifiers assigns an instance of the set of network traffic attributes to a cluster In some embodiments, the network traffic behaviours of each of the networked devices include packet and byte counts of network flows of the device at different time granularities, the network flows being:
 (i) upstream and downstream DNS flows;
 (ii) upstream and downstream NTP flows;
 (iii) downstream SSDP flows;
 (iv) upstream and downstream remote network flows; and
 (v) upstream local network flows.

Also described herein is a network device classification process, including:
 monitoring network traffic of networked devices in a communications network to generate device behaviour data representing network traffic behaviours of the networked devices at different time granularities;
 processing the device behaviour data to classify a plurality of the networked devices as IoT devices, and others of the networked devices as non-IoT devices;
 accessing IoT device type data representing predetermined network traffic metrics for respective known IoT device types;
 processing the device behaviour data of the IoT devices and the IoT device type data to classify each of the IoT devices as being a corresponding one of the plurality of known IoT device types; and
 for each of the IoT devices classified as a corresponding known IoT device type, classifying the IoT device as being in a corresponding operating state based on network traffic behaviours of the IoT device at different time granularities.

Also described herein is a network device classification apparatus, including:
 a flow metric generator to generate device behaviour data representing network traffic behaviours of networked devices at different time granularities in a communications network;
 a first classifier component to process the device behaviour data to classify a plurality of the networked devices as IoT devices, and others of the networked devices as non-IoT devices;
 a second classifier component to access IoT device type data representing predetermined network traffic metrics for respective known IoT device types, and to process the device behaviour data of the IoT devices and the IoT device type data to classify each of the IoT devices as being a corresponding one of the plurality of known IoT device types; and
 a third classifier component to classify each of the IoT devices classified as a corresponding known IoT device type as being in a corresponding operating state based on network traffic behaviours of the IoT device at different time granularities.

BRIEF DESCRIPTION OF THE DRAWINGS

Some embodiments of the present invention are hereinafter described, by way of example only, with reference to the accompanying drawings, wherein:

FIG. 10: Amazon Echo (over a period of two minutes); FIG. 11: Belkin switch (over a period of one minute), and FIG. 12: Dropcam (over a period of two minutes);

FIGS. 22 and 23 are matrices illustrating the information gain values of attributes, respectively for: FIG. 22: all attributes, and FIG. 23: a reduced set of attributes;

FIG. 26: Amazon Echo, FIG. 27: Belkin switch, FIG. 28: Dropcam, and FIG. 29: LiFX lightbulb;

FIG. 41 is a screenshot of a Wireshark capture of Triby speaker packets, showing outage of a SIP server use by the Triby speaker device.

DETAILED DESCRIPTION

Embodiments of the present invention include a network device classification process and apparatus that monitor network traffic in a communications network in order to automatically determine network traffic patterns (i.e., behaviour) of the networked devices in that network, and to use those network traffic patterns as fingerprints to automatically identify which of the networked devices are IoT devices and which are not, and for each IoT device, to automatically identify the type of that IoT device (typically including its function, manufacturer, and even model number) and its current operating state (i.e., whether it is currently booting, processing input, or idle). This information is automatically generated, and can be updated periodically (e.g., on a daily basis) in order for network managers to have available a complete list of all of the IoT devices on their networks and their current operating states.

Additionally, any changes in the traffic patterns of an IoT device can be automatically identified quickly, and an alert generated so that a network administrator can be alerted to a potential security risk or malfunctioning device, and can take corrective action where appropriate.

In particular, the described process and apparatus are scalable to large networks, and can be implemented at low-cost using standard and commercially available software defined networking (SDN) hardware, including OpenFlow switches.

Figure 1:
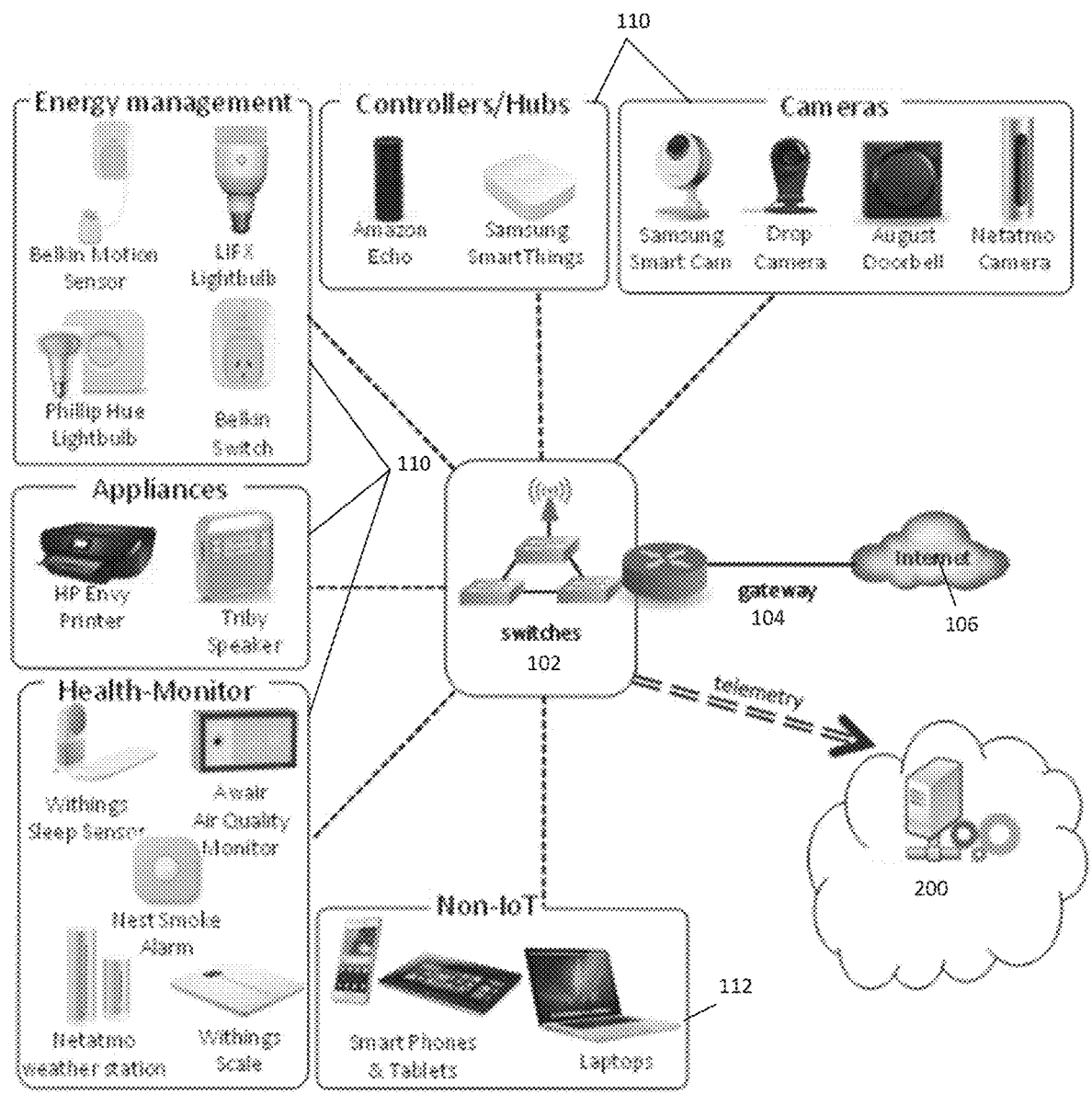
FIG. 1. is a schematic diagram of a communications network including IoT and non-IoT networked devices and a network device classification apparatus in accordance with the described embodiments of the present invention.

As shown in FIG. 1, a communications network includes one or more interconnected network switches 102 and a gateway 104 that provides access to a wide area network 106 such as the Internet. The switches 102 provide wired and wireless access to the network for network devices, including IoT devices 110 and non-IoT devices 112. The non-IoT devices 112 typically include computing devices such as desktop and portable general purpose computers, tablet computers, smart phones and the like.

Figure 2:
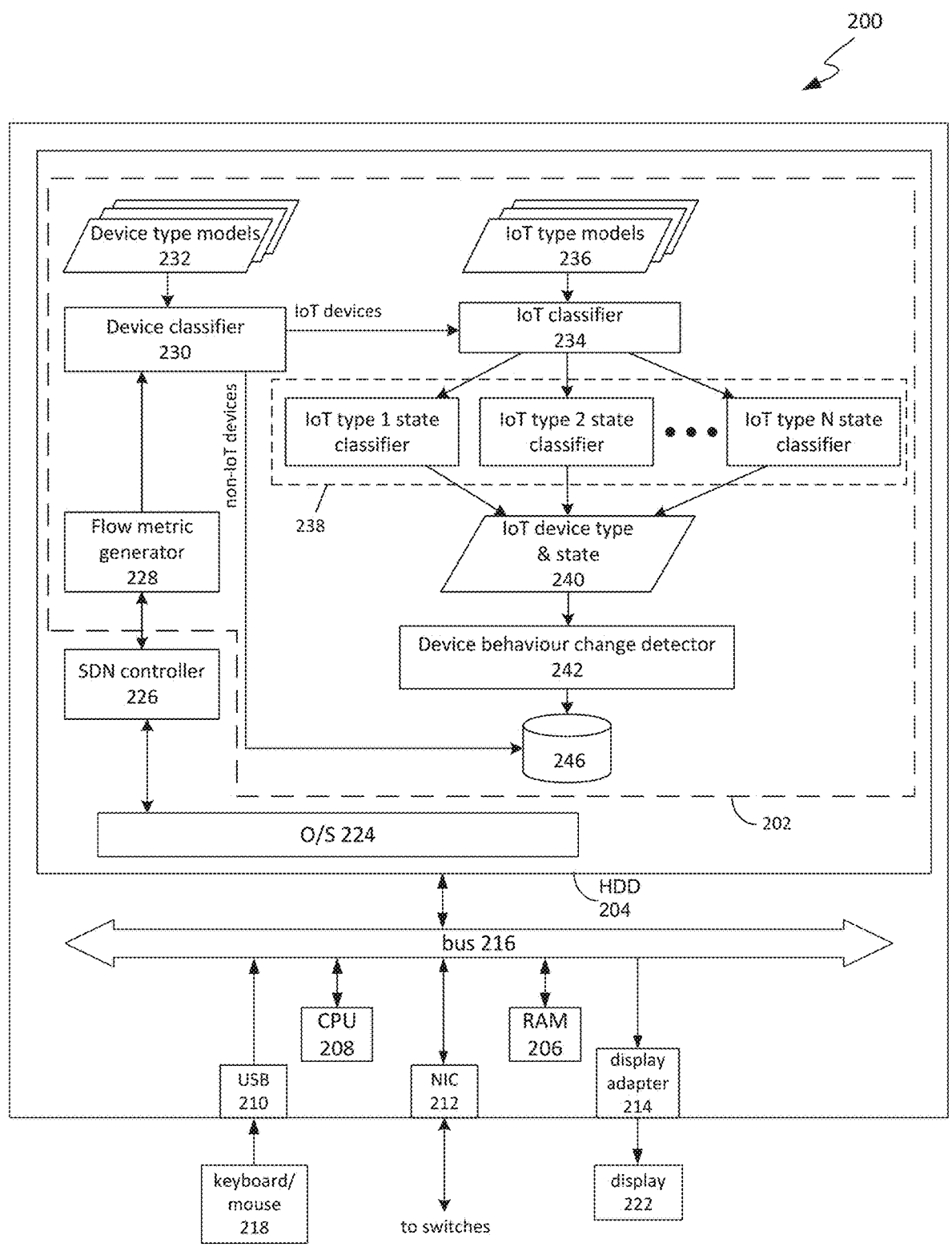
FIG. 2 is a block diagram of the network device classification apparatus of the network shown in FIG. 1, in accordance with the described embodiments of the present invention.
Figure 3:
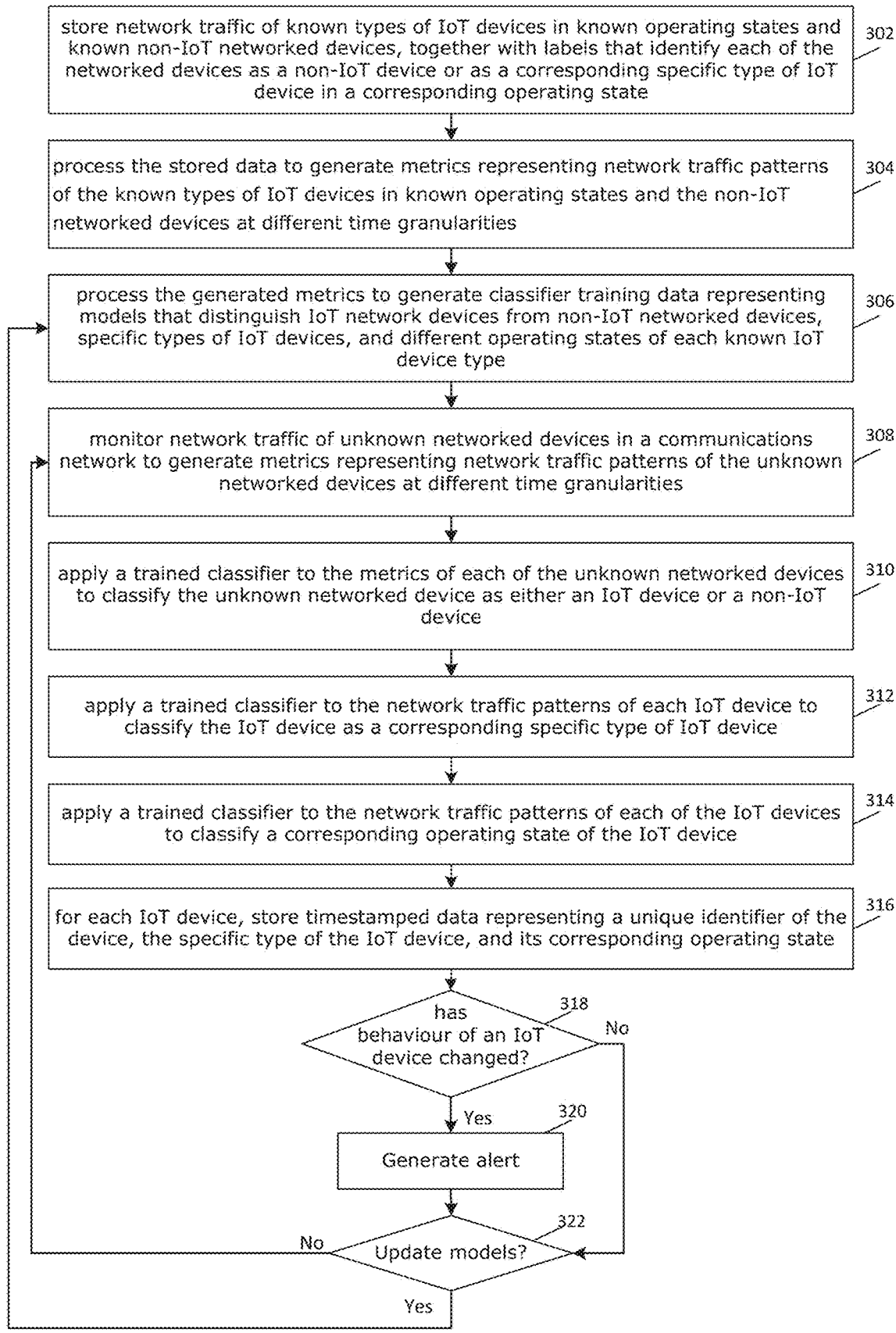
FIG. 3 is a flow diagram of a network device classification process in accordance with the described embodiments of the present invention.

In accordance with the described embodiments of the present invention, the communications network also includes a network device classification apparatus 200, as shown in FIG. 2, that executes a network device classification process 300, as shown in FIG. 3, to automatically identify which of the networked devices are IoT devices and which are not, and for each of the IoT devices 110, to automatically identify the type of that IoT device (e.g., that one IoT device is an LiFX lightbulb IoT device) and its current operating state (e.g., whether it is currently booting, processing input, or idle).

In the described embodiments, the switches 102 are OpenFlow switches under control of an SDN controller. However, it will be apparent to those skilled in the art that other embodiments of the present invention may be implemented using other types of network switches to identify and quantify network traffic flows of networked devices.

As shown in FIG. 2, in the described embodiments the network device classification process 300 is implemented in the form of executable instructions of software components or modules 202 stored on a non-volatile storage medium 204 such as a solid-state memory drive (SSD) or hard disk drive (HDD). However, it will be apparent to those skilled in the art that at least parts of the process 300 can alternatively be implemented in other forms, for example as configuration data of a field-programmable gate arrays (FPGA), and/or as one or more dedicated hardware components, such as application-specific integrated circuits (ASICs), or any combination of these forms.

The network device classification apparatus 200 includes random access memory (RAM) 206, at least one processor 208, and external interfaces 210, 212, 214, all interconnected by at least one bus 216. The external interfaces include a network interface connector (NIC) 212 which connects the apparatus 200 to the network switches 102 network, and may include universal serial bus (USB) interfaces 210, at least one of which may be connected to a keyboard 218 and a pointing device such as a mouse 219, and a display adapter 214, which may be connected to a display device such as a panel display 222.

The network device classification apparatus 200 also includes an operating system 224 such as Linux or Microsoft Windows, and an SDN controller 226 such as the Ryu framework, available from http://osrg.github.io/ryu/. Although the network device classification components 202 and the SDN controller 226 are shown as being hosted on a single operating system 224 and hardware platform, it will be apparent to those skilled in the art that in other embodiments the SDN controller 226 may be hosted on a separate virtual machine or hardware platform with a separate operating system.

As described below, the network device classification process 300 monitors network traffic of networked devices to generate what can be called device behaviour data representing network traffic behaviours of the networked devices at different time granularities. The device behaviour data is then processed to classify some of the networked devices as IoT devices, and others as non-IoT devices. For those classified as IoT devices, the device behaviour data is further processed to classify each of the IoT devices as being an instance of one of a set of known IoT device types. Finally, for those known IoT device types, the device behaviour data is processed yet again to classify the operating state of the IoT device as one of a set of known operating states of that particular device.

Traffic Trace Datasets

Datasets of network traffic traces recorded from a testbed network were used to demonstrate the basis for, and the performance of, the network device classification apparatus and process described herein. The first dataset represents network packets of more than 30 IoT/non-IoT devices collected over a period of 6 months (from 1 Oct. 2016 to 31 Mar. 2017), and the second dataset represents network packets of four IoT devices collected over two days with labels/annotations representing their known operational states, namely boot (i.e., getting connected to the network), active (i.e., interacting with users), and idle (i.e., not being booted or actively used).

In the described embodiments, the MAC address of each device was used as its unique network identifier in order to isolate its traffic from the traffic mix of other devices in the network. However, it will be apparent to those skilled in the art that other identifiers such as IP address (without NAT), physical port number, or VLAN can be used in other embodiments to provide a one-to-one mapping of each traffic trace to its physical device.

The following analysis focuses on 17 IoT devices that were operating in the inventors' laboratory for at least 60 days in the first dataset.

To label or annotate operating states in the training data, the RepetiTouch Pro mobile app (available from https://play.google.com/store/apps/details?id=com.cygery.repetitouch.pro) was used to record and replay touch events on an Android tablet in order to simulate user interactions with three IoT devices via their manufacturer mobile apps. In this example, the three IoT devices were a Belkin switch, a Google Dropcam camera, and an LiFX lightbulb. The user interactions included turning the Belkin switch on and off, streaming video from the camera, and turning the LiFX bulb on and off.

To label or annotate active states of an Amazon Echo, the espeak text-to-speech engine (available from http://espeak.sourceforge.net/) was used to periodically ask questions of the device. Additionally, for boot states, the four IoTs described above were powered-up using a separate TP-Link HS110 smart plug (whose traffic is not considered in the analysis) controlled by an automated script to turn the switch off and on (with sufficient time gap therebetween) to capture the boot state of these four IoT devices.

Traffic Flows

In the described embodiments, the fine-grained visibility provided by an OpenFlow network switch was used to monitor the dynamics of network device activity on a per-flow basis over timescales ranging from 1 minute to 1 hour. Table 1 below shows eight flow-rules specific to each device that were inserted into the packet forwarding table of the OpenFlow switch upon discovery of a device on the network, where <devMAC> represents the MAC address of the device, and <gwMAC> represents the MAC address of the network's Internet gateway. These flow-rules allow the OpenFlow switch to provide telemetry that enables network traffic profiles of the device to be characterised in real-time.

TABLE 1 the flow-rules used to split network traffic of a device into several streams

| Flow description | ETH_src | ETH_dst | IP_src | IP_dst | Port_src | Port_dst | Priority | Action |
|---|---|---|---|---|---|---|---|---|
| DNS query (DNS↑) | <devMAC> | * | * | * | * | 53 | 100 | forward |
| DNS response (DNS↓) | * | <devMAC> | * | * | 53 | * | 100 | forward |
| NTP query (NTP↑) | <devMAC> | * | * | * | * | 123 | 100 | forward |
| NTP response (NTP↓) | * | <devMAC> | * | * | 123 | * | 100 | forward |
| SSDP upstream (SSDP↑) | <devMAC> | * | * | * | * | 1900 | 100 | forward |
| Device to Internet (Int.↑) | <devMAC> | <gwMAC> | * | * | * | * | 10 | forward |
| Internet to device (Int.↓) | <gwMAC> | <devMAC> | * | * | * | * | 10 | forward |
| Device to Local (Loc.↑) | <devMAC> | * | * | * | * | * | 1 | forward |

The priorities of these flow rules splits the traffic three-fold, as follows:

(i) DNS query (upstream), DNS response(downstream), NTP query(upstream), NTP response(downstream), SSDP upstream;

(ii) from IoT to Internet (internet upstream), from Internet to IoT (Internet downstream); and (iii) from IoT to other devices in the local area network (local upstream).

The SSDP downstream and local downstream traffic received by the IoT is ignored in order to eliminate ambiguity with upstream traffic flows of other devices in the same local network.

With these rules in place for each device, the data and packet counters of each individual flow rule is received periodically and accumulated for different time granularities, in this example over the seven time periods of 1, 2, 4, 8, 16, 32 and 64 minutes. In total, 112 attributes (8 flows×2 counters (upstream and downstream)×7 time granularities) are calculated to characterize network devices and their operating states.

PCAP Parsing and Attribute Generation

In order to evaluate the performance of the network device classification process without posing any risk to the live network, the operation of an OpenFlow switch with the described sets of rules installed was simulated by synthesising flow entries and counters from the captured network traces. Specifically, a native PCAP parsing tool was used to process raw PCAP files as input and split the traffic into defined flows in the same manner as an OpenFlow switch, the byte counts and packet counters of each flow entry being calculated for a configurable time interval (e.g., 1 sec or 60 sec).

Then, an attribute vector was generated for each network device by accumulating the values of each counter over different time scales as described above. In order to eliminate nearly identical and redundant attribute vectors during the training, only one vector out of every fifteen vectors was sampled for the classification of IoT devices from non-IoT devices and for the classification of IoT devices into different device types. Conversely, because state identification is sensitive to relatively small variations of traffic, all of the attribute vectors were used to classify operating states of IoT devices.

IoT Vs Non-IoT Characterization

Figure 5:
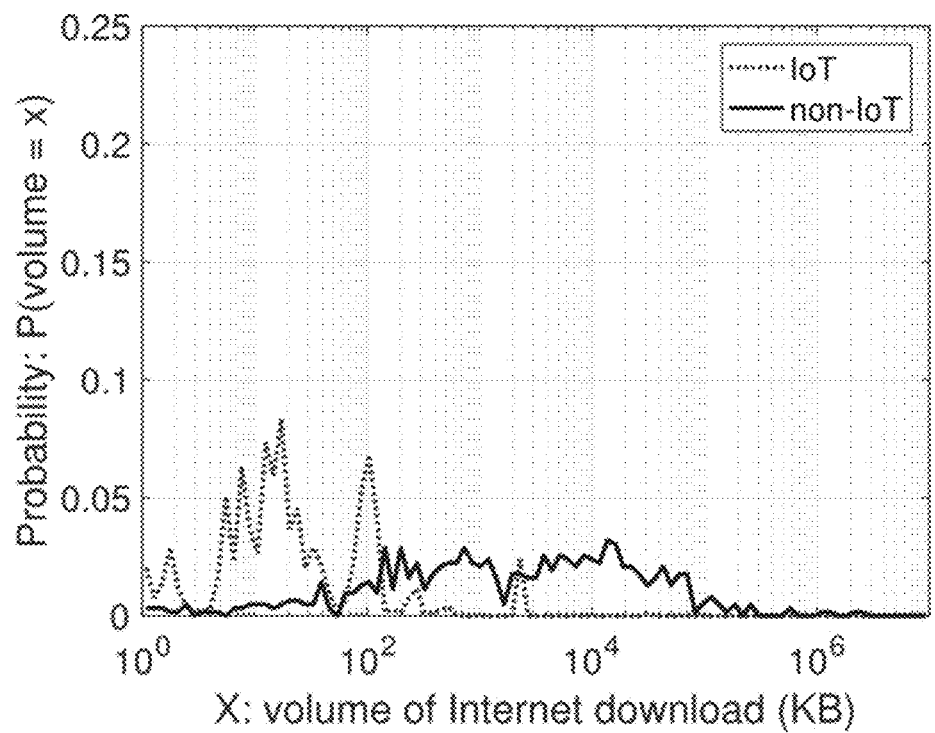
FIG. 5 is a graph showing the probability distributions of the volume of Internet download traffic over a period of 32 minutes for IoT and non-IoT networked devices, respectively.
Figure 6:
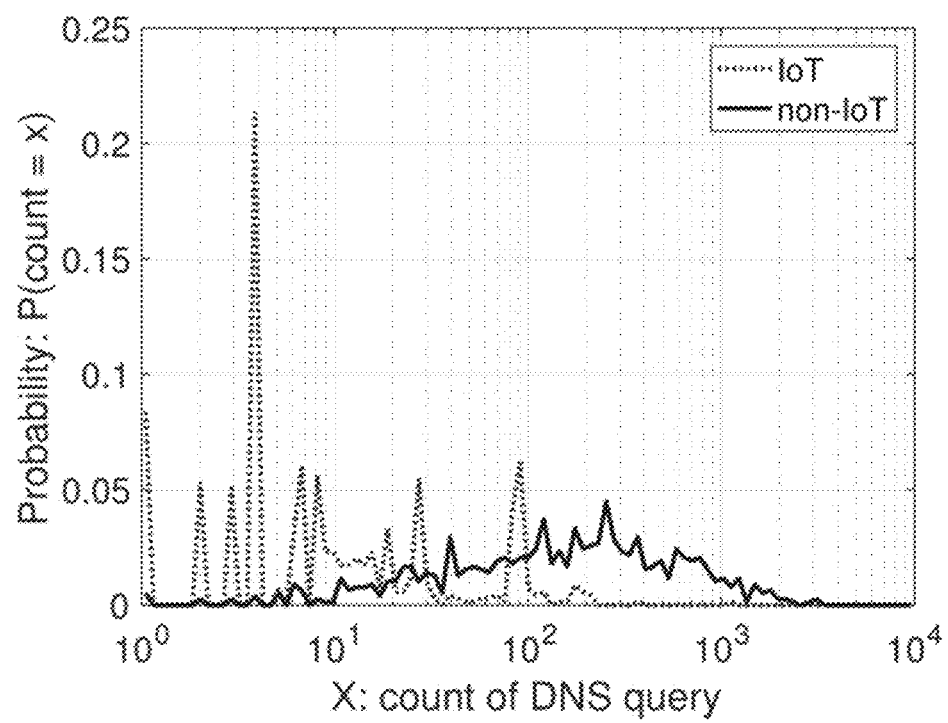
FIG. 6 is a graph showing the probability distributions of the number of DNS queries over a period of 64 minutes for IoT and non-IoT networked devices, respectively.

FIGS. 5 and 6 show the probability distributions of two different network traffic profiles of IoT and non-IoT devices accumulated over time periods of 32 and 64 minutes, respectively. Since the values of those attributes are spread across long ranges, a logarithmic scale is used for the x-axes.

It can be observed from FIG. 5 that the volume of Internet traffic over 32 minute periods was less than r-500 KB for 90% of the IoT devices, whereas only 30% of the non-IoT traffic was less than 500 KB. As shown in FIG. 6, a similar pattern can be seen in the probability distribution of DNS request packet counts as well. Specifically, over a period of 64 minutes, 90% of IoT traffic contains around 83 DNS packets, while 65% of non-IoT traffic is spread from ~100 to ~3100 packets. These characteristics clearly demonstrate that IoT devices tend to generate less network traffic compared to non-IoT devices over a long time period (e.g., 32 min, 64 min).

Device Level Characterization

Figure 7:
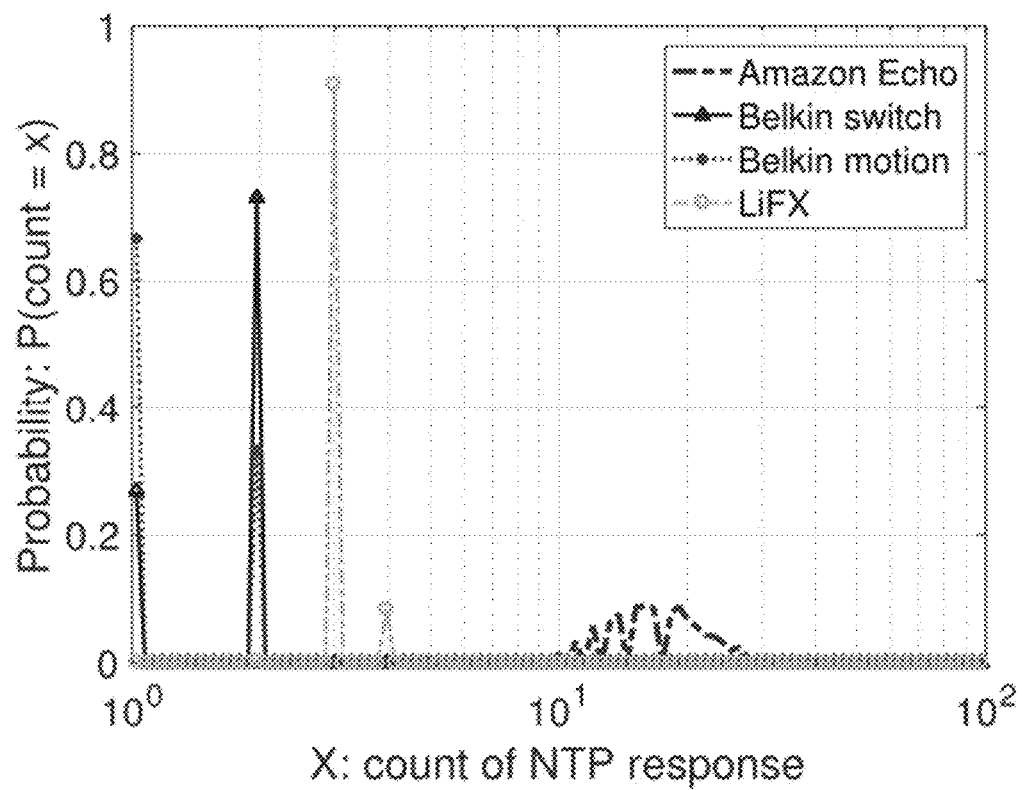
FIGS. 7 to 9 are graphs showing probability distributions for four different IoT devices of respectively: the number of NTP response packets over a period of 16 minutes, the volume of Internet traffic over a period of eight minutes, and the volume of SSDP traffic over a period of eight minutes.
Figure 8:
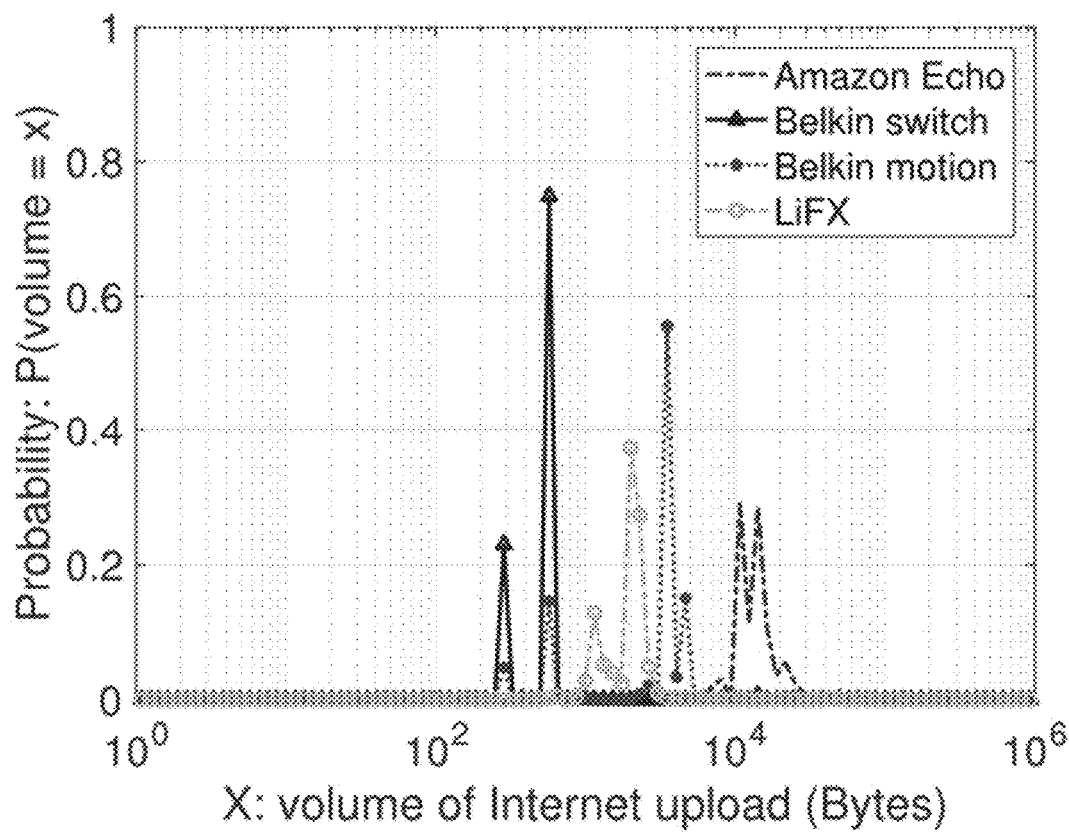
Figure 9:
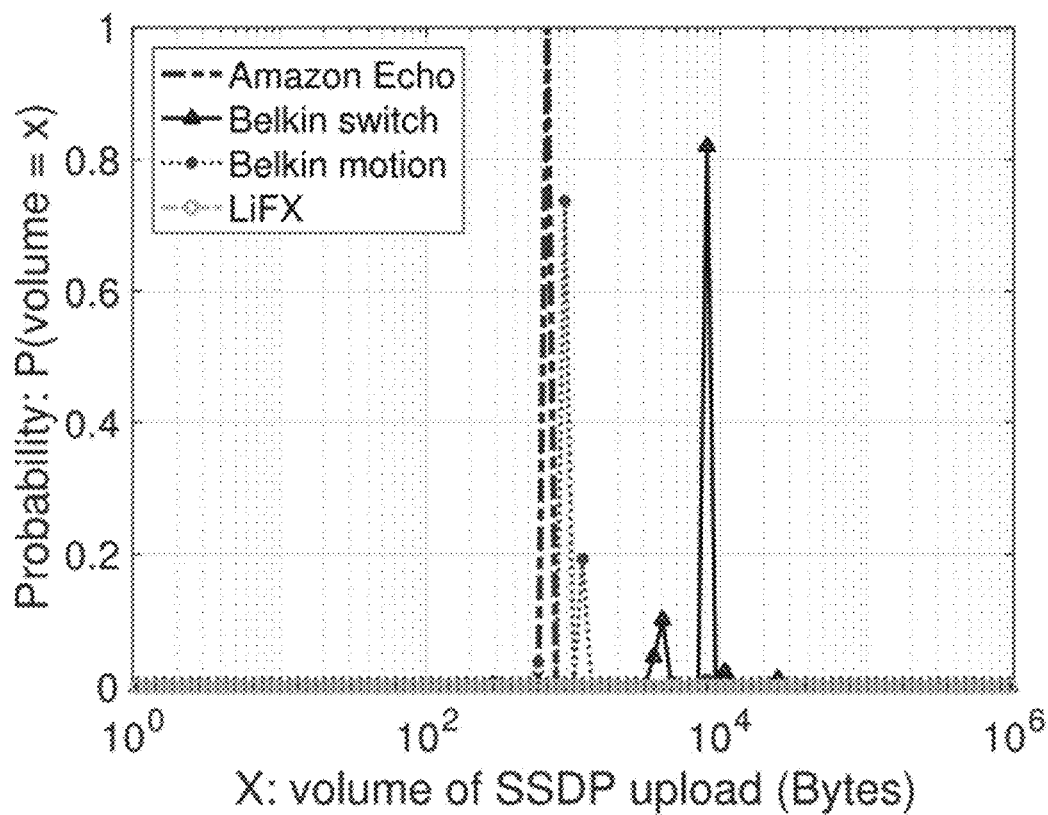

FIGS. 7 to 9 show probability distribution histograms of: (i) NTP request packet count, (ii) Internet upload traffic volume (in bytes), and (iii) SSDP upload traffic volume (in bytes) for accumulation time periods of 16, 8, and 8 minutes, respectively, for four IoT devices selected from the set of 17 IoT devices.

The four selected IoT devices are the Amazon Echo, Belkin switch, Belkin motion sensor and Lifx. Because the Belkin switch and the Belkin motion sensor are from same vendor and share similar behaviours in most attributes, it is challenging to recognize them correctly. It can be seen in FIG. 7 for a traffic accumulation period of 16 minutes that 70% of times the Belkin switch (depicted in solid line with triangle markers) sends around 2 NTP request packets, whereas 33% of the time the Belkin motion sensor (depicted in dotted line with filled-circle markers) sends the same number of packets. In the same graph, LiFX light bulbs has a peak of over 90% at ~3 packets, and the Amazon Echo (dashed line) has a range of NTP request counts, ranging from 7 to 42 packets.

FIG. 8 shows relatively minor overlapping in the distributions of internet upload traffic volumes of the Belkin switch and the Belkin motion sensor for an accumulation period of 8 minutes (with maximum peak values at 285 bytes and 575 bytes, respectively). The major portion of network Internet upload sizes for the LiFx bulb and the Amazon Echo lie in the range of 500-3000 bytes and 7000-33000 bytes, respectively.

However, in contrast to the overlapping distributions described above, and as shown in FIG. 9, the volume of SSDP upload traffic over an 8 minute period shows a clear classifiable distinction between the Belkin switch and the Belkin motion sensor. For the case of the Belkin switch, 82% of the traffic has a size of 8100 bytes, whereas 73% of the Belkin motion sensor uploads are only ~800 bytes using the SSDP protocol. For the sake of completeness, it is noted that the Amazon Echo has a 100% peak at around 650 bytes. The LiFX lightbulb does not use SSDP protocols for device discovery or advertisement purposes.

State Level Characterization

Figure 10:
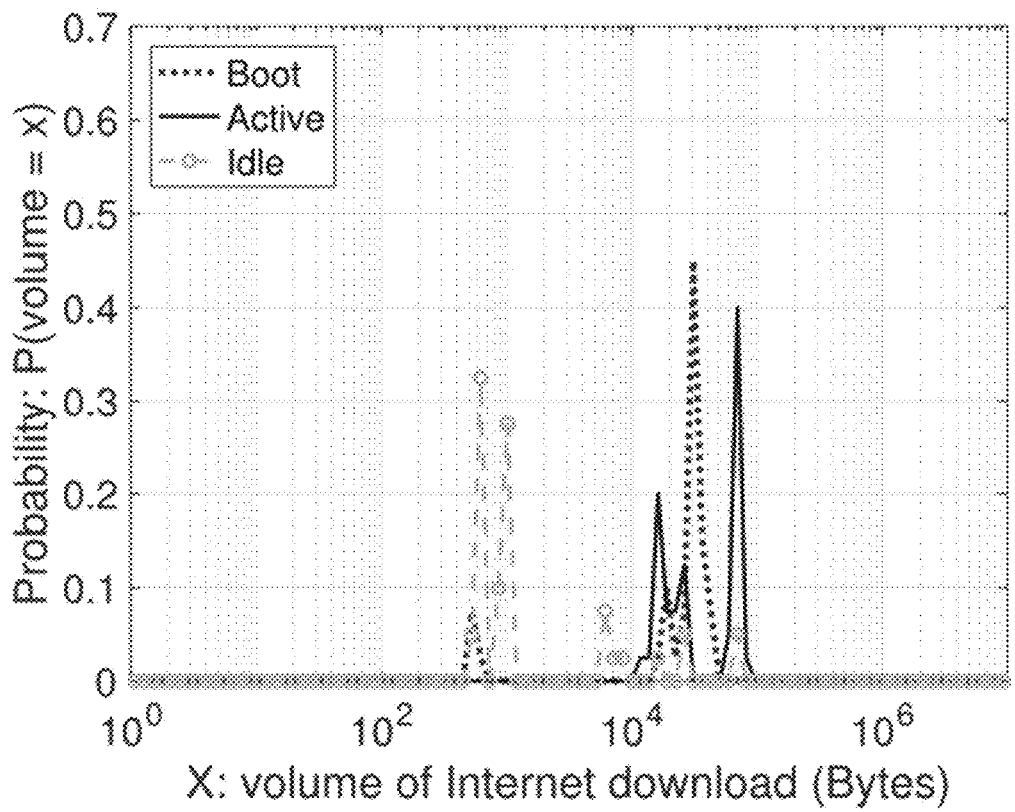
FIGS. 10 to 12 are graphs showing probability distributions of Internet download traffic for different operating states of the following three IoT devices.
Figure 11:
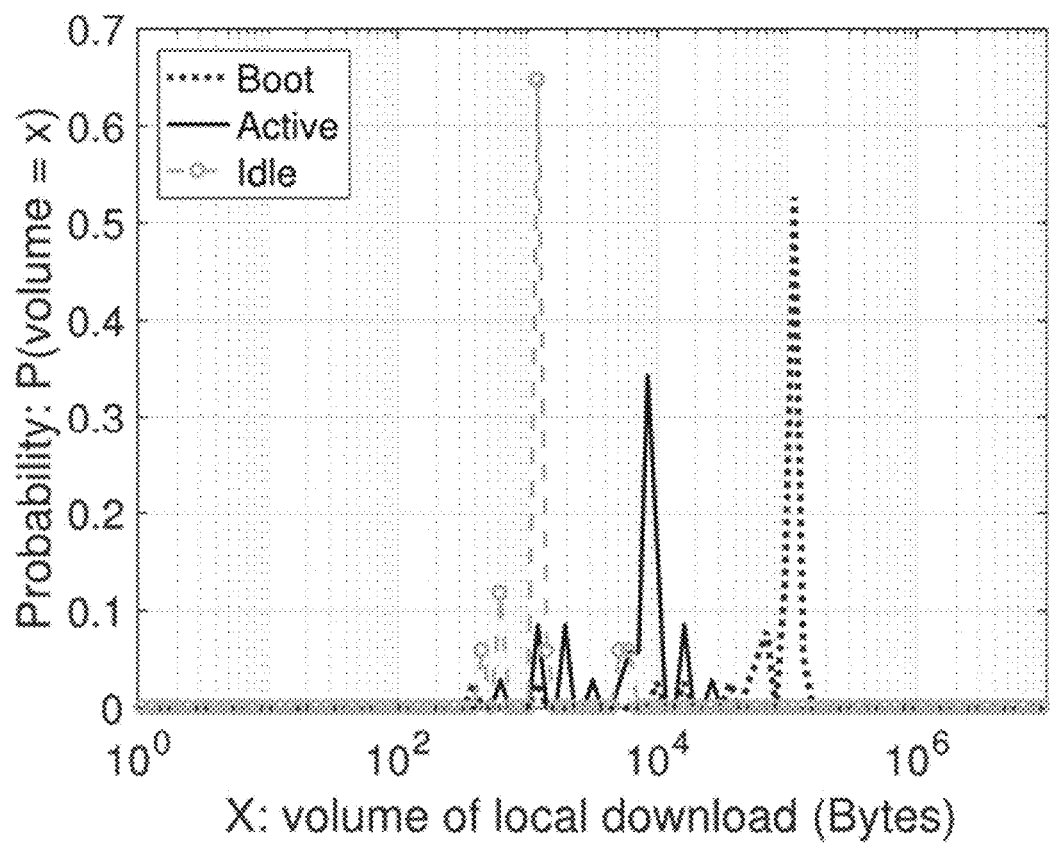
Figure 12:
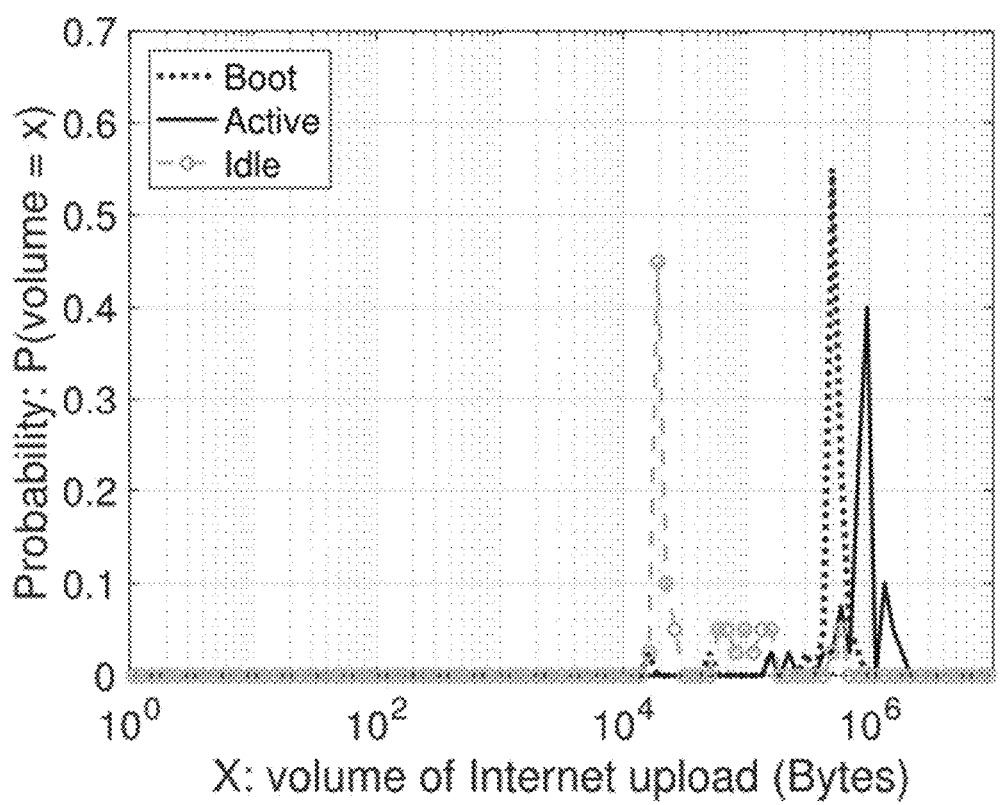

Network traffic attributes of the Amazon Echo, Belkin switch and Dropcam IoT devices in different device operating states (i.e., booting, active and idle) are shown in FIGS. 10 to 12, respectively. The volume of the last two minutes of internet downloads of the Amazon Echo is shown in FIG. 10 because it makes frequent communication with cloud servers. FIG. 11 shows the last 1 minute of local upload traffic of the Belkin switch, since it communicates with a mobile app connected to the local area network. Finally, FIG. 12 shows the last 2 minutes of internet upload traffic of the Dropcam IoT device to show its behavior while it is streaming videos. It is noted that the IoT devices exchange a lower volume of network traffic during the majority of their idle periods compared to the active or booting periods. For example, 75% of Amazon echo idle traffic downloads only 500-1,000 bytes from the internet, whereas 90% of booting traffic and 50% of active periods download 1600-43000 bytes and 60,000-82,000 bytes, respectively. The Belkin switch and dropcam display similar behaviour in this respect.

TABLE 2

Evaluation Matrix of IoT versus non-IoT classification

| IoT/Non-IoT | TP | FN | FP | Precision | Recall | $F_1$ | TP avg. confidence | FN avg. confidence |
|---|---|---|---|---|---|---|---|---|
| IoT | 0.987 | 0.013 | 0.022 | 1.000 | 0.987 | 0.993 | 0.968 | 0.635 |
| Non-IoT | 0.978 | 0.022 | 0.013 | 0.286 | 0.978 | 0.443 | 0.947 | 0.701 |

Multi-Stage Classification

Architecture

The apparatus and process described herein accomplish the following three tasks when a device is connected to a network:

1) detection of IoT devices (as distinguished from non-IoT devices),

2) IoT device type labelling (e.g., whether it is an August Doorbell, or an HP printer, or . . . ), and
3) operating state identification of each IoT device (e.g., Boot/Active/Idle).

However, classifying all three in a single classifier would not be scalable for a large-scale network such as in an enterprise, for example. In particular, when using ensemble decision trees as classifiers, the size of the trees can grow exponentially with the number of devices and their operating states. For instance, to differentiate three states of four devices, the classifier would need to be trained against 12 labels. This would lead to very dense trees, and become very sensitive to network traffic patterns.

Further, definable states of the devices can vary between different kinds of devices. For example, an Awair air quality sensor updates its air quality score to the cloud regularly. Meanwhile, the corresponding mobile app pulls the latest air quality score from the cloud instead of from the device. Thus, user interaction on the mobile app does not directly affect the network traffic of the air quality sensor itself. This makes it impossible to define an active state for the Awair air quality sensor, leaving only the boot and idle states able to be identified. For at least these reasons, a single classifier cannot practically be used to classify a wide variety of network devices in the long run.

Figure 4:
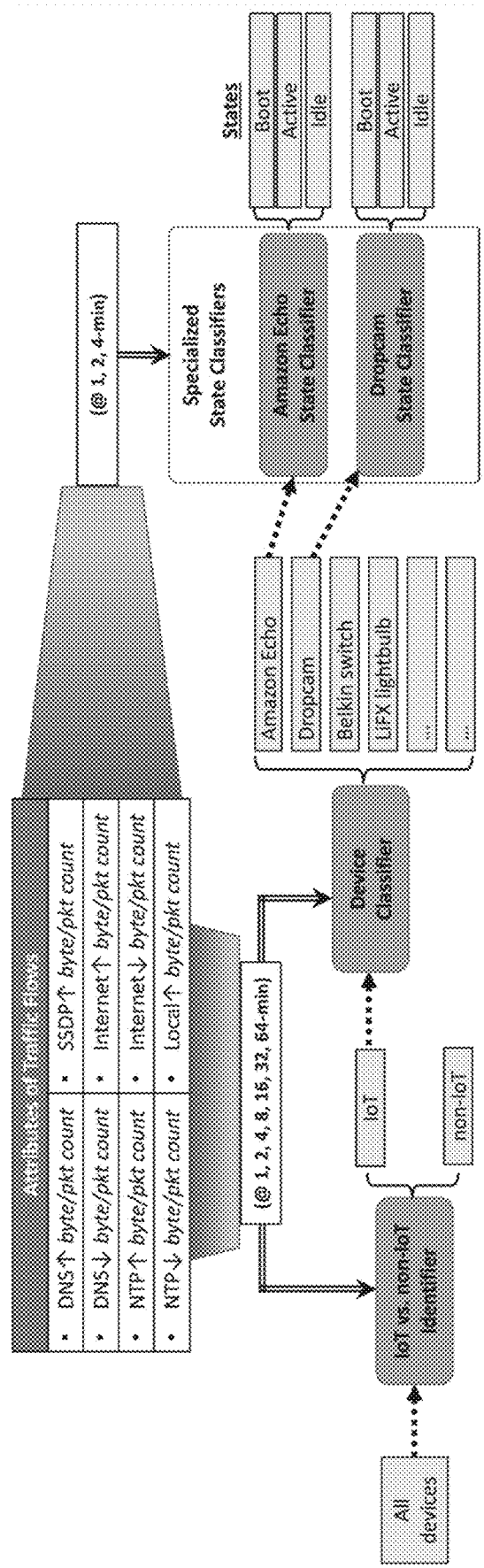
FIG. 4 is a schematic diagram illustrating the hierarchical classification of IoT devices and their operating states in accordance with the network device classification process of FIG. 3.

In order to tackle these problems, the IoT device classification process and apparatus described herein use a hierarchical classification process as shown schematically in FIG. 4. The process includes three layers of the Random-forest based, multi-class classifiers described in L. Breiman, Random Forests, Machine Learning Vol. 45 No. 1, pp 5-32, 2001. Initially, when a device gets connected to the network, a layer-1 classifier uses flow counter values for that device traffic accumulated over all of the available time granularities (in the described embodiment being 1, 2, 4, 8, 16, 32, and 64 minute traffic accumulation periods) to distinguish IoT devices from non-IoT devices.

If a device is classified or 'detected' as an IoT device, then a layer-2 (device classifier) is triggered to label the specific type of the IoT device (e.g., as an August Doorbell, or an HP printer, etc.). Alternatively, if the layer-1 classifier classifies a device as a non-IoT device, then no further classification (i.e., on layer-2 and layer-3) is performed.

Layer-3 includes an individually specialized classifier for each known type of IoT device. After the layer-2 classification confirms the device type, then the dedicated operating state classifier for that device type is invoked to continuously monitor changes in the operating state of the device in real time. State changes such as boot and active occur instantaneously. Thus, unlike the layer-1 and layer-2 classifiers, the state identification classifiers of level 3 do not require long historical network activity patterns. Thus in the described embodiment, the state classifiers process only attributes calculated for the shorter accumulation periods of 1, 2 and 4 minutes. This enables rapid responses to changes in operating state.

The quality of each individual classifier was evaluated using the stored network traces. First, the attribute vectors were converted to labeled instances in order to train the classifiers. Then Weka (available from https://sourceforge.net/projects/weka/) was used as a tool to evaluate the classifiers.

Altogether, network traces were collected for ~115,000 flow instances of IoT and non-IoT devices over the 6 month accumulation period, and ~10,500 instances with operating state annotations from four devices (the Belkin switch, Dropcam, Amazon Echo and Lifx lightbulb devices). The number of instances from each network device varied based on factors such as how long the device was online in the testbed network, and how frequently it communicated with cloud servers or other devices.

It was found that the lowest instance count of 865 was for a Nest smoke sensor, which makes communication only for a short time with its server each day. The highest number of ~12,000 was for the Dropcam device because it makes frequent calls to its server and it was online for 90% of the days of the 6 month accumulation period.

Because the class distribution was uneven, the quality of each classifier was evaluated using several performance metrics, including accuracy, precision, recall, and together with a confusion matrix. These performance matrices were defined based on True Positive(TP), True Negative(TN), False Positive(FP) and False Negative(FN) values, as follows:

$$\text{accuracy} = \frac{TP + TN}{TP + TN + FP + FN} \quad (1)$$

$$\text{precision} = \frac{TP}{TP + FP} \quad (2)$$

$$\text{recall} = \frac{TP}{TP + FN} \quad (3)$$

$$F_1 = 2 \frac{\text{precision} \times \text{recall}}{\text{precision} + \text{recall}} \quad (4)$$

The metric $F_1$ is a harmonic mean of the precision and recall metrics. It provides a better indication of classifier quality in the case of an unbalanced dataset. $F_1$ gets its best value at 1 and its worst at 0.

In addition to the performance matrix, the average confidence levels for correctly classified instances and incorrectly classified instances were determined separately. In an ideal scenario, a classifier would have high confidence (i.e., close to 1) when it correctly classifies instances, and low confidence (i.e., close to 0) when it incorrectly classifies due to inadequate information in the instance or unseen behaviour in the training set.

IoT Versus Non-IoT Classification

In order to evaluate the IoT vs non-IoT classifier, 800 instances (66% of total non-IoT instances) were randomly chosen from non-IoT devices, and 50 instances from each distinct IoT device (i.e., 850 total IoT instances) as a training set.

Figure 13:
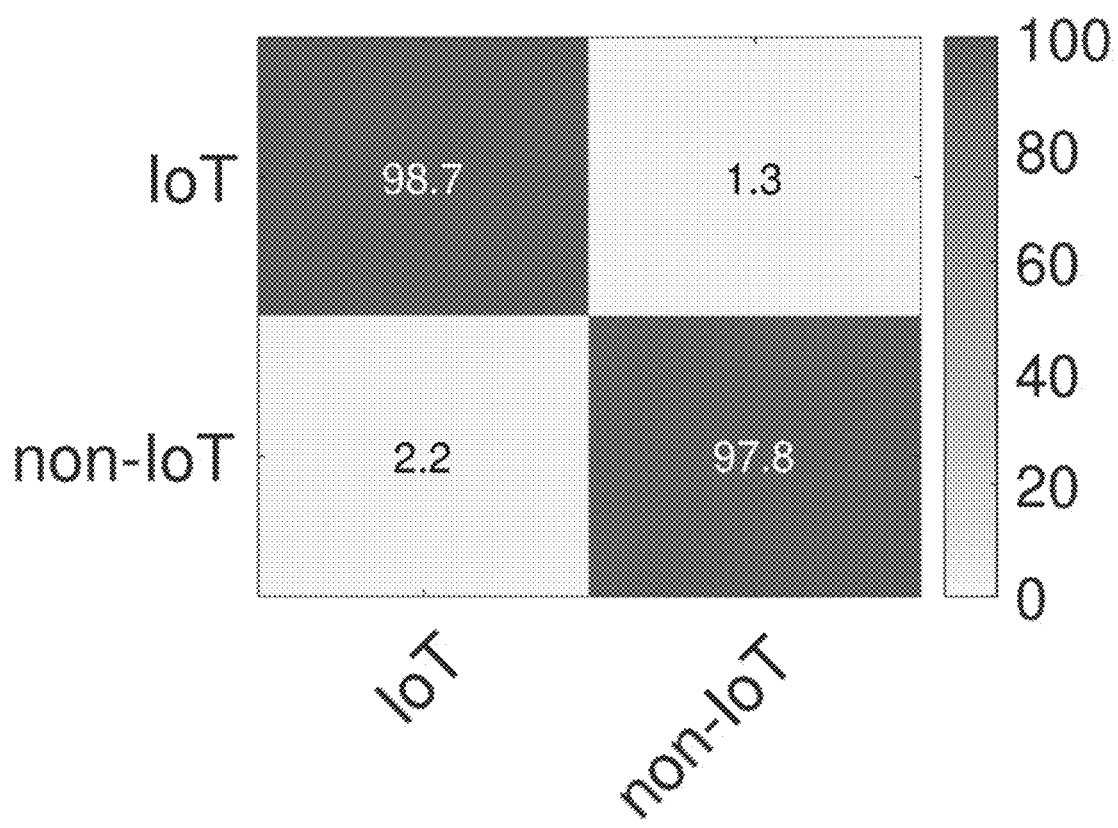
FIG. 13 is a confusion matrix of IoT versus non-IoT identification.

FIG. 13 shows the resulting confusion matrix of IoT vs non-IoT classification. The rows show actual classes (IoT or non-IoT), and the columns show how they were classified by the classifier. The confusion matrix of FIG. 13 and the evaluation matrix of Table 2 above show that IoT and Non-IoT devices were classified with a high True Positive (TP) rate of 98.7% (Average confidence: 0.96), and 97.8% (Average confidence: 0.96), respectively, while the incorrectly classified 1.3% of IoT instances and 2.2% of non-IoT instances show relatively low confidence rates of 0.635 and 0.701. Also, the weighted accuracy, precision, recall and $F_1$ values of this classifier are 98.7%, 0.996, 0.987, and 0.991, respectively.

IoT Device Type Classification

The quality of the IoT device type classifier was also evaluated, including its degradation over time. The training and test instances were not divided randomly as they were for the IoT versus non-IoT classifier evaluation. In order to observe the quality of classifier over time, the first 3 months (i.e: 1 Oct. 2016 to 31 Dec. 2016) of the 6 month accumulation period was used as a training set, and the later part (i.e., 1 Jan. 2017 to 31 Mar. 2017) was used as a testing set.

Figure 14:
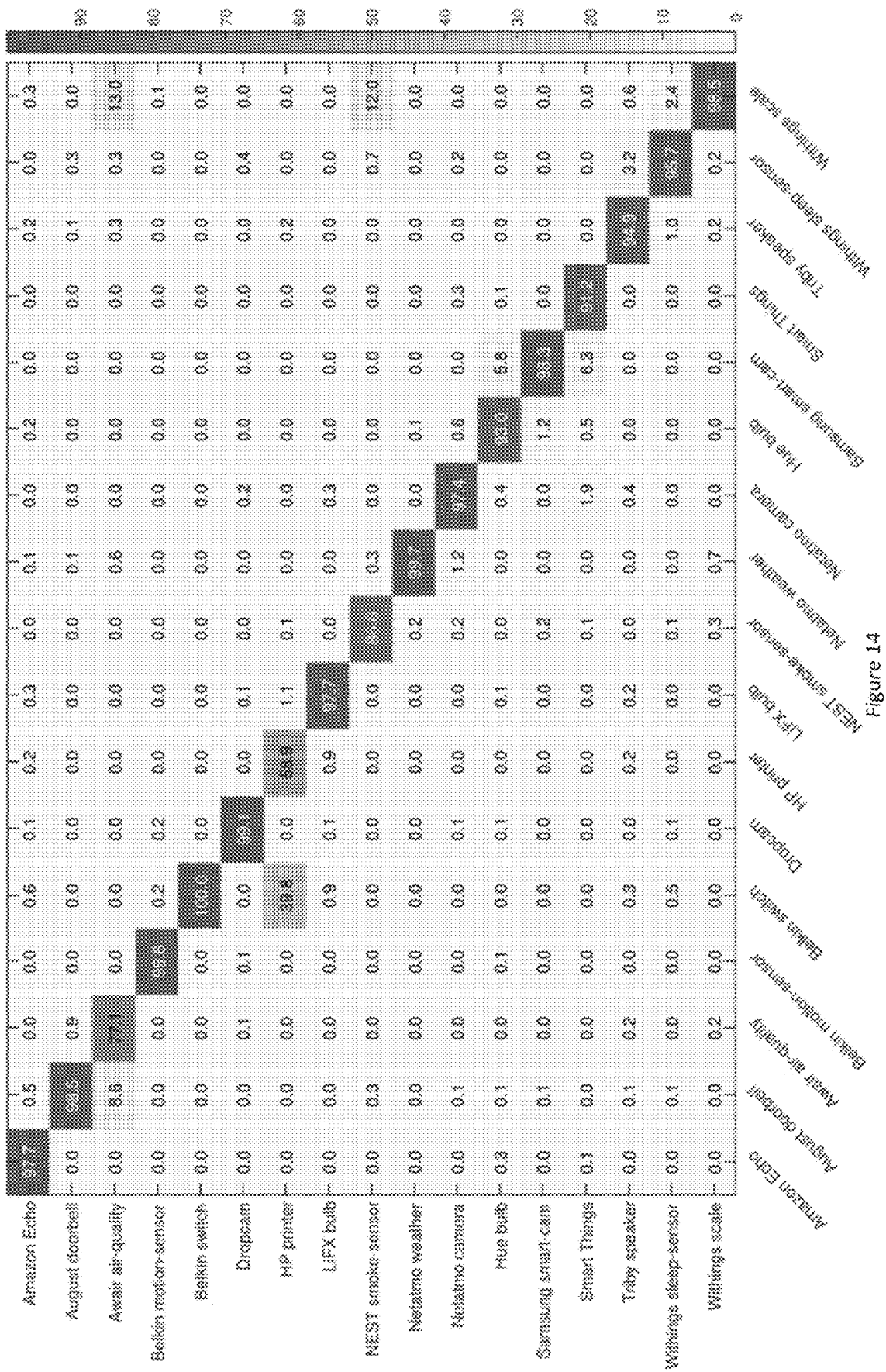
FIG. 14 is a confusion matrix of IoT device classification based on training data collected over an initial three month period.

FIG. 14 and Table 3 below respectively show the confusion matrix and the evaluation matrix of the IoT device type classifier. When inspecting individual classes, it was observed that certain classes showed a high rate of misclassification. For example, 12.0% of the Nest smoke sensor instances were misclassified as a Withings weight scale, and 39.8% of the HP printer instances were misclassified as Belkin switch instances.

Figure 15:
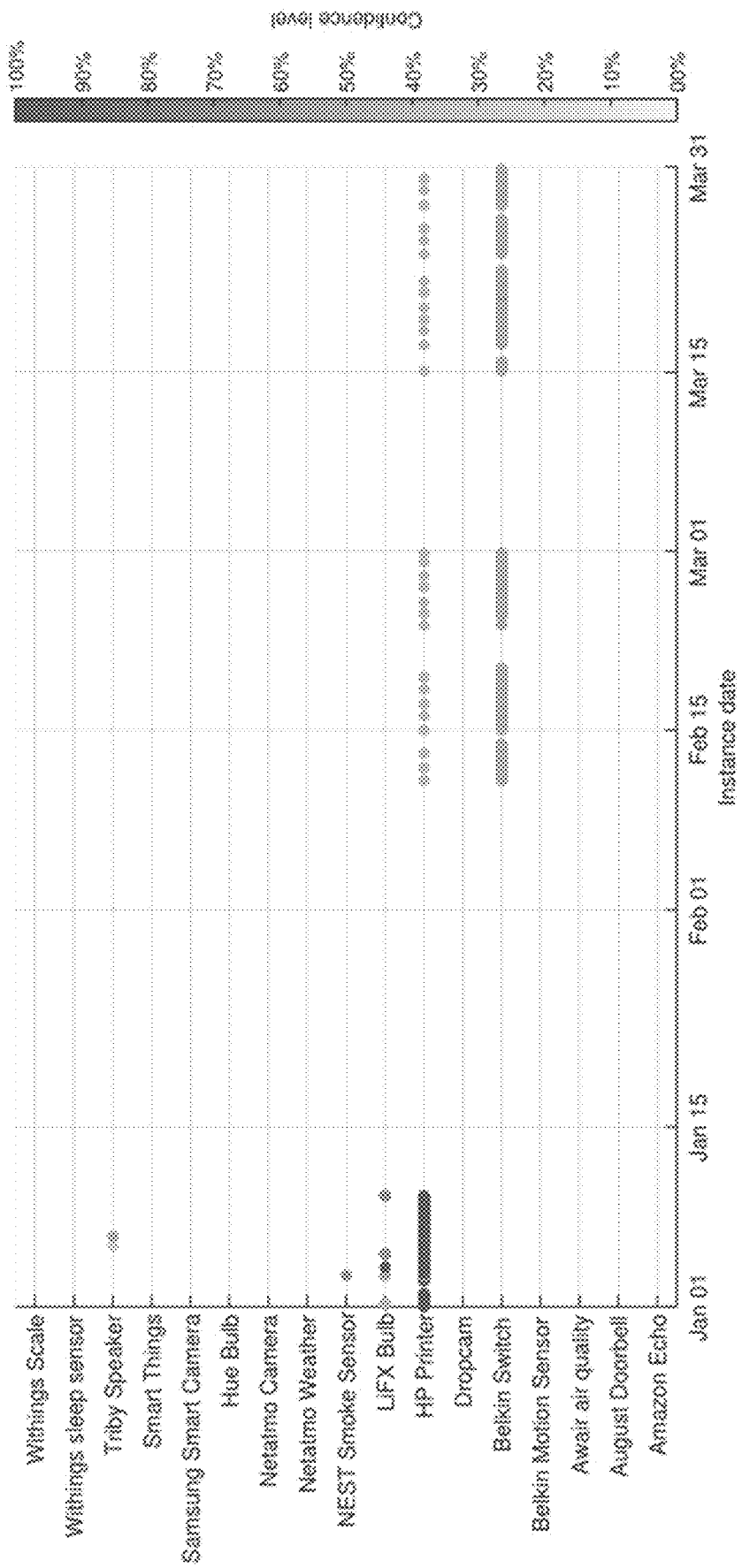
FIGS. 15 and 16 are graphs showing the classification results as a function of time for a Hewlett-Packard printer and a Hue light bulb, respectively.

FIG. 15 shows that instances of the HP printer in the early part of the period (until 9 Jan. 2017) in January were classified correctly with a high confidence level. Then the device is offline for a month, and returns back online on 11 Feb. 2017. However, after this period the HP printer is mostly misclassified as a Belkin switch, but with a low confidence level. Thus the HP printer has changed its behaviour when it came back online again.

TABLE 3

Evaluation Matrix of IoT device classification for an initial 3 month period of network trace accumulation

| IoT/Non-IoT | TP | FN | FP | Precision | Recall | $F_1$ | TP avg. confidence | FN avg. confidence |
|---|---|---|---|---|---|---|---|---|
| Amazon Echo | 0.977 | 0.023 | 0.000 | 0.989 | 0.977 | 0.983 | 0.995 | 0.332 |
| August Doorbell | 0.985 | 0.015 | 0.001 | 0.992 | 0.985 | 0.988 | 0.926 | 0.422 |
| Awair air quality | 0.771 | 0.229 | 0.002 | 0.794 | 0.771 | 0.783 | 0.706 | 0.485 |
| Belkin Motion Sensor | 0.996 | 0.004 | 0.000 | 0.995 | 0.996 | 0.995 | 0.807 | 0.328 |
| Belkin Switch | 1.000 | 0.000 | 0.015 | 0.821 | 1.000 | 0.902 | 0.990 | 0.484 |
| Dropcam | 0.991 | 0.009 | 0.000 | 0.997 | 0.991 | 0.994 | 0.986 | 0.503 |
| HP Printer | 0.589 | 0.411 | 0.001 | 0.975 | 0.589 | 0.734 | 0.961 | 0.535 |
| LiFX Bulb | 0.977 | 0.023 | 0.001 | 0.972 | 0.977 | 0.975 | 0.888 | 0.595 |
| NEST Smoke Sensor | 0.866 | 0.134 | 0.001 | 0.893 | 0.866 | 0.879 | 0.854 | 0.389 |
| Netatmo Weather | 0.997 | 0.003 | 0.002 | 0.986 | 0.997 | 0.992 | 0.943 | 0.810 |
| Netatmo Camera | 0.974 | 0.026 | 0.002 | 0.984 | 0.974 | 0.979 | 0.979 | 0.351 |
| Hue Bulb | 0.930 | 0.070 | 0.002 | 0.978 | 0.930 | 0.954 | 0.572 | 0.419 |
| Samsung Smart Camera | 0.983 | 0.017 | 0.008 | 0.908 | 0.983 | 0.944 | 0.987 | 0.532 |
| Smart Things | 0.912 | 0.088 | 0.000 | 0.987 | 0.912 | 0.948 | 0.983 | 0.387 |
| Triby Speaker | 0.949 | 0.051 | 0.001 | 0.979 | 0.949 | 0.964 | 0.791 | 0.429 |
| Withings sleep sensor | 0.957 | 0.043 | 0.003 | 0.957 | 0.957 | 0.957 | 0.901 | 0.479 |
| Withings Scale | 0.985 | 0.015 | 0.004 | 0.791 | 0.985 | 0.877 | 0.884 | 0.525 |

Similarly, only 77.1% of Awair air quality sensor test instances were correctly classified, and the remaining 8.6% and 13.0% were misclassified as instances of the August doorbell and the Withings scale, respectively. However, the incorrectly classified instances of these three devices had low average confidence levels (Awair air quality sensor: 0.485, HP printer: 0.535, and Nest sensor: 0.389).

94.0% of the instances of the Hue light bulb were classified correctly, but with a low average confidence level for most of them, indicating that they cannot be treated as correctly classified instances.

Figure 16:
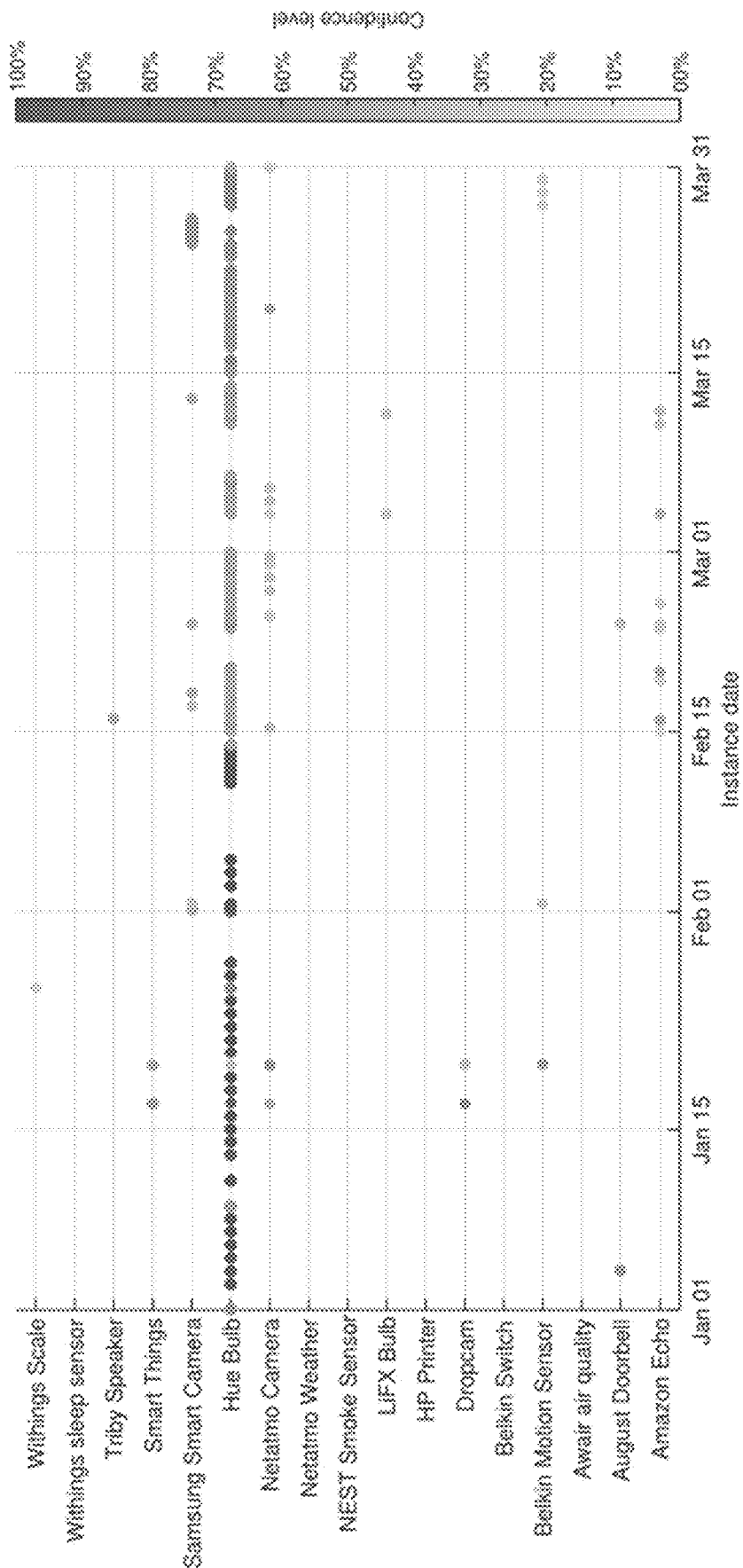

The reasons for these misclassifications were investigated by analysing the classifier output along the time domain. FIGS. 15 and 16 respectively show the classified labels of "HP printer" and "Hue light bulb" over time, from 1 Jan. 2017 to 31 Mar. 2017. The colour of the dots represents the confidence level of the classifier for each instance, with a colour close to green depicting high confidence, and close to yellow depicting low confidence.

FIG. 16 shows the classifier output for the Hue light bulb over the same period.

Although most of the instances are classified correctly during the entire testing period, the average confidence level drops from 0.93 to 0.50 on 15 Feb. 2017.

Figure 17:
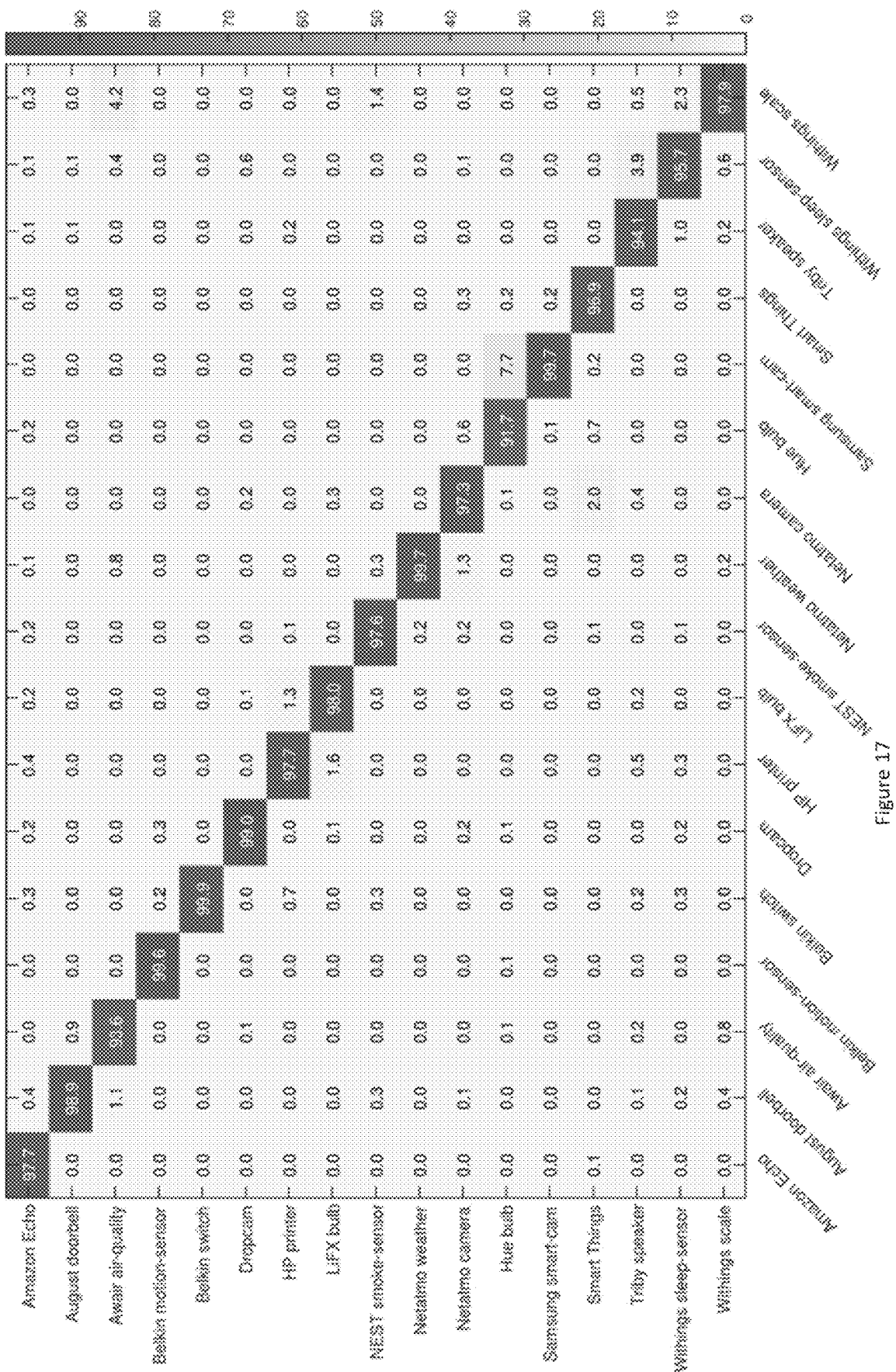
FIG. 17 is a confusion matrix of IoT device classification based on training data collected over the initial three month period (compare FIG. 14) and an additional two-week period.
Figure 18:
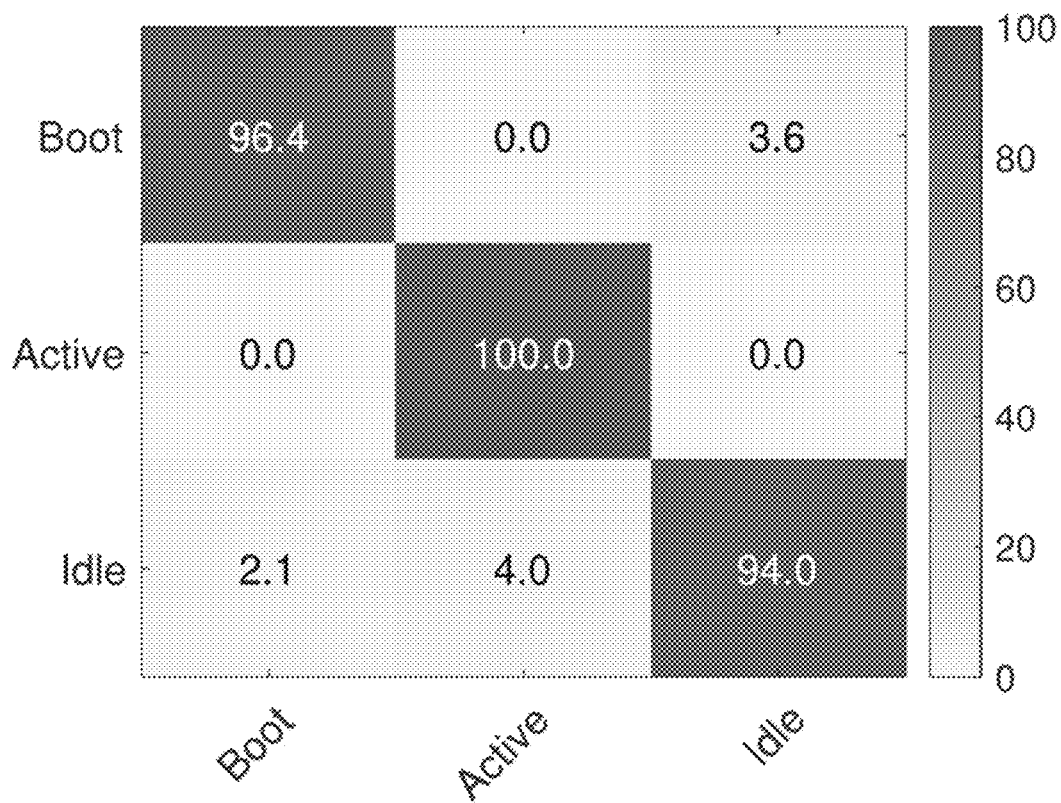
FIGS. 18 to 21 are confusion matrices of operating states for the following IoT devices, respectively: Amazon Echo, Belkin switch, Dropcam, and LiFX lightbulb.
Figure 19:
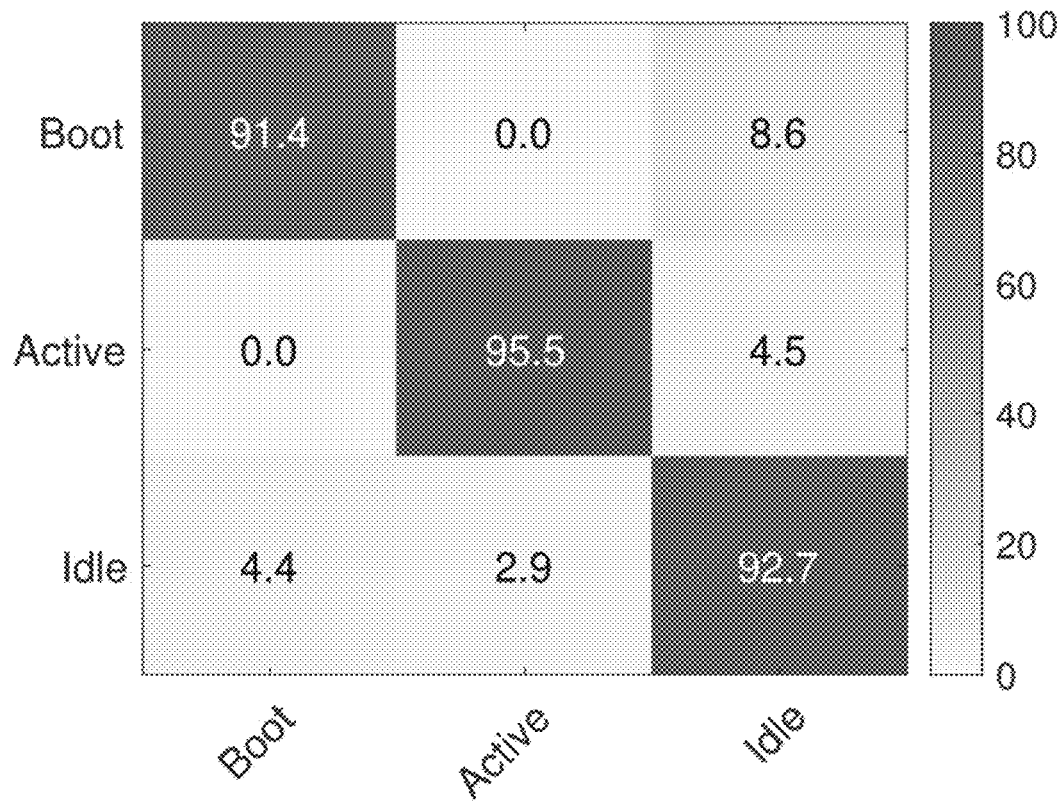
Figure 20:
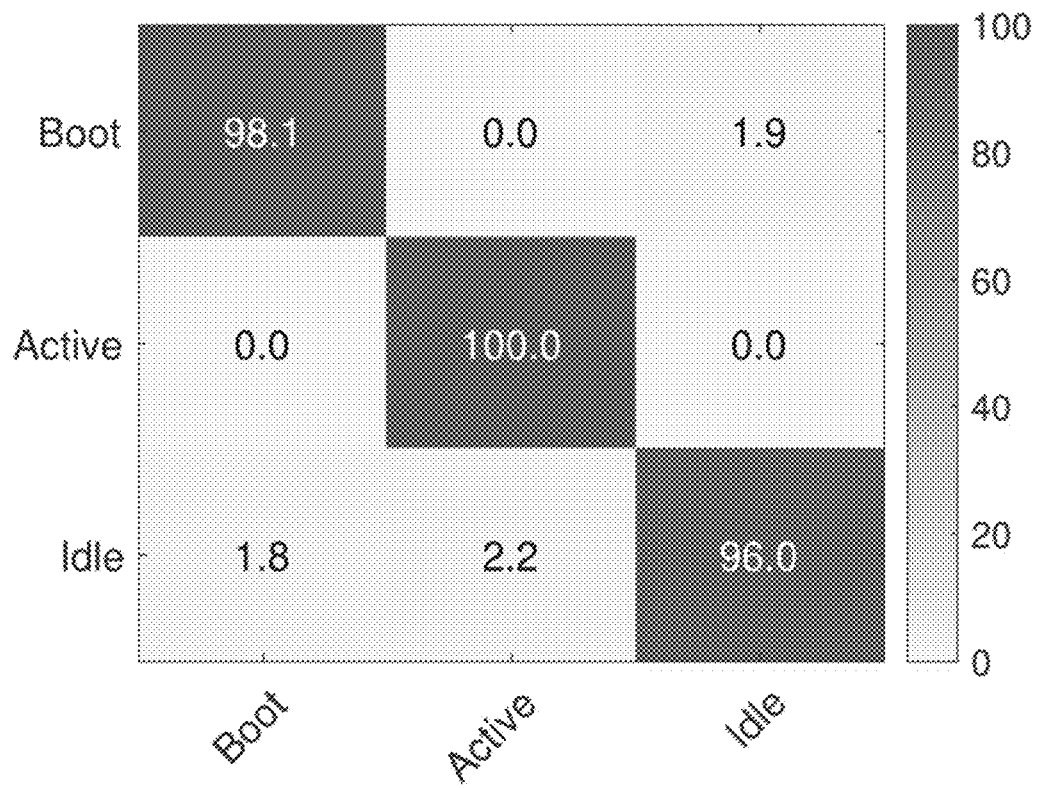
Figure 21:
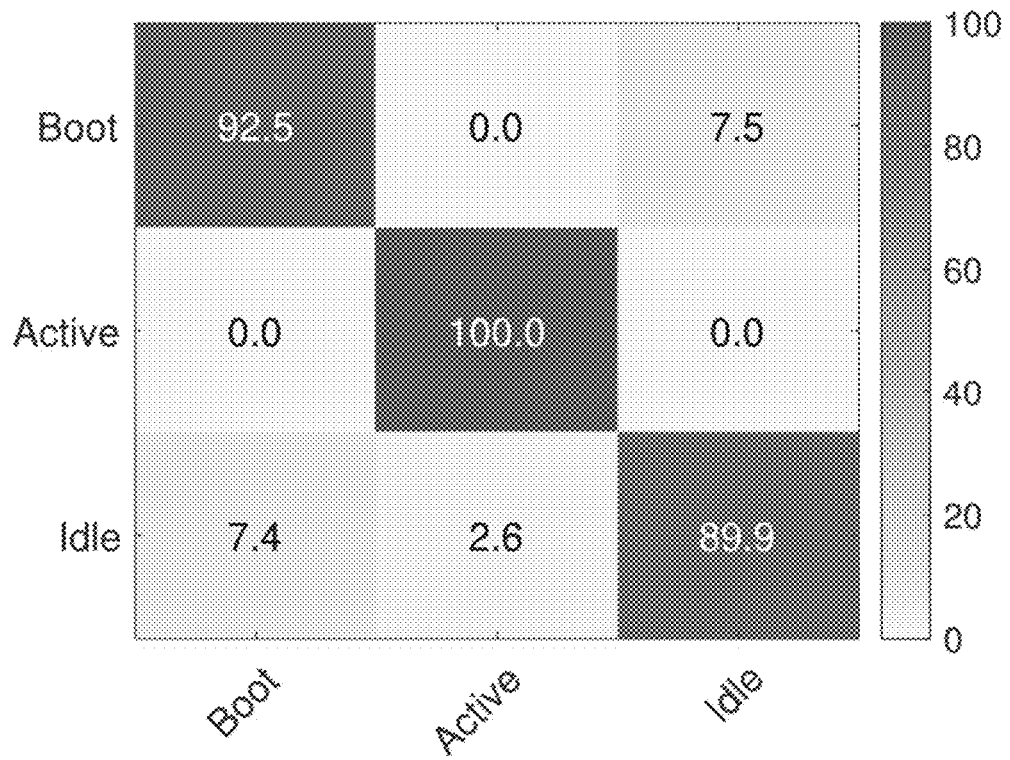

A similar kind of partial or full behavioural change was seen for other devices which were classified incorrectly early in the training set followed by behavioural change. To investigate this further, another two weeks (for the period from 12 Feb. 2017 to 25 Feb. 2017) of data was added to the previous training set to augment the behavioural changes in the training set. FIG. 17 shows the confusion map of the classifier trained with the new set of training data. It is observed that, with the new training set, the confusion matrix is almost diagonal, and all classes have gained accuracy to more than 90%.

Table 4 below shows that the confusion level is also boosted for several classes after retraining with the new dataset (e.g., the TP average confidence level of the Hue-Light bulb: 0.975). The overall weighted average accuracy, precision, recall, and F1-score are respectively 97.8%, 97.9%, 97.8%, and 97.8%.

TABLE 4

Evaluation Matrix of IoT device classification for network trace accumulation over the initial 3 month period and an additional two week period

| IoT/Non-IoT | TP | FN | FP | Precision | Recall | $F_1$ | TP avg. confidence | FN avg. confidence |
|---|---|---|---|---|---|---|---|---|
| Amazon Echo | 0.977 | 0.023 | 0.000 | 0.997 | 0.977 | 0.987 | 0.994 | 0.430 |
| August Doorbell | 0.989 | 0.011 | 0.001 | 0.996 | 0.989 | 0.992 | 0.974 | 0.509 |
| Awair air quality | 0.936 | 0.064 | 0.002 | 0.810 | 0.936 | 0.869 | 0.850 | 0.616 |
| Belkin Motion Sensor | 0.996 | 0.004 | 0.000 | 0.997 | 0.996 | 0.997 | 0.825 | 0.340 |
| Belkin Switch | 0.999 | 0.001 | 0.001 | 0.990 | 0.999 | 0.995 | 0.990 | 0.604 |

TABLE 4-continued

Evaluation Matrix of IoT device classification for network trace accumulation over the initial 3 month period and an additional two week period

| IoT/Non-IoT | TP | FN | FP | Precision | Recall | $F_1$ | TP avg. confidence | FN avg. confidence |
|---|---|---|---|---|---|---|---|---|
| Dropcam | 0.990 | 0.010 | 0.001 | 0.995 | 0.990 | 0.992 | 0.987 | 0.462 |
| HP Printer | 0.977 | 0.023 | 0.001 | 0.965 | 0.977 | 0.971 | 0.985 | 0.591 |
| LiFX Bulb | 0.980 | 0.020 | 0.001 | 0.976 | 0.980 | 0.978 | 0.892 | 0.617 |
| NEST Smoke Sensor | 0.976 | 0.024 | 0.001 | 0.925 | 0.976 | 0.949 | 0.818 | 0.472 |
| Netatmo Weather | 0.997 | 0.003 | 0.002 | 0.987 | 0.997 | 0.992 | 0.935 | 0.824 |
| Netatmo Camera | 0.973 | 0.027 | 0.001 | 0.988 | 0.973 | 0.980 | 0.980 | 0.371 |
| Hue Bulb | 0.917 | 0.083 | 0.001 | 0.984 | 0.917 | 0.949 | 0.975 | 0.505 |
| Samsung Smart Camera | 0.997 | 0.003 | 0.006 | 0.915 | 0.997 | 0.955 | 0.989 | 0.367 |
| Smart Things | 0.969 | 0.031 | 0.001 | 0.985 | 0.969 | 0.977 | 0.980 | 0.437 |
| Triby Speaker | 0.941 | 0.059 | 0.001 | 0.981 | 0.941 | 0.961 | 0.785 | 0.452 |
| Withings sleep sensor | 0.957 | 0.043 | 0.004 | 0.952 | 0.957 | 0.955 | 0.968 | 0.504 |
| Withings Scale | 0.979 | 0.021 | 0.003 | 0.852 | 0.979 | 0.911 | 0.953 | 0.560 |

Operating State Classification

For operating state classification, boot, active and idle instances were collected from four IoT devices, namely an Amazon Echo (boot: 208 instances, active: 74, idle: 1795), a Belkin Wemo (boot: 110, active: 84, idle: 2688), a Dropcam (boot: 145, active: 98, idle: 2639) and an LiFX lightbulb (boot: 160, active: 84, idle: 2338). The instances of each device state were separated to build individual classifiers for the three states of each device. 40 instances of each state were used for training, leaving the other instances for testing purposes.

FIGS. 18 to 21 show the confusion maps of the state classifiers for the four devices, respectively. These confusion maps demonstrate that the active states of these devices are classified with high accuracy (e.g., Amazon Echo: 100%, Belkin switch: 95.5%, Dropcam: 100%, LiFX: 100%) compared to their idle and boot states. Some boot state instances were misclassified as idle state instances, and vice versa (e.g., 8.6% of boot instances of the Belkin switch were misclassified as idle states, and 7.5% of boot instances of the LiFx were misclassified as idle states). The inventors speculate that the reason for these misclassifications might be that some of the boot state annotations are incorrect.

Operational Considerations

The performance of the classifiers has been described above with respect to all of the attributes calculated from traffic flows. However, high impact attributes are described below, including ways to achieve the same performance level with a reduced set of attributes and at reduced cost.

Cost Optimization

Information Gain

"Information Gain" (IG) refers to a measure of the partitioning ability of individual attributes to all classes. In other words, the attribute that can distinguish the classes better than all other attributes will have the highest IG value of all attributes. The IG values for all attributes were calculated individually for each classifier. The total number of attributes for the IoT classifier and the device type classifier was 112, and for the state classifiers, 48.

Figure 22:
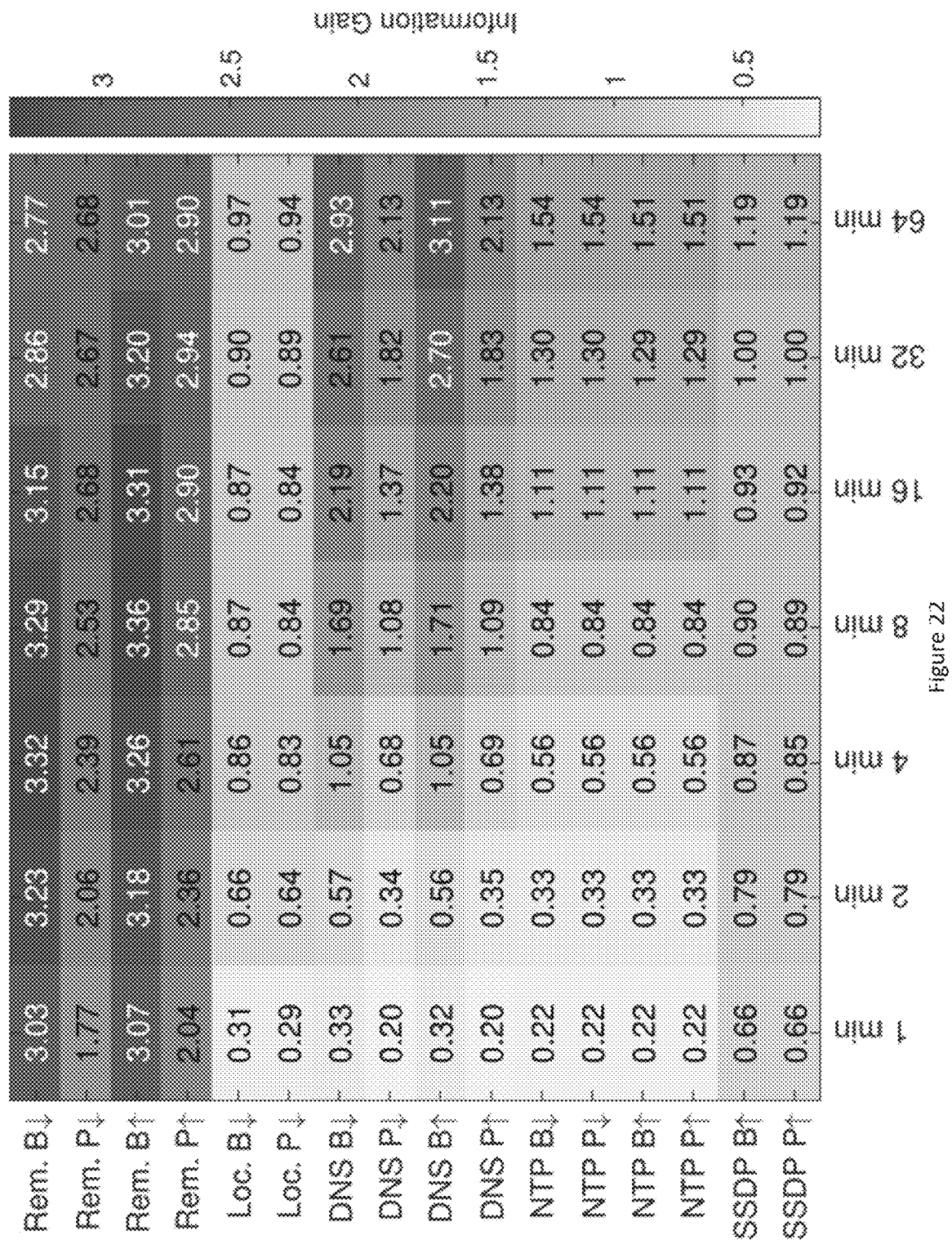

FIG. 22 shows the IG value matrix of all attributes for the device type classifier. The matrix compares the traffic flow counters (represented by rows) against time granularity (represented by columns). It is observed that the highest IG value of 3.36 is for the attribute "Int. BT" (representing "upstream byte count to the internet") for 8 min), followed by "Int. BL" ("downstream byte count from the internet") for 4 mins', with an IG value of 3.32. It is also noted that the attributes generated from the byte counters of the top four attributes representing bytes and packet counts for "downstream from internet" and "upstream to internet" for the mid-range time granularities (4, 8, and 16 minutes) show a high impact on classification compared to the other counters. In addition, coarse time granularity DNS counter attributes (i.e., 32 and 64 mins) also show considerable impacts on classification.

Flow entries for local downstream and SSDP upstream flows show the least impact on classification because only a few devices included in the analysis use local and SSDP traffic during their communication. Although these flow entries are not contributing to classify many devices, they may nevertheless help to precisely identify the devices that generate these types of traffic flows.

A similar analysis of other classifier attributes also revealed interesting facts such as that coarse grain attributes have a high impact on IoT vs non-IoT classification, and short-range attributes have a high impact on state identification.

Attribute Reduction

Although all of the attributes described herein have been used in the classifiers, not all attributes may be required in all circumstances (e.g., for IoT versus non-IoT, or device and state classification). Additionally, correlations between attributes can make some of them redundant.

In order to identify and remove redundant attributes, the Correlation-based Feature Subset ("CFS") selection algorithm described in M. A. Hall, Correlation-based Feature Subset Selection for Machine Learning, PhD thesis, University of Waikato, Hamilton, New Zealand, 1998 was used with a best-first searching method. CFS is a filter algorithm that ranks attribute subsets according to a correlation based heuristic evaluation function. It helps to identify the subset of attributes that are highly correlated with classes and uncorrelated among them.

Figure 23:
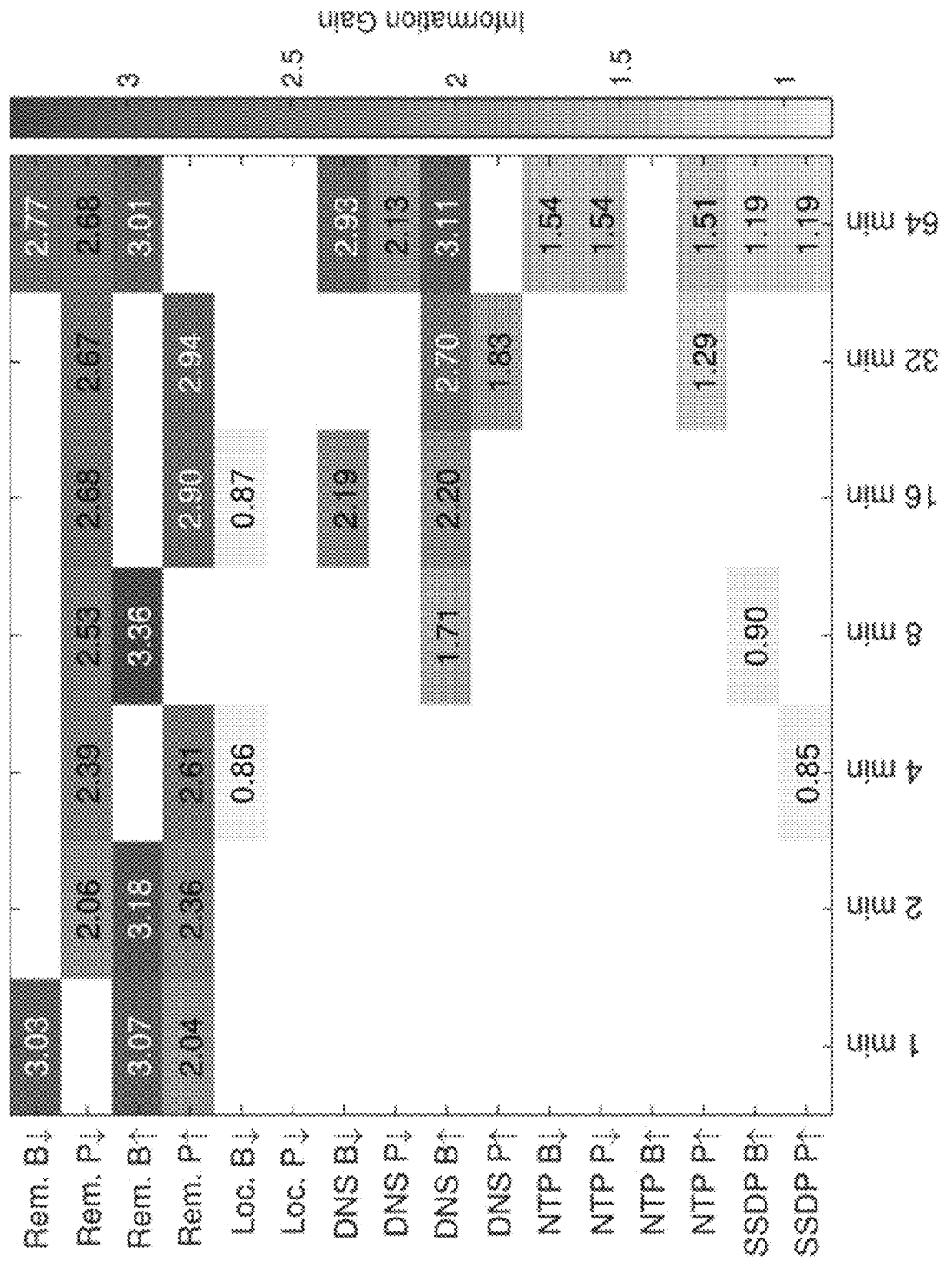

FIG. 23 shows a subset of 35 attributes that were identified after eliminating correlated attributes from the device type classifier. The subset of attributes provided a weighted accuracy (97.3%), precision (97.5%), recall (97.3%) and F1-score (97.4%) similar to the device type classifier that used the full set of attributes.

Using a similar approach, reduced numbers of attributes for the other classifiers were determined as follows: IoT classifier—11; State classifiers: Amazon Echo-6, Belkin switch-8, Dropcam-5, and LiFX-11.

Attribute Cost

The major cost factors of the described classification processes depend on the number of flow entries and memory elements required to store the historical counter values (e.g., eight memory elements are needed to buffer the values of a counter for the last 8 minutes) during the attribute generation process. Thus, attribute reduction decreases a major portion of the cost. Table 5 above shows the number of flow entries used by each classifier while using the reduced set of classifiers, demonstrating that the described processes can be optimized by removing or pushing flow entries dynamically.

TABLE 5

| Flow entries used to generate the reduced attribute set | | | | | | | | | |
| --- | --- | --- | --- | --- | --- | --- | --- | --- | --- |
| Classifiers | Int.↑ | Int.↓ | Loc.↓ | DNS↑ | DNS↓ | NTP↑ | NTP↓ | SSDP↑ | Num. of flow entries |
| IoT vs non_IoT | X | X | | X | X | | | X | 4 |
| Device | X | X | X | X | X | X | X | X | 8 |
| State-Amazon Echo | X | X | | | X | | X | | 4 |
| State-Belkin Switch | | X | X | | X | X | X | X | 6 |
| State-Dropcam | X | | | | X | X | | | 3 |
| State-LiFX | X | X | X | X | X | | | | 5 |

Figure 24:
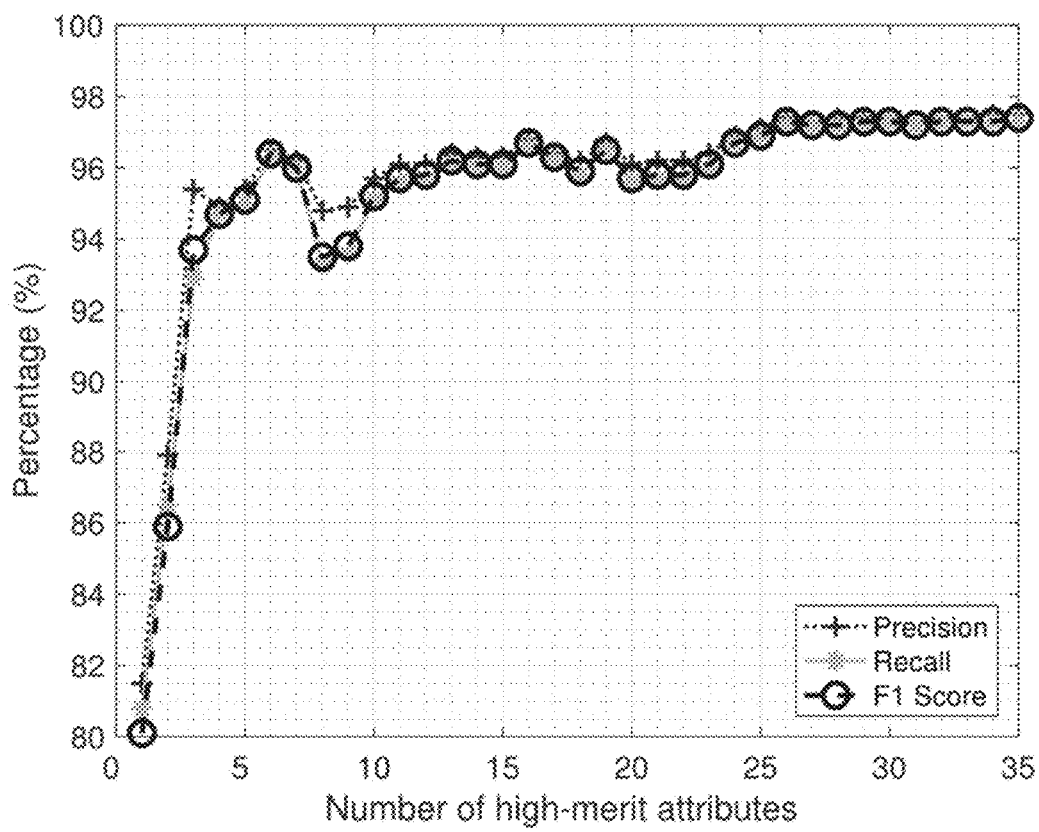
FIG. 24 is a graph illustrating the effect of the number of high-merit attributes on performance in terms of precision, recall, and accuracy.
Figure 25:
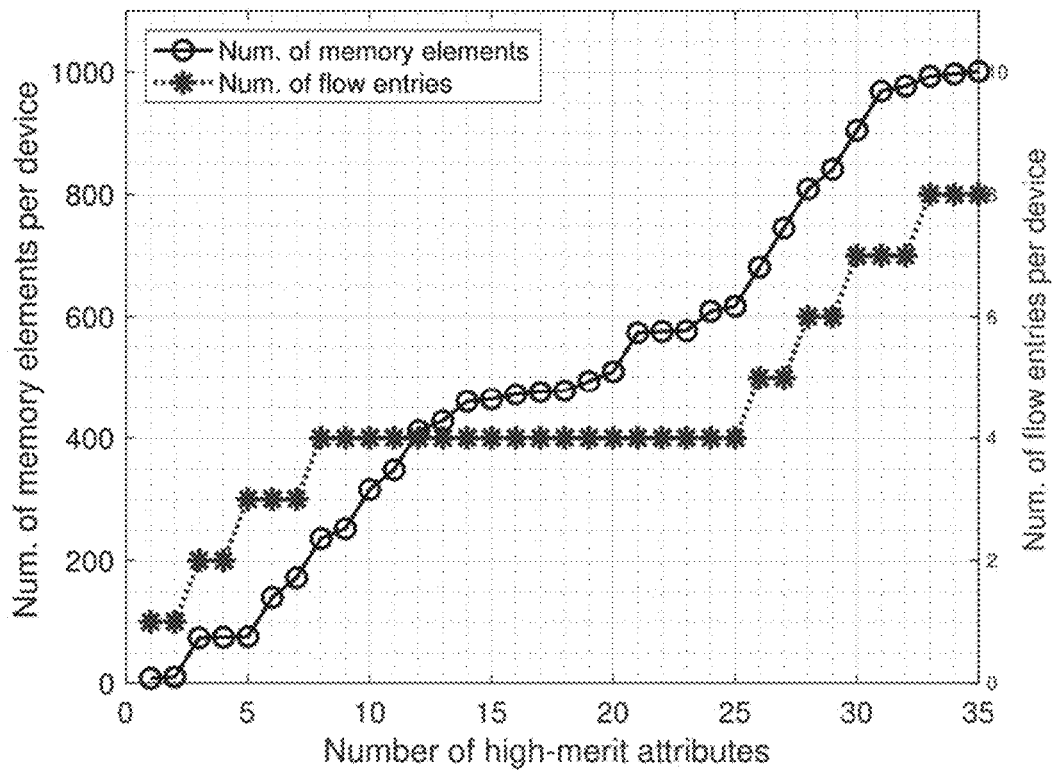
FIG. 25 is a graph illustrating the effect of the number of high-merit attributes on the cost of state management and switch TCAM.
Figure 26:
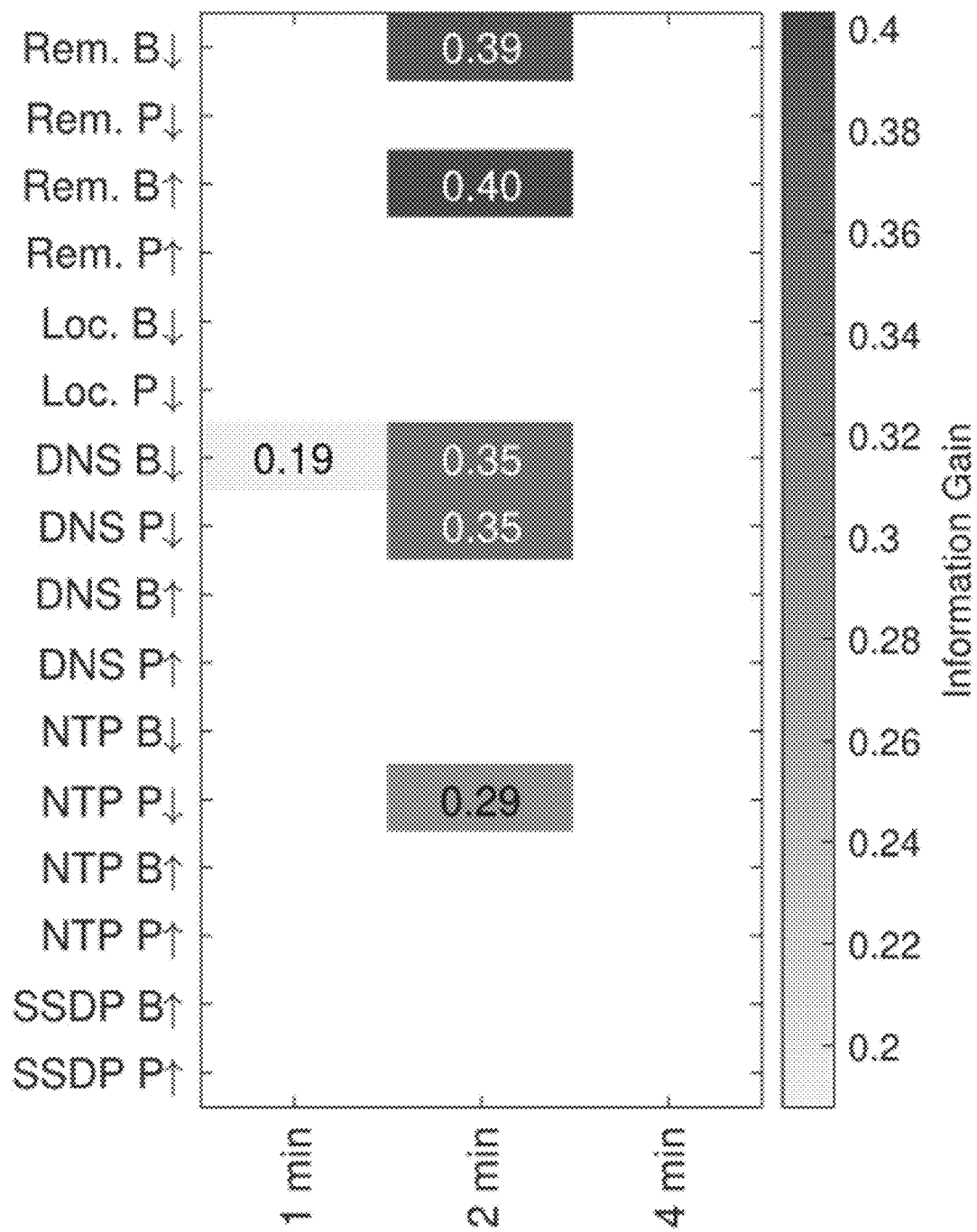
FIGS. 26 to 29 are charts illustrating the performance of operating state classification for different reduced attributes, respectively for the following different IoT devices.
Figure 27:
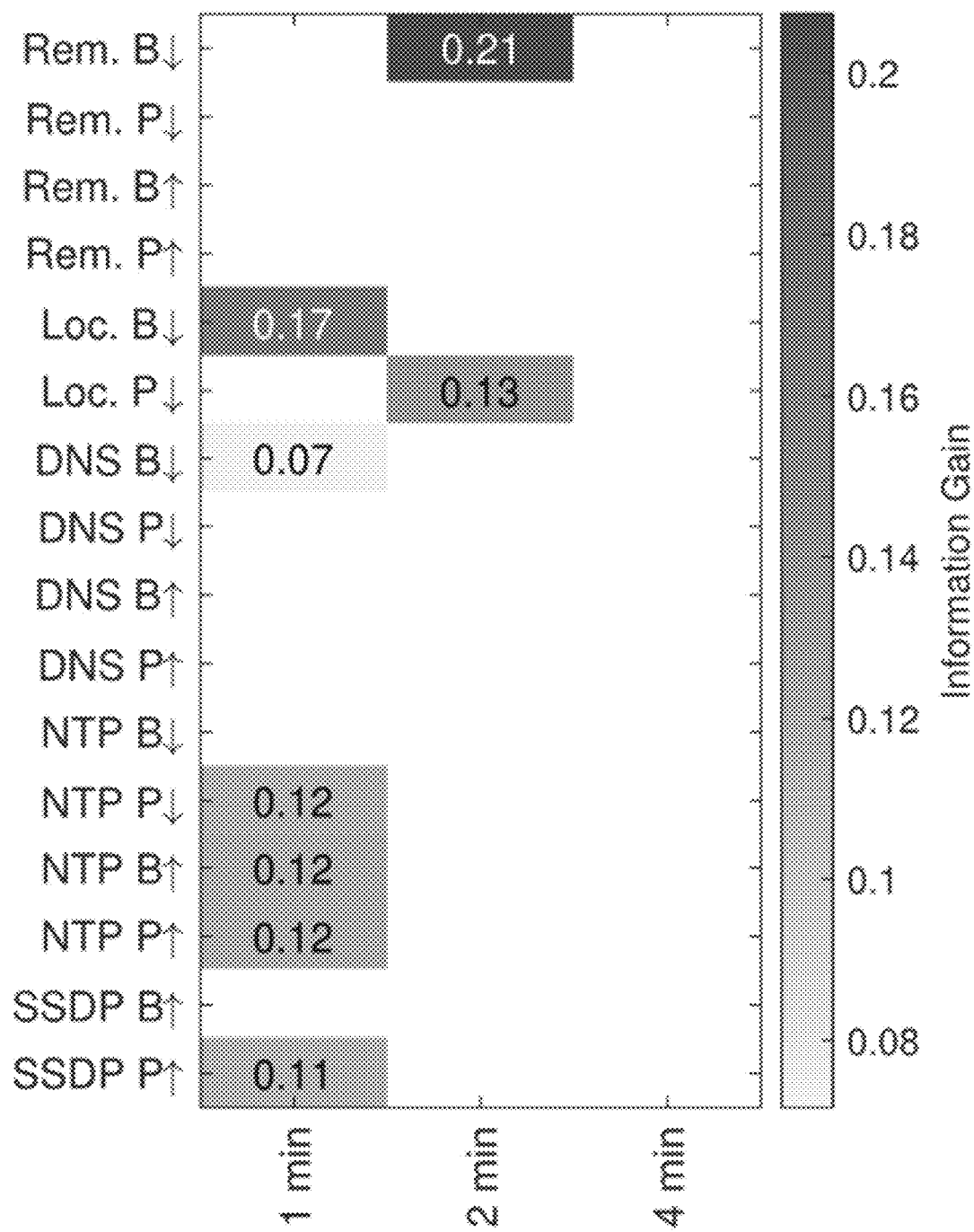
Figure 28:
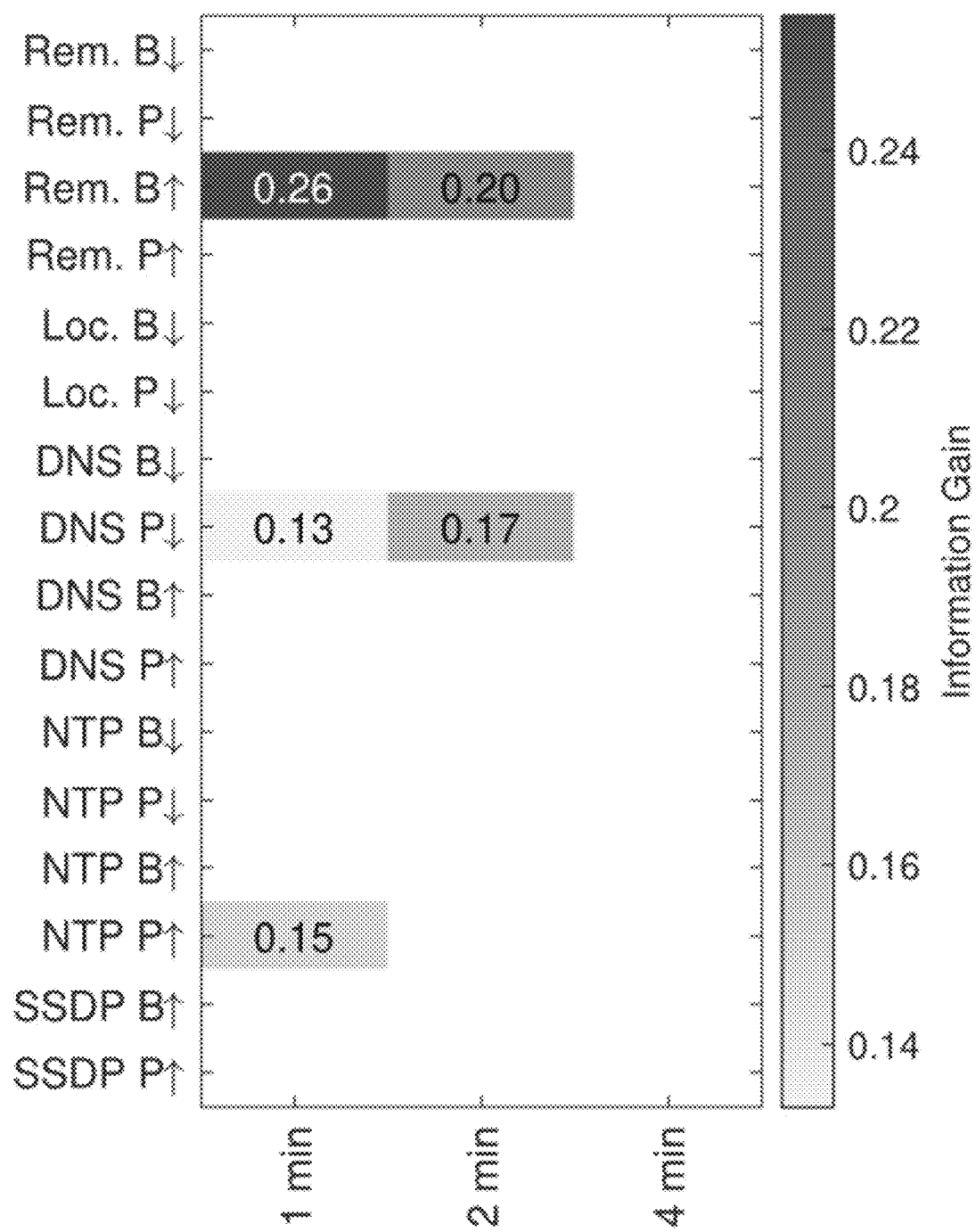
Figure 29:
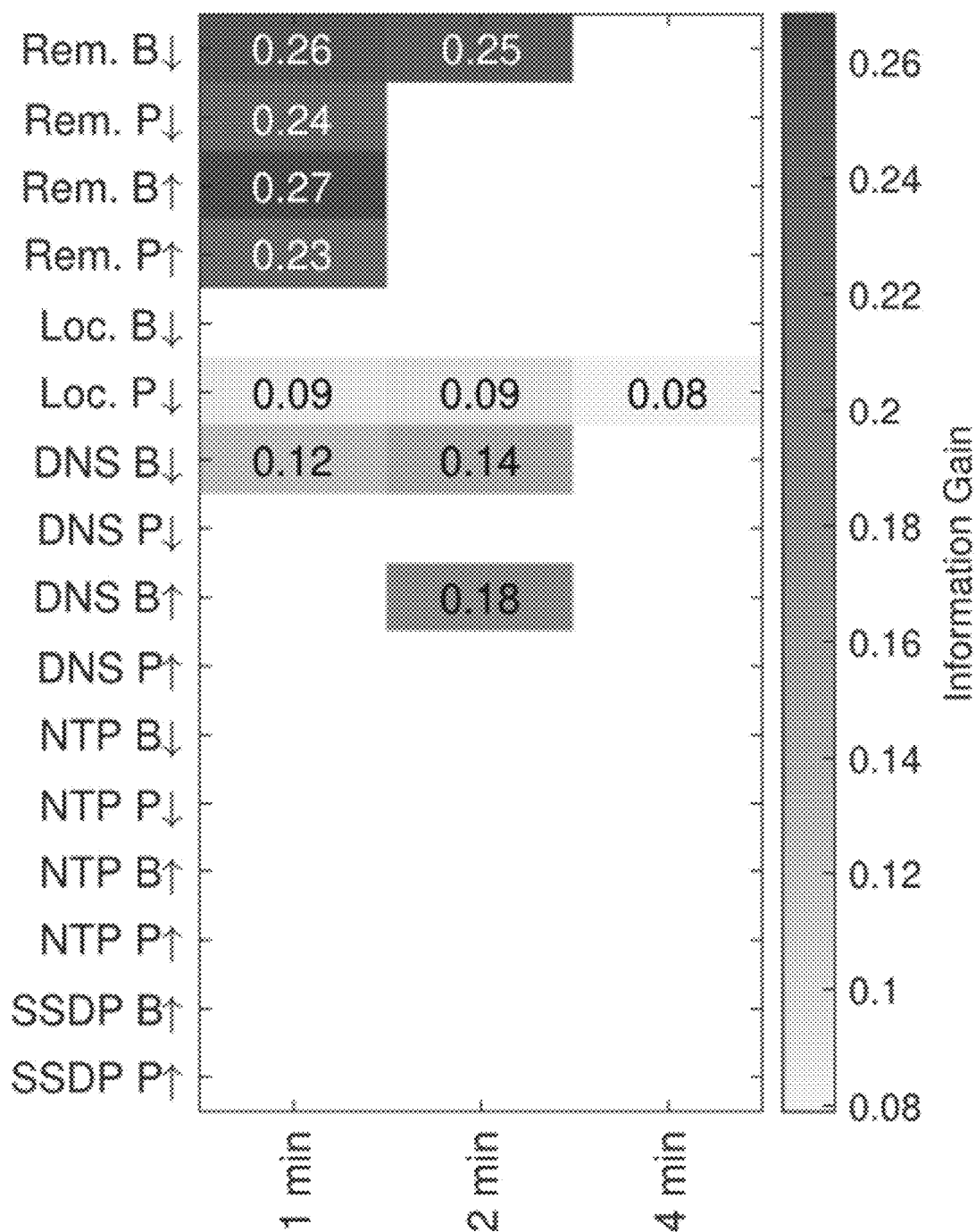

Further cost reduction can be achieved by a careful trade-off with the performance of a classifier. In order to understand the cost versus performance, the performance of the classifier was evaluated while accumulating attributes, one by one in descending order of IG values. FIG. 24 depicts the performance metrics of the reduced attribute device classifier, while FIG. 25 shows the accumulated cost of attributes as a function of the number of high-merit attributes in the same order. As described above, the weighted accuracy of the classifier is 97.3% with 35 attributes, while it cost 8 flow entries and ~4000 memory elements to buffer. However, FIG. 24 clearly shows that classifiers can reach 97% of precision, recall and accuracy level with only 25 attributes, which costs only 4 flow entries and ~600 memory elements, or around 50% of the number of flow entry and 60% memory element costs compared to the full set of 35 attributes.

Ongoing Training

Unlike traditional non-IoT devices, the behaviour of IoT devices does not change much with user interactions. However, firmware updates pushed by vendors can change the device behaviours significantly, and these changes can be expected to degrade the performance or confidence of the classifier output. As shown in FIGS. 15 and 16, the HP printer and Hue light bulb are good examples of such changes. However, introducing the changed behaviour of IoT devices to classifiers through an augmented training set can restore performance and confidence levels.

Accordingly, the deployment of a classifier model is not a one-time exercise, but rather a continuous or ongoing process. It is good practice to monitor the traffic of each IoT device and retrain the classifier models when the traffic pattern of a device deviates significantly from the original pattern. If observing the traffic to detect such changes is considered to put high overheads on the apparatus, this can be mitigated by continuously collecting sparsely sampled traffic data from network devices and retraining the models periodically (e.g., monthly).

The IoT device classification process and apparatus described above address difficulties of the prior art by providing a scalable solution to identify IoT devices in a network, the type of each device (including manufacturer and model), and the operating state of each IoT device with more than 90% accuracy. This allows network operator and administrators to accurately identify the IoT devices in their networks, and to detect changes in the behaviour of these devices, which may be indicative of a security breach, for example.

However, a disadvantage of the embodiments described above is that the scalability of the apparatus and process are limited by the need to regenerate the entire multi-class classifier model when a new device type is added to the network or the behaviour of even one of the previously classified device types legitimately changes due to a firmware upgrade by the device manufacturer.

Moreover, to reduce the impact of over-fitting the trained multi-class model to specific classes, it is necessary to carefully balance the training dataset by representing classes equally, which is a nontrivial task. IoT devices with richer features and diverse functionalities require more instances to capture their normal behaviour than other types of IoT devices.

In order to address these difficulties, alternative embodiments of the present invention replace the multi-class (IoT device type) classifier with an 'inference engine' having a set of one-class clustering models (one model per IoT device), each of which can be independently trained and updated when required.

These two approaches are fundamentally different in their way of modeling: one-class models are generative (each learns the distribution of its class), whereas multi-class models are discriminative (they learn the decision boundaries between different classes). As a result, one-class models become sensitive to changes in any attribute, whereas multi-class models become sensitive to changes in discriminative attributes only.

To demonstrate the basis for the alternative IoT device type one-class classification process, the first network traffic trace dataset described above was used as a representative dataset, specifically the eight flows described above and shown in Table 1 for each IoT device. As with the other embodiments described above, per-flow packet and byte counts were generated every minute (as they would be retrieved from the network switches 102 in a live network environment), and flow attributes/features were generated for time-granularities of 1-, 2-, 4-, and 8-minutes, providing eight attributes for each flow and a total of 8×8=64 attributes per IoT device.

In order to synthesize flow entries and thereby extract attributes from the traffic traces, the native packet-level parsing tool described above was again used to process the raw PCAP files as input, generates a table of flows (like an SDN switch), and export byte/packet counters of each flow at a configurable resolution (60 sec in the described embodiment and example). For each specific IoT device, a corresponding stream of instances (a vector of attributes periodically generated every minute) was then generated from the byte and packet counts.

A month of data from the first network trace dataset (i.e., corresponding to the period from 1 Oct. 2016 to 31 Oct. 2016) was used for training, and data from the following 2 week period was used for evaluating the generated models. The second column in Table 10 below summarizes the number of training/testing instances per each device type contained in this part of the dataset.

TABLE 10

Device instances used for training and corresponding clustering parameters.

| Device | Instance count | | Unsupervised classifier parameters | |
|---|---|---|---|---|
| | Training (1-month) | Testing (2-week) | # Principal components | # clusters |
| Amazon Echo | 40843 | 18694 | 19 | 256 |
| Belkin motion | 35153 | 18780 | 17 | 256 |
| Belkin switch | 40991 | 18771 | 18 | 256 |
| Dropcam | 41089 | 18787 | 9 | 128 |
| HP printer | 40713 | 18693 | 13 | 128 |
| LiFX bulb | 36952 | 18707 | 14 | 256 |
| Netatmo cam | 40788 | 18706 | 15 | 512 |
| Netatmo weather | 24896 | 17473 | 9 | 128 |
| Samsung cam | 40841 | 18696 | 16 | 256 |
| Smart Things | 41073 | 18799 | 13 | 256 |
| Triby speaker | 31898 | 18694 | 15 | 256 |
| Withings sleep sensor | 32033 | 10877 | 12 | 128 |

Attribute Clustering

The primary objective is to train a number of one-class models (one per IoT device), where each model recognizes traffic patterns of only one particular device type (i.e., one class) and rejects data from all other classes, a one-class classifier that generates "positive" outputs for known/normal instances, and a "negative" output otherwise. This use of one-class models means that each model can be re-trained independently of the other models of the set (in cases of legitimate changes). Also, device-specialized models can better detect anomalous traffic patterns (outliers). There are a number of algorithms for one-class classification. However, the described embodiment uses the "K-means" clustering method known to those skilled in the art, and which finds groups (i.e., "clusters") of instances for a given class that are similar to one another. Each cluster is identified by its centroid, and an instance is associated with a cluster if the instance is closer to the centroid of that cluster than any other cluster centroids.

Figure 30:
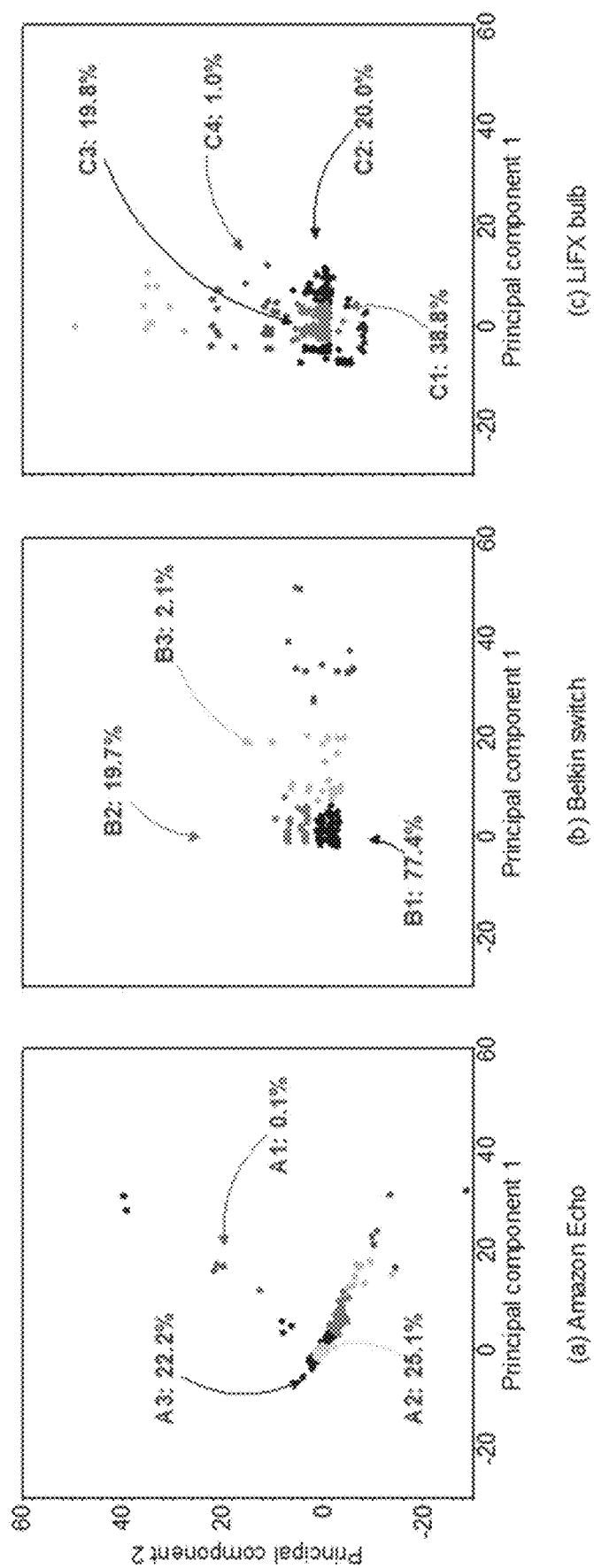
FIG. 30 is a set of three graphs showing clusters of data instances in two-dimensional principal component space for respective representative IoT devices, namely: (a) an Amazon Echo, (b) a Belkin switch, and (c) an LiFX bulb.

To provide insights into the traffic characteristics of IoT devices, FIGS. 30(a), (b) and (c) show the resulting clusters of instances for three representative devices, respectively, from the dataset: namely, the Amazon Echo, Belkin switch, and LiFX bulb. Note that the instances are multi-dimensional (each instance including 64 attributes), and thus cannot be easily visualized. Accordingly, for illustration purposes only, Principal Component Analysis (PCA) was used to project the data instances onto two-dimensions. In FIG. 30, data instances are represented as dots, and cluster centroids are represented as crosses. Only 10% of instances in each cluster are shown for better visualization; for example, four dots in cluster A1 of the Amazon Echo device, shown in FIG. 30 (a), represent approximately 40 instances.

Dotted circles depict the boundary of clusters. These boundaries are used to determine whether a test instance belongs to the clusters of a class. In the described embodiment, a boundary for each cluster is chosen to exclude data points whose distance from the centroid is relatively large, specifically values more than 1.5 times the interquartile range from the third quartile. In other words, the boundary for each cluster is defined to include the first 97.5% of data points closest to the cluster center, and to exclude farther instances.

It is important to note that an actual cluster forms a contour (enclosing associated data points) which could be a complex shape. In practice, the inventors have found that each model for a corresponding IoT device consists of some tens of clusters, and consequently to make the IoT device type classification process computationally cost-effective and more efficient, the shapes of the cluster contours are approximated. Noting also that the K-Means method attempts to partition the training dataset into spherical clusters when it is tuned optimally (i.e., equal distance from centroids in all dimensions), in the described embodiment the cluster boundaries are approximated as being spherical for the purpose of determining whether a test instance belongs to the clusters of a class.

As shown in FIG. 30, instances of the Amazon Echo, Belkin switch, and LiFX bulb IoT devices are grouped into 16, 4, and 8 clusters, respectively. FIG. 1(a) shows that instance clusters of the Amazon Echo are fairly spread across the two component space. For the Belkin switch device, the clusters in FIG. 1(b) are mainly spread across the principal component-1 while their principal-component-2 values are narrowly confined between −20 and 20. Lastly, the LiFX bulb instances in FIG. 1(c) are spread along the principal-component-2, but are narrowly confined between −20 and 20 in principal-component-1. Each cluster of a class has a probability (referred to as "cluster likelihood") of covering training instances from the corresponding device type, depending upon device traffic patterns seen in the training dataset. As annotated in FIG. 30, highly probable clusters for the Amazon Echo are A2 (25:1%) and A3 (22:2%), for the Belkin switch are B1 (77:4%) and B2 (19:7%), and for the LiFX bulb are C1 (38:8%) and C2 (20:0%). These clusters highlight the dominant traffic characteristics of their corresponding device.

Figure 31:
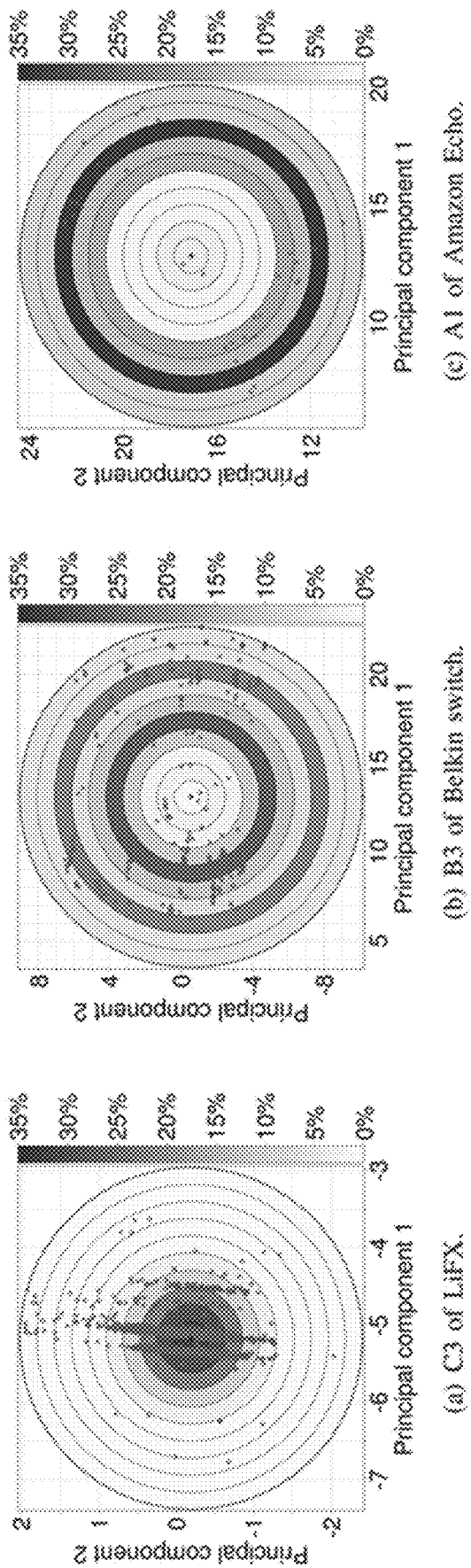
FIG. 31 is a set of charts illustrating the distance probability of clusters selected from FIG. 30, namely: (a) the C3 cluster of the LiFX bulb, (b) the B3 cluster of the Belkin switch, and (c) the A1 cluster of the Amazon Echo device.

The distribution of instances within each cluster also varies across clusters. FIGS. 31 (a), (b) and (c) show zoomed views of one cluster for each of the three representative IoT devices, with instances shown by dots. Each cluster is divided into 10 concentric annular bands of the same area, starting from the centroid to the cluster boundary. Each band in FIG. 31 is shown with a shading that indicates the fraction of training instances it covers, as indicated by the linear scale at the right-hand side of each Figure.

It can be seen in FIG. 31 (a) that 95% of LiFX instances inside cluster C3 fall within the four central bands of this cluster. Regarding the Belkin switch in FIG. 31(b), 81% of instances of cluster B3 fall within the middle bands (from the 4th to the 8th bands). Lastly, looking at a less probable cluster A1 of the Amazon Echo in FIG. 31(c), 85% of instances are covered by the last five bands farthest from the centroid.

Unsupervised Classification of IoT Device Attributes

This section describes the architecture of the inference engine, which consists of a set of one-class models for individual device types. Next, methods to resolve conflicts between multiple models for device classification are described. Finally, a scoring technique is introduced to measure the consistency of the models in classifying IoT devices, using two monitoring phases namely initial and stable, and detect behavioural changes.

Clustering Models: Generation, Tuning; and Testing

Prior to generating clustering models, the raw data is pre-processed as follows. First, each attribute is normalized independently to avoid outweighing large-value attributes (e.g., average bytes rate of incoming remote traffic at 8-min timescale) over smaller attributes (e.g., average packet size of outgoing NTP traffic at 1-min timescale) as the magnitudes of different attributes varies significantly (over several orders of magnitude). In the described embodiments, the Z-score method known to those skilled in the art (i.e., computing the mean $\mu$ and standard deviation $\sigma$ from the training dataset and normalising by calculating the deviation from the mean divided by the standard deviation) is used to scale individual attributes. Second, data instances are projected onto a lower dimensional space by using PCA to generate linearly uncorrelated principal components. This is because the direct use of 64-dimensional attribute instances for classification can be computationally expensive for real-time prediction, and can also degrade the clustering performance (possibly causing bias towards less significant attributes). The use of orthogonal principal components enables the K-means clustering to generate clusters more clearly by removing redundant and noisy attributes from the training dataset. In the described embodiments, PCA was used to determine the number of principal components to retain the optimum "cumulative variance".

Following dimension reduction, K-means clustering is applied, with K values varying as powers-of-2 (i.e., $2^i$ where i=1, . . . , 10). Setting K to small values would not generate an accurate model of network behavior for IoT devices, and large values increase the computational cost in both training and testing phases. Also, a very large K results in smaller-size clusters, and hence a rigid classifier which cannot correctly detect normal (legitimate) instances with small deviations from the training data—i.e., over-fitting. The optimal number of clusters is determined using the elbow method described in D. Ketchen et al., "The Application of Cluster Analysis in Strategic Management Research: An Analysis and Critique," Strategic Management Journal, vol. 17, no. 6, pp. 441-458, 1996.

Figure 32:
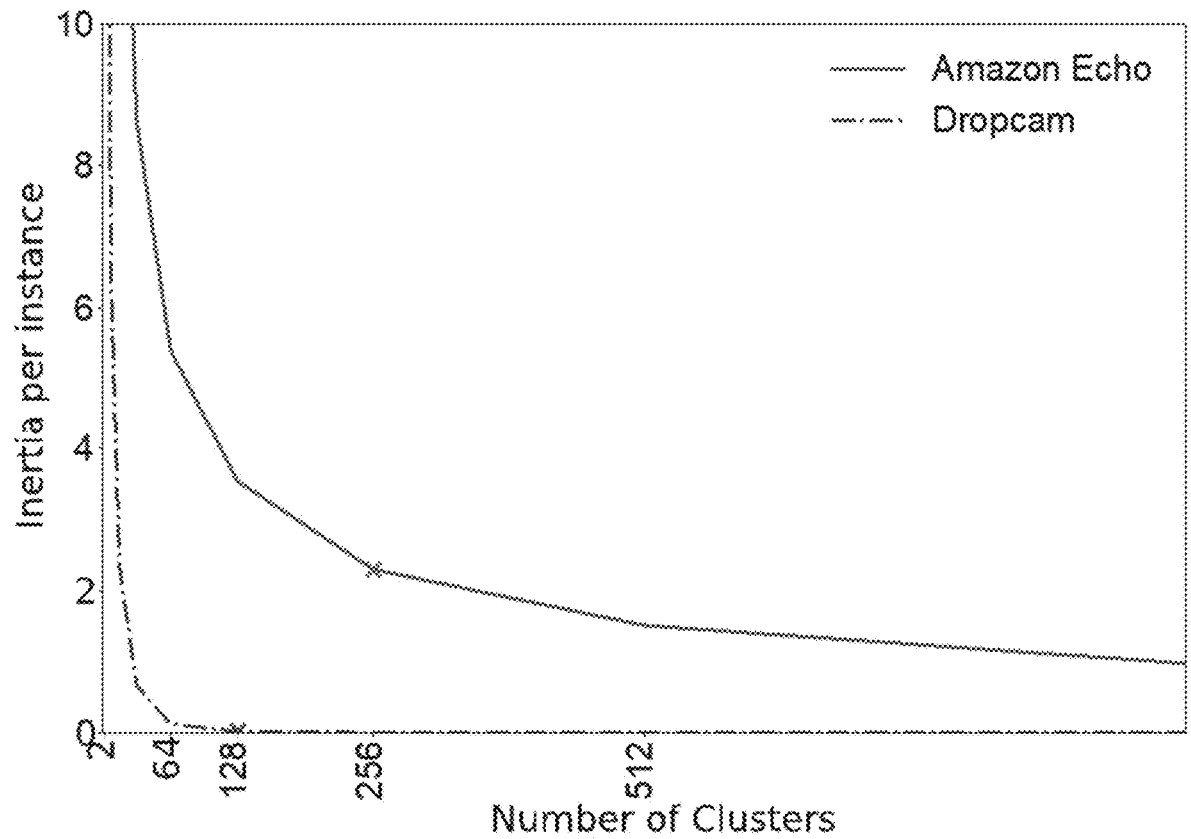
FIG. 32 is a graph illustrating the elbow method used to select an optimal number of clusters for each device type class.

FIG. 32 is a graph showing the average square distance of instances from the cluster centers (i.e., Inertia per instance) as a function of the number of clusters for each of two representative device types. The optimal number of clusters (marked by 'x' on each curve) is deemed to be when the first derivative of inertia per instance exceeds a very small negative value −0.01 (the curve is becoming flat). It can be seen that the model for the Amazon Echo device needs 256 clusters for optimal performance, whereas the Dropcam device needs only 128 clusters. The rightmost column of Table 10 shows the optimal model parameters for individual device types, determined as described above.

Figure 33:
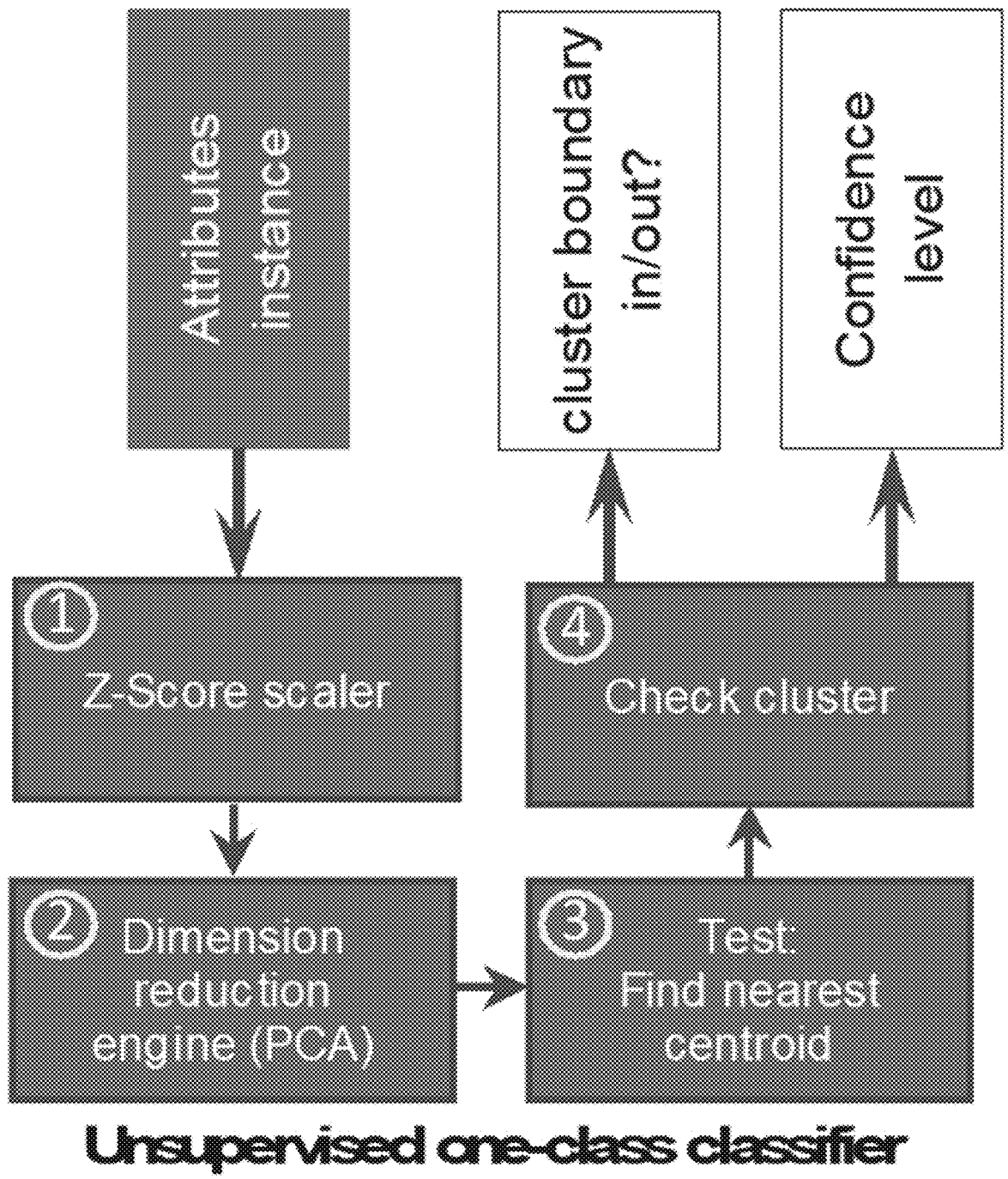
FIG. 33 is a diagram illustrating the use of each clustering model for a test instance.

Having generated the clustering models, each instance of IoT traffic attributes (after scaling and dimension reduction) is processed as shown by the sequence of steps in FIG. 33. The test instance is provided to all of the device-specific (once-class) models to determine the nearest centroid of each model, using the Euclidean distance between the test instance and each cluster centroid. Given a nearest centroid, the instance is checked against the corresponding cluster to determine whether it falls inside or outside of that cluster's boundary, and if inside, a confidence level is calculated.

To better illustrate this process, consider the two-dimensional space of clusters described above with reference to FIG. 30. Assume that a test instance has its principal component-1 and component-2 equal to 0 and 20, respectively. The nearest cluster centroids to this test instance are of cluster A1 of the Amazon Echo, cluster B2 of the Belkin switch, and C4 of cluster of the LiFX bulb. Since the test instance falls outside of the A1 boundary, the Amazon Echo model provides a negative output, while the other two models both give positive outputs. In such cases where multiple models provide positive outputs for the same instance, a conflict resolution process is used to select the "winner" model.

Conflict Resolution

Although each model learns the normal behavior of one device type, different devices can display somewhat similar traffic behaviour (e.g., DNS, NTP or SSDP) for a short period of time, which can result in multiple positive outputs generated by the clustering models for an instance. In such cases, "confidence" values are generated for the models that gave positive outputs, and the model with the highest confidence value is selected as the winner.

Each "confidence" value (also referred to herein as "associate probability") represents a probability value for an instance to be associated with a cluster of that model. Given an instance Ins receiving a positive output from a model Mi and falling within a distance band Dl of the nearest cluster Cj (of the model Mi), the corresponding associate probability is estimated by:

$$P_{[Ins|M_i(C_j(D_l))]}^{test} = P_{[C_j|M_i]}^{train} \times P_{[D_l|C_j]}^{train}$$

where $P_{[C_j|M_i]}^{train}$ is the likelihood of the nearest cluster Cj within the model Mi, and $P_{[D_l|C_j]}^{train}$ is the probability of distance band Dl inside the cluster Ci—both of these probability values being obtained from the training dataset. $P_{[C_j|M_i]}^{train}$ is always non-zero (by optimal tuning, see M. K. Pakhira, "A Modified k-means Algorithm to Avoid Empty Clusters," International Journal of Recent Trends in Engineering, vol. 1, no. 1, pp. 220-226, May 2009), but it is possible to have $P_{(D_l|C_j)}^{train}$ equal to zero when none of the training instances fall inside a band DI (i.e., unexplored distance bands in the training data). To avoid a zero confidence for test instances, the band probability is slightly modified using the Laplacean prior (see A. McCallum and K. Nigam, "A Comparison of Event Models for Naïve Bayes Text Classification," AAAI/ICML-98 Workshop on Learning for Text Categorization, pp. 41-48, 1998), priming each band instance count with a count of one, as follows:

$$P_{[D_l|C_j)]}^{train} = \frac{1+N_{Dl}}{L+N_{C_j}} \qquad (2)$$

where $N_{Dl}$ is the number of training instances inside the band Dl; NCj is the total number of instances in the cluster Cj; and L is the total count of distance bands in the cluster, the described embodiments using ten bands in every cluster (i.e., L=10).

The associate probability, to some extent, indicates the model confidence. However, it becomes challenging to select the winner among multiple models giving positive outputs since the number of clusters and also the distribution of distance bands vary across models, and hence the associate probability is scaled differently. For example, models with large numbers of clusters may have relatively smaller values of $P_{[C_j|M_i]}^{train}$ or a cluster with highly sparse bands would result smaller values of $P_{[D_l|C_j]}^{train}$.

Figure 34:
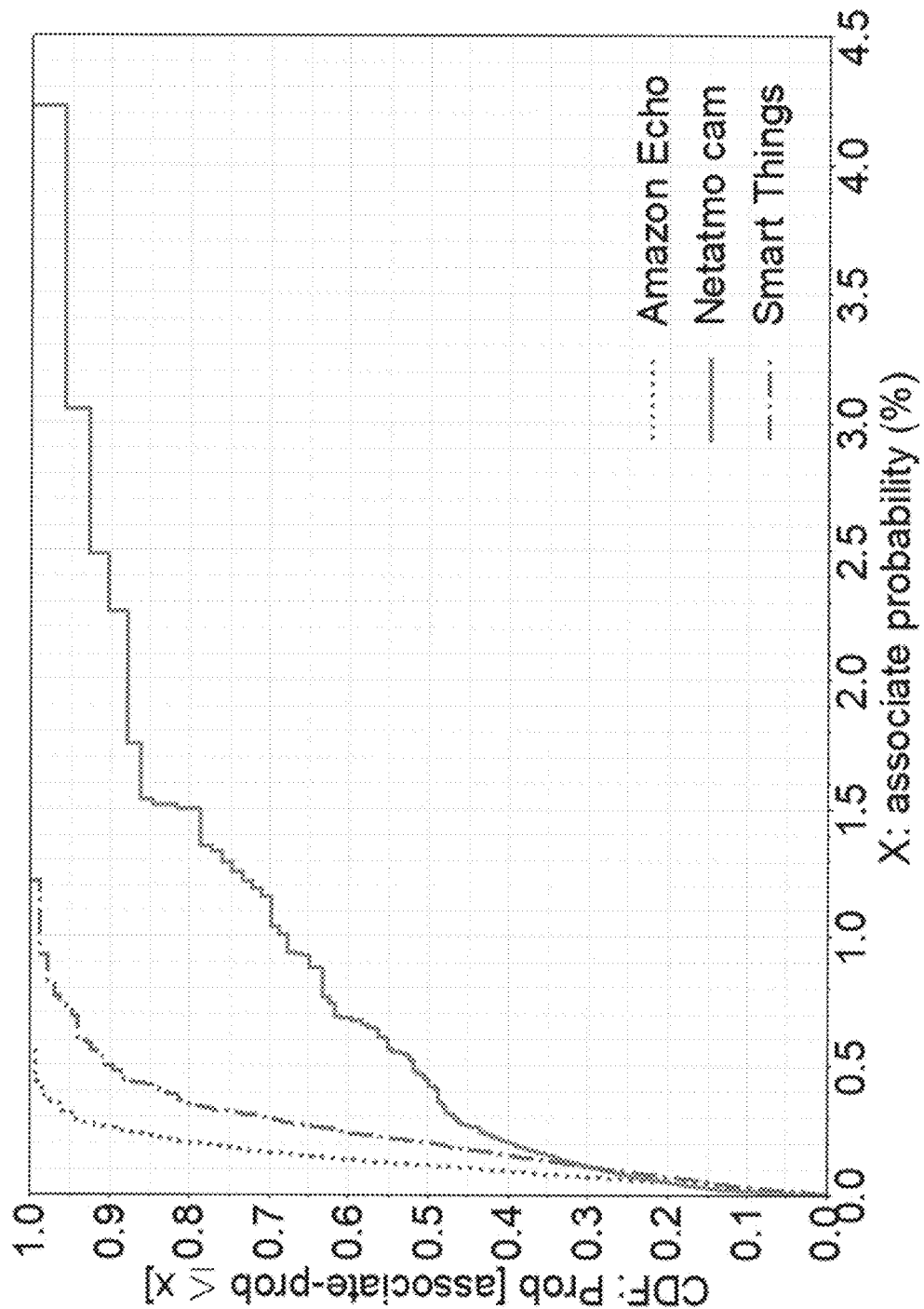
FIG. 34 is a graph of the cumulative distribution function as a function of associate probability value for training instances of three device types.

To obtain a metric of confidence for comparison across different models, each associate probability (computed as described above) is scaled by using the distribution of this probability in the training dataset. To better illustrate this scaling process, FIG. 34 shows the cumulative distribution function (CDF) of the associate probability for training instances from three IoT models namely, the Amazon Echo, Netatmo cam, and Smart Things models. For example, an associate probability of 0.5% is a high value for the Amazon Echo model (dotted line), more than 99% of the training instances having lower values. However, this percentage drops to 90% and only 52% for the Smart Things (dashed line) and Netatmo (solid line) models, respectively. Accordingly, given the associate probability (from a model that gives a positive output for a test instance), the model confidence-level is determined by computing the fraction of its training data with associate probability values that below that of the test instance (with respect to the model's empirical CDF of associate probability).

Consistency Score

Figure 35:
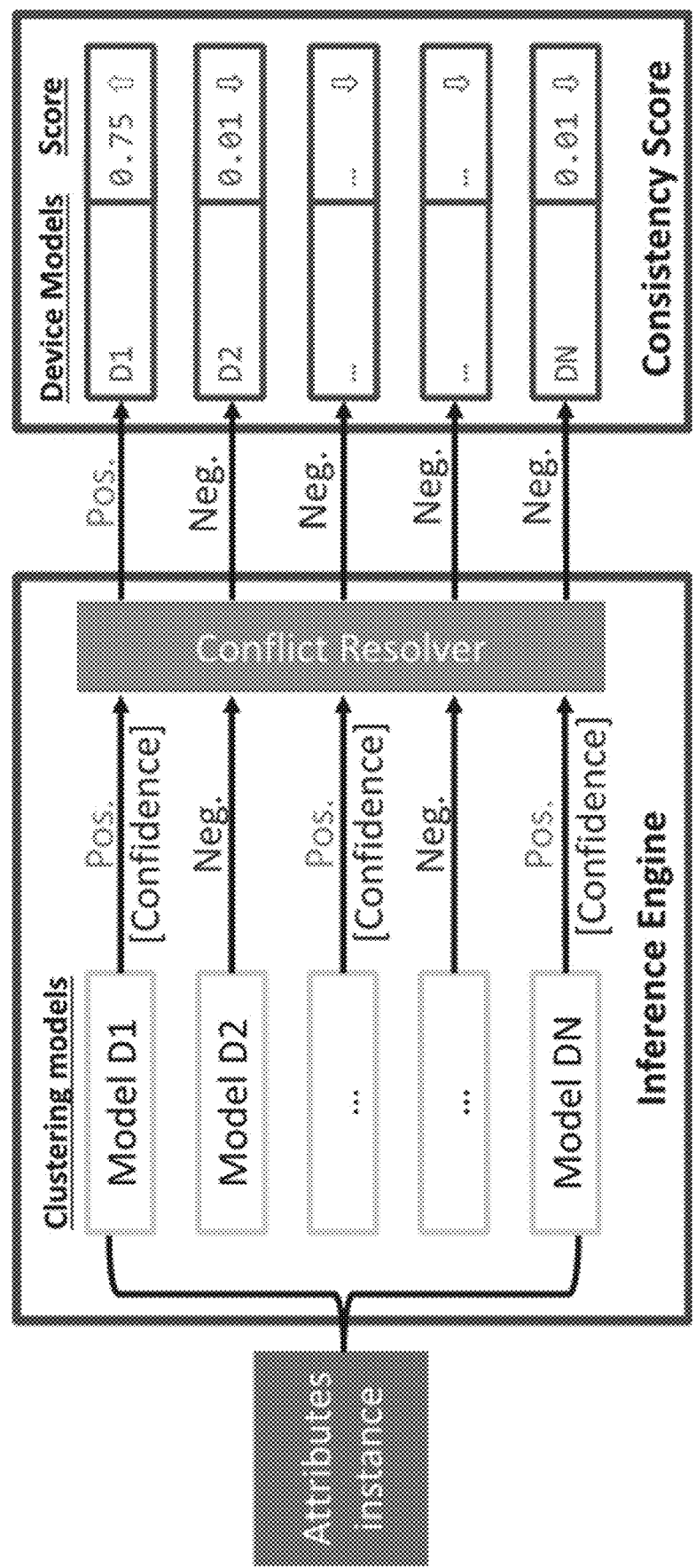
FIG. 35 is a block diagram of a device type classification component of an alternative embodiment of a network device classification apparatus.

Ideally, for monitoring individual IoT devices consistent outputs should be generated by the inference engine over time. However, a given device that is consistently and correctly classified by a model over a period of time (say, a week), may nevertheless occasionally be rejected (i.e., negative output) by its intended model. To bootstrap the monitoring process for a newly connected (and possibly unknown) device, at least one of the corresponding device models should consistently generate positive outputs in order to accept the device and label it by the corresponding class (at which time the device is said to be in a "stable state"). Once a device becomes known ('accepted') and is in its stable state, receiving negative outputs frequently from its corresponding model indicates a change (legitimate or illegitimate) in the device behaviour, which requires further investigation. To enable this detection; the apparatus generates a "consistency" score (between 0 and 1) representing the consistency of device classification. FIG. 35 shows the architecture of the inference engine, with classification followed by consistency scoring.

Figure 36:
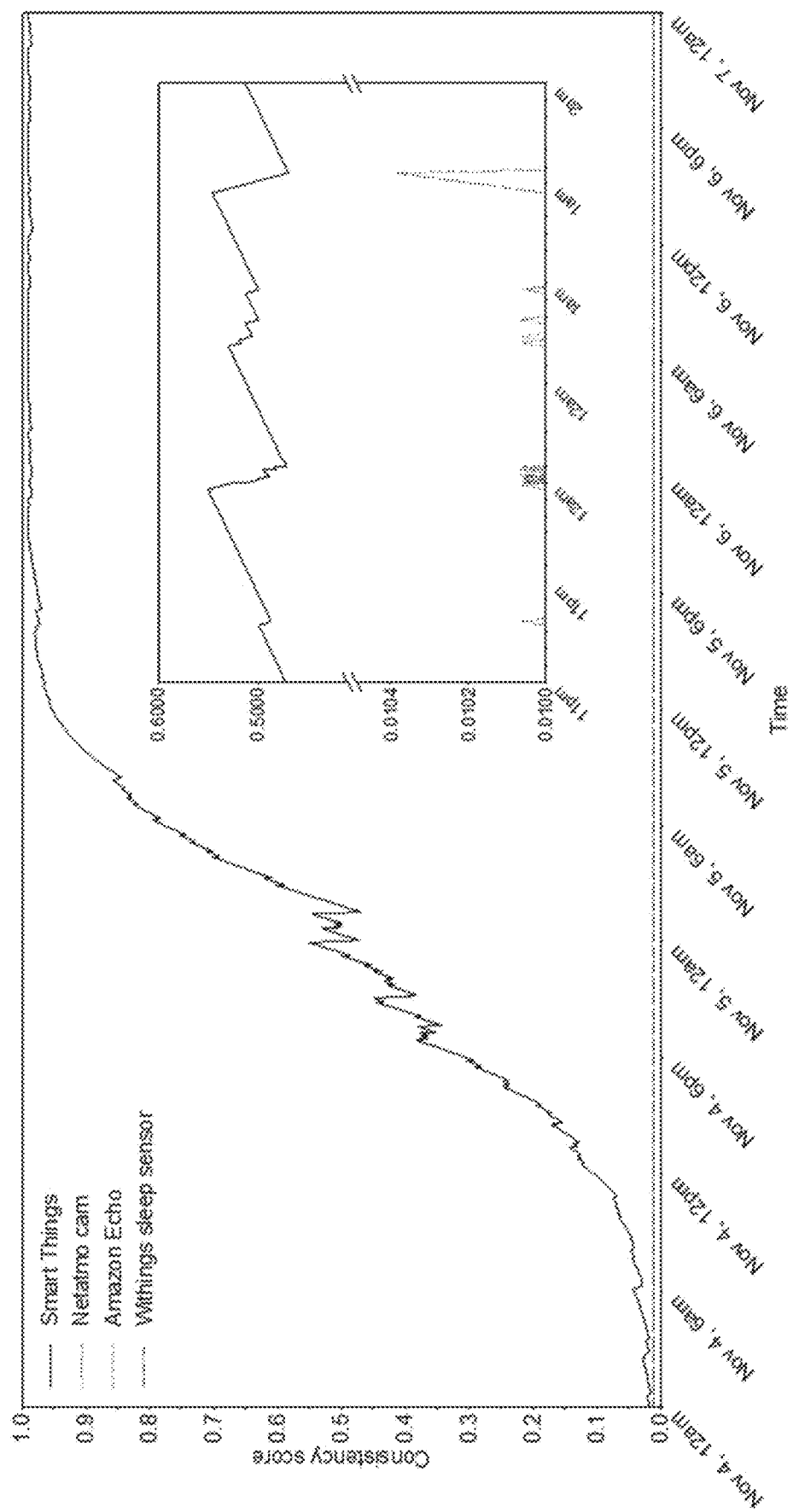
FIG. 36 is a graph showing the evolution of a consistency score generated in real-time by the device type classification component as a function of time for a Smart Things IoT device.

For instances of a given IoT device, the consistency score is computed and stored for each model, and updated following classification of each instance—the consistency score of a model rises by its positive outputs, and falls by its negative outputs over time. To better understand the dynamics of this score, consider the following example. Three days of instances from a Smart Things device were replayed in real-time to four trained models respectively for the Smart Things, Netatmo, Amazon Echo, and Withing Sleep sensor IoT devices. FIG. 36 is a graph of the resulting consistency scores of these four models over time. As expected, the score of the Smart Things model (shown by solid lines) is dominant, while the scores for the other three models are negligible (and hence not apparent in the Figure). The Smart Things model score slowly rises and reaches a high level of 0.8 after about 30 hours. It is also observed that sometimes the score of the intended model, as in this example, falls slightly and then rises again because some instances display patterns closer to other models. The inset in FIG. 36 is a magnified view of the gray band region (corresponding to November 4, 11 pm-November 5, 2 am) which shows the scores of the other models. It is observed that once any other model gives a positive output, its score quickly spikes, but soon after drops back to zero (shown by dotted lines for the Netatmo cam device) as the intended model Smart Things wins again.

The consistency score is updated with two rates: rising on positive outputs at rate $\lambda r$, and falling on negative outputs at rate $\lambda f$—these rates being configurable by network operators. To update the consistency score, a sigmoid function is used in the described embodiment because its exhibits soft start and end, and is bounded within 0 and 1. Specifically, a raw score represented by sequence {St} beginning at time t=0, is dynamically updated according to:

$$S_t = \frac{S_{t-1} \times e^\lambda}{1 + S_{t-1} \times (e^\lambda - 1)} \quad (3)$$

where, $S_{t-1}$ is the previous value of the estimated score, and $\lambda$ is set dynamically, depending on the latest output of the model (i.e., $\lambda r>0$ for a positive output, and $\Delta f<0$ for a negative output). Network operators can set their $\lambda r$ and $\lambda f$ values based on their preferred policy in terms of how quickly (or slowly) they want the score to rise and fall. Depending upon the time expected T to reach to "target score" S* (between 0 and 1) from the mid-level score 0.50, the value A is given by:

$$\lambda = \frac{\log\left(\frac{S^*}{1-S^*}\right)}{T} \quad (4)$$

Figure 37:
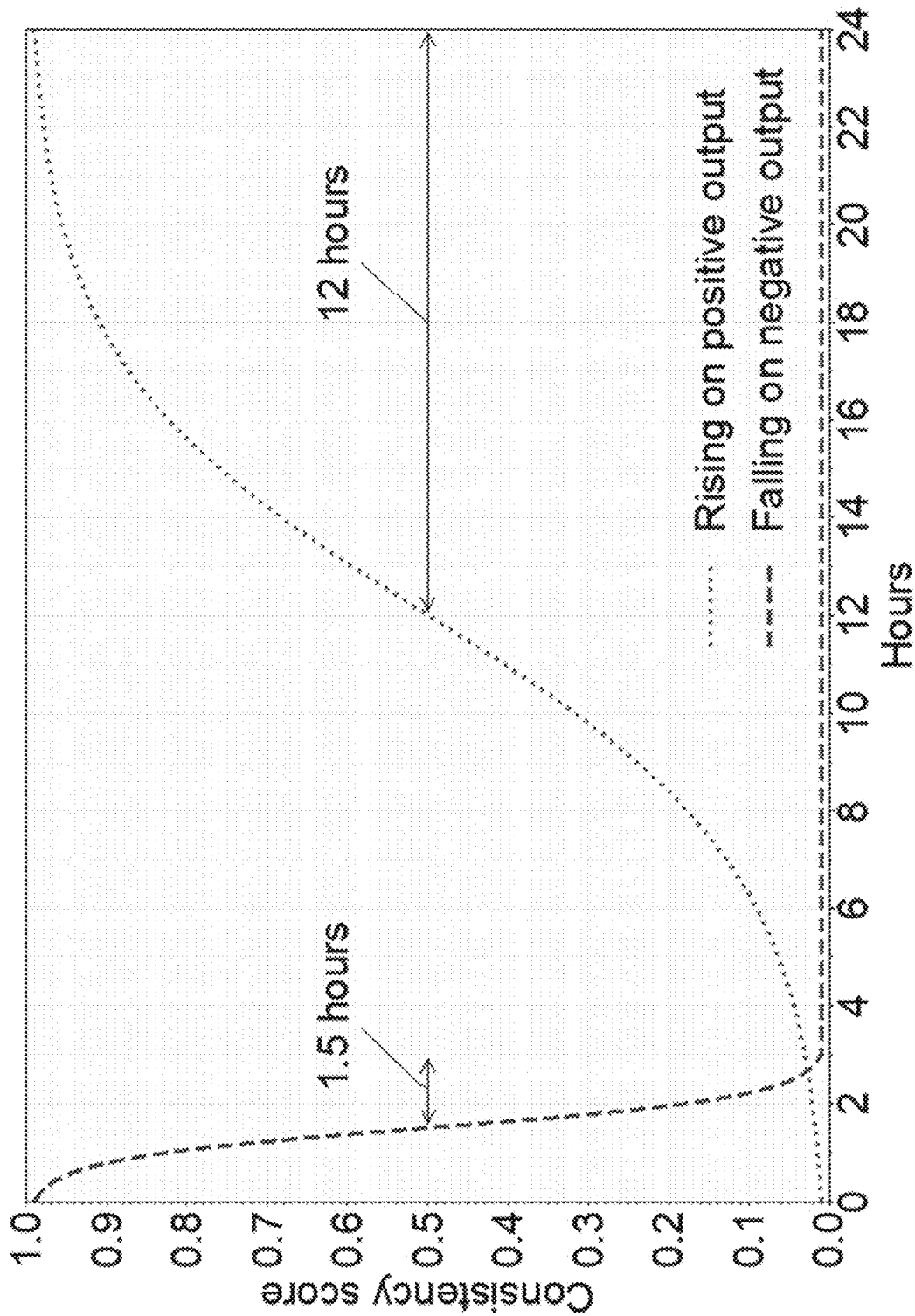
FIG. 37 is a graph showing the real-time update rate of the consistency score—for a given model, it falls fast (from highest to lowest value in 3 hours) on continuous negative outputs, and rises slowly (from lowest to highest value in 24 hours) on continuous positive outputs.

The described embodiment takes a conservative approach whereby the consistency score rises at slower rate than it falls. The same values are used for all models, and are configured in such a way that it will take 12 hours to reach a very high score of 0.99 from a score of 0.50 ($\lambda r=0:0064$) in case of successive positive outputs from the model, whereas it needs only 1.5 hours to reach a very small score of 0.01 from a score of 0.50 ($\lambda f=-0:0511$) in case of successive negative outputs. FIG. 37 shows two sample curves of consistency score using these $\lambda$ values, each monotonically rising and falling on successive positive and negative outputs, respectively. Both curves saturate (reaching the ultimate values of 0 and 1) in infinite time, and change very slowly beyond certain levels, i.e., above 0:99 for the rising curve, and below 0:01 for the falling curve. In other words, entering into these regimes can stifle the agility of real-time monitoring (especially for detecting attacks in real-time).

For example, it will take at least 45 minutes to fall from 0.999 to 0.99 (half the time needed to fall from 0.99 to 0.50). Similarly, it takes 6 hours to rise from 0.001 to 0.01. Therefore, the scores are capped at 0.99 and 0.01 as the saturation (minimum and maximum) levels, and also each score is initialized at S0=0:01.

Monitoring Phases

For monitoring the behavior of each IoT device, two phases are considered: (1) the initial phase, and (2) the stable phase. The initial phase begins when a device connects to the network for the first time (discovery), and can therefore be considered to be 'unlabelled'. During this phase, the inference engine (shown in FIG. 35) aims to determine the IoT device type (classification) by asking all of the existing models. To achieve this aim, every instance of the device traffic is fed to all models in real-time, and their outputs are obtained. If multiple models give a positive output, then the conflict resolution process described above is applied to select one of those models as a winner. During the initial phase, the consistency score of all winner models for a device is tracked until the consistency score of one of these winner models reaches an acceptable level (i.e., a threshold value chosen by the network operator, say 0.90) at which time the device type is deemed to be verified. At this point the device is labeled as the corresponding known class (i.e., device type), its intended model is determined, and its state changes from the initial phase to the stable phase. In the stable phase, the inference engine uses only the intended model to monitor the real-time behavior of the (labelled) device. However, as described below, the consistency score of the intended model is used to detect changes in behaviour of that device.

Performance Evaluation

The efficacy of the inference engine was evaluated as described below. First, the performance of one-class models and conflict resolution in selecting an intended model for a given device during its initial phase of monitoring was evaluated. Once the device type is classified (with a sufficiently high level of consistency), we next demonstrate behavioral changes using temporal consistency score of the intended model during its stable phase of monitoring. Finally, we show the efficacy of our inference engine. We also compare our one-class classification with a multi-class classification method.

Device Classification

The performance of device classification was evaluated using a subset of the test instances from the first dataset, corresponding to only two weeks from 1 Nov. 2016 to 14 Nov. 2016. FIGS. 38 9a) and (b) show the resulting confusion matrix of device type classification respectively before and after resolving conflicts as described above. Every clustering model (listed in rows) is presented by test instances of IoT devices (listed in columns). For a given cell of the matrix, the value of that cell indicates the percentage of instances (from the device in corresponding column) that receive a positive output from the model in the corresponding row.

Figure 38A:
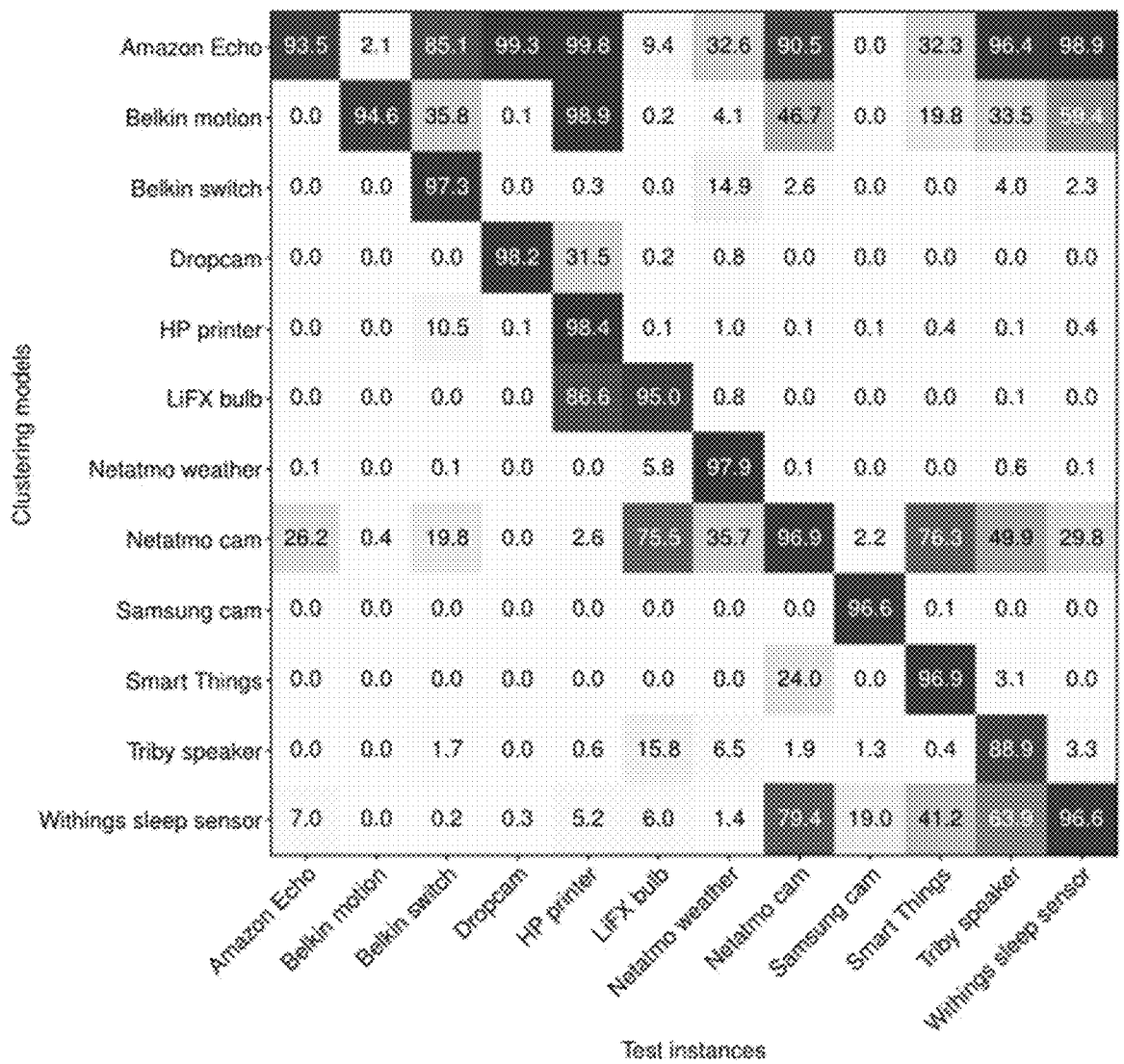
FIGS. 38 (a) and (b) are confusion matrices of device classification, respectively for: (a) the raw output of the set of clustering models, and (b) after conflict resolution.

Starting from the raw outputs of FIG. 38(a), it can be seen that all models correctly detect the majority of instances from their own class as shown by the diagonal elements of the confusion matrix—except for the Triby speaker with only 88.9%, the others display more than 93.5% of correct detection (i.e., true positives). However, models also incorrectly detect device instances from other classes (i.e., false positives), as shown by the non-diagonal elements of the confusion matrix. For example, the models for the Amazon Echo and Belkin motion devices incorrectly give a positive output for 99.8% and 98.9% of instances of the HP printer. Considering the raw outputs of the various models, 70% of test instances were detected by more than one model (in addition to their expected model), and 2% of test instances were not detected by any of the models. The winner model for each test instance was selected using the model confidence-levels.

Figure 38B:
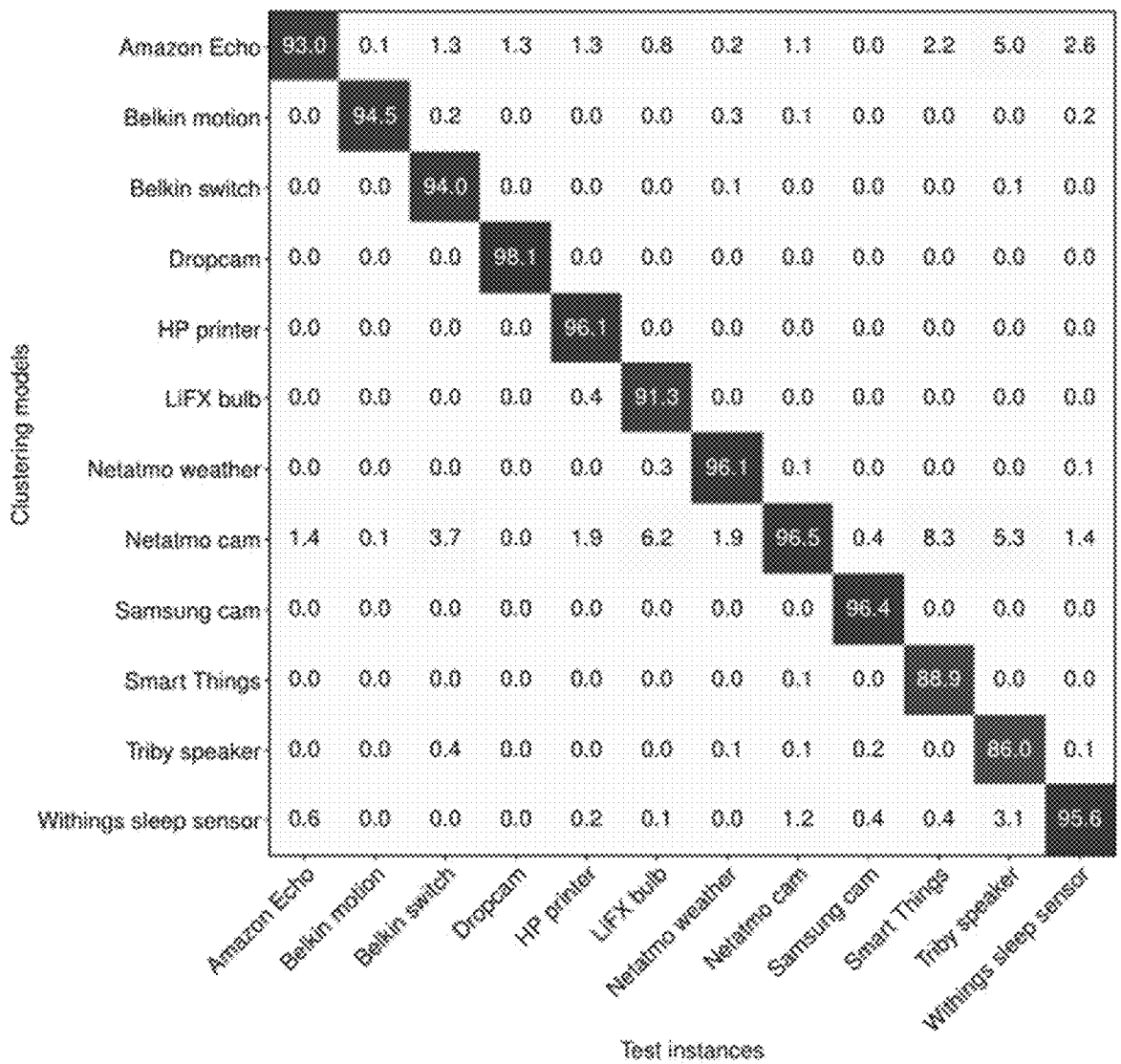

FIG. 38(b) shows the same confusion map but after the conflict resolution process. Comparison with FIG. 38(a) clearly demonstrates a significant enhancement in performance of IoT device type classification by selecting the model with the highest confidence. Note that the average false positive rate has reduced to less than 0.4% while the average true positive rate is 93.9%.

It was also observed that the conflict resolver slightly reduced the rate of true positives for almost all models. The Smart Things device is impacted more compared to other models by experiencing a drop from 96.9% to 88.9% in its true positive rate, largely because the Netatmo camera model gives positive output with high confidence for 8.3% of Smart Things instances. Focusing on the model for the Netatmo camera, it was found that its clusters overlap with a number of clusters of several other IoT devices, including the Belkin switch, LiFX, Smart things, and Triby speaker devices, and hence resulting in false positives. This is mainly due to the aperiodic behavior of the Netatmo camera, which is event-triggered: the camera transmits video to its cloud server whenever it recognizes a human face or detects a motion. As a result, it displays a wider range of activity patterns over longer time scales, overlapping with the traffic patterns of other devices. For example, the average byte rate of incoming NTP traffic of Netatmo camera over an 8-min timescale can take a value anywhere from 0 to 700 bytes-per-min. Such a wide range overlaps with the value range of the same attribute for the LiFX bulb (varying between 8-12 bytes-per-min) and the Smart Things device (varying between 15-25 bytes-per-min).

Detecting Behavioral Change

Once an IoT device has been classified as a particular type of IoT device, its activity is monitored in real-time. The models can be used to highlight behavioral changes by tracking dynamics of their consistency scores. To demonstrate this, a longer portion of the first dataset spanning dates from 1 Nov. 2016 to 31 Mar. 2017 was used.

Figure 39A:
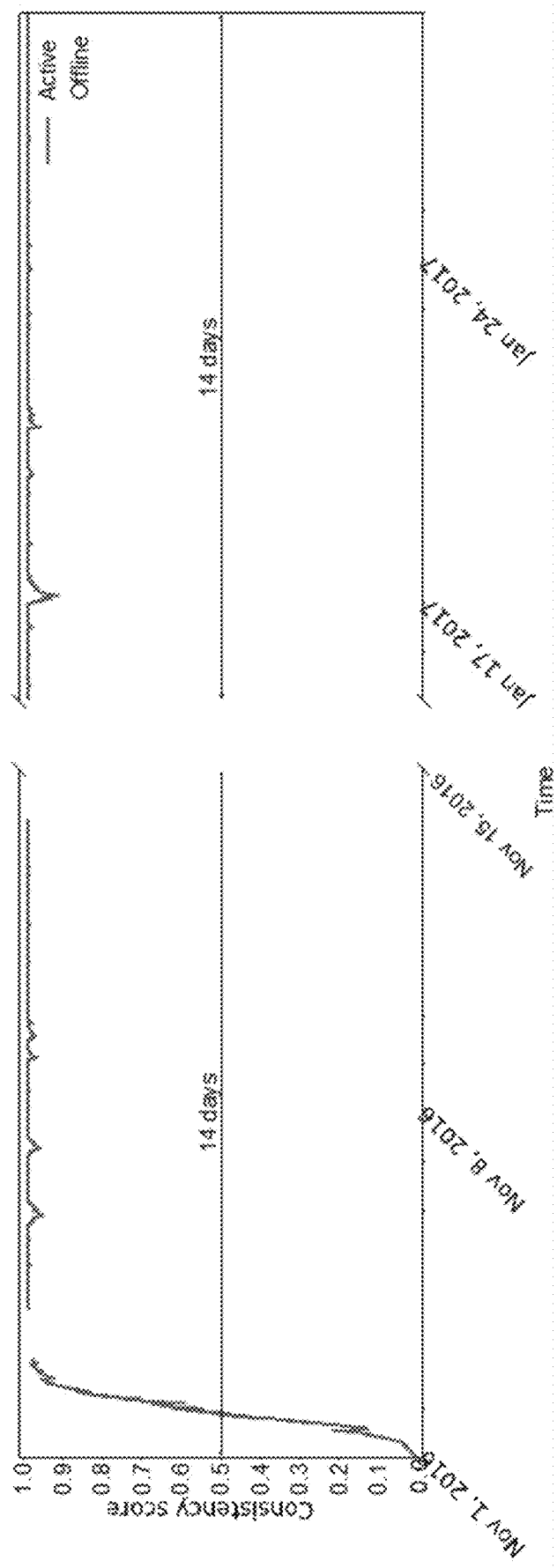
FIGS. 39 (a) and (b) are graphs showing respective time-traces of the consistency score respectively for: (a) a Belkin switch, and (b) a Triby speaker device.
Figure 39B:
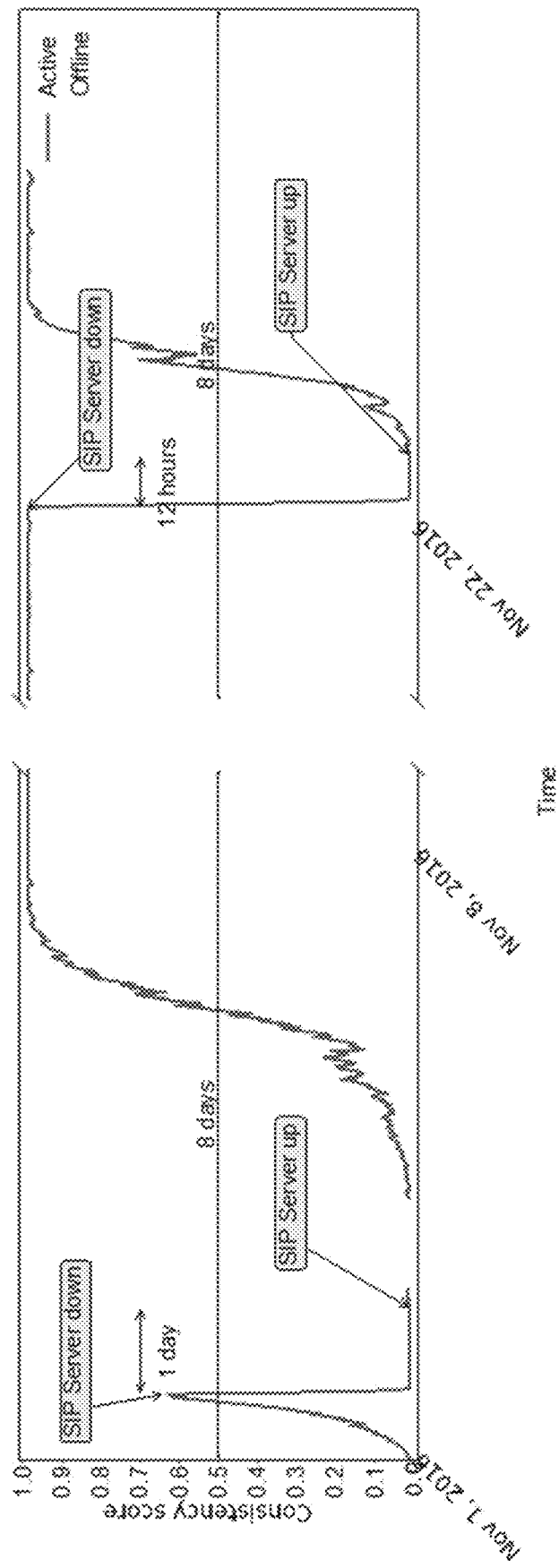
Figure 41:
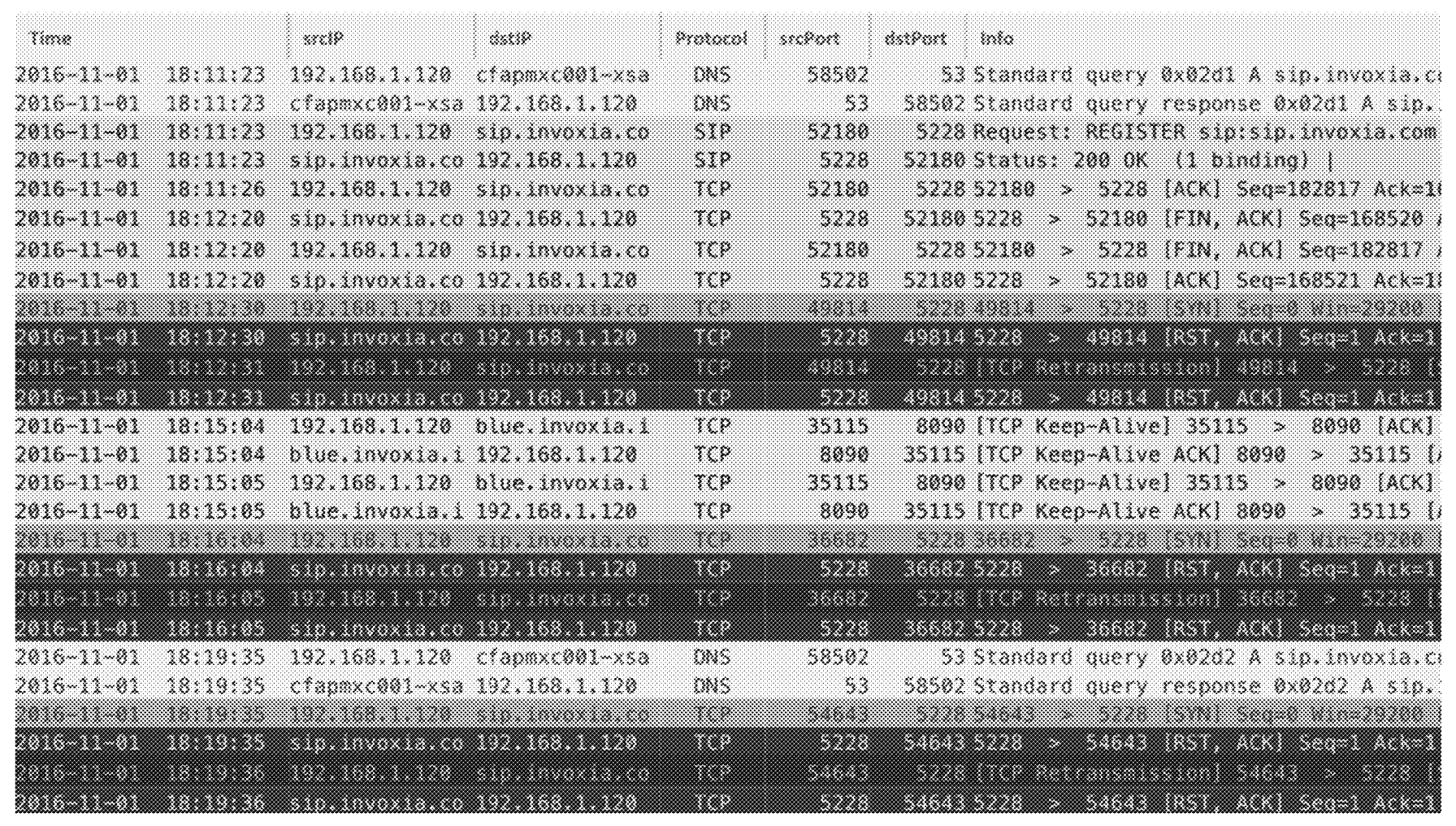

FIG. 39 (a) is a graph of the consistency score generated by the inference engine for traffic instances of the Belkin switch device over a period between Nov. 1, 2016 and Jan. 28, 2017. The score ramps up to 99% within the first 48 hours before the device goes offline for a day, as shown by the dashed line, and then comes back online on November 4. After that, device instances are consistently detected by the intended model, and hence the consistency score remains high with only minor changes over this extended period. FIG. 39 (b) illustrates a scenario where a consistency score drops for a relatively short period of time (due to a temporary change of behavior in traffic of a Triby speaker device), and then rises afterwards. Manual inspection of packet traces corresponding to these temporary drops of the score revealed that a remote SIP server (sip.invoxia.com), with which Triby speaker keeps a continuous TCP connection, was responding with ACK/RST packets during those periods, as highlighted by red rows in the wireshark screenshot of FIG. 41, indicating that the expected SIP service was not operational. Other services for the Triby speaker were functioning normally.

Figure 40A:
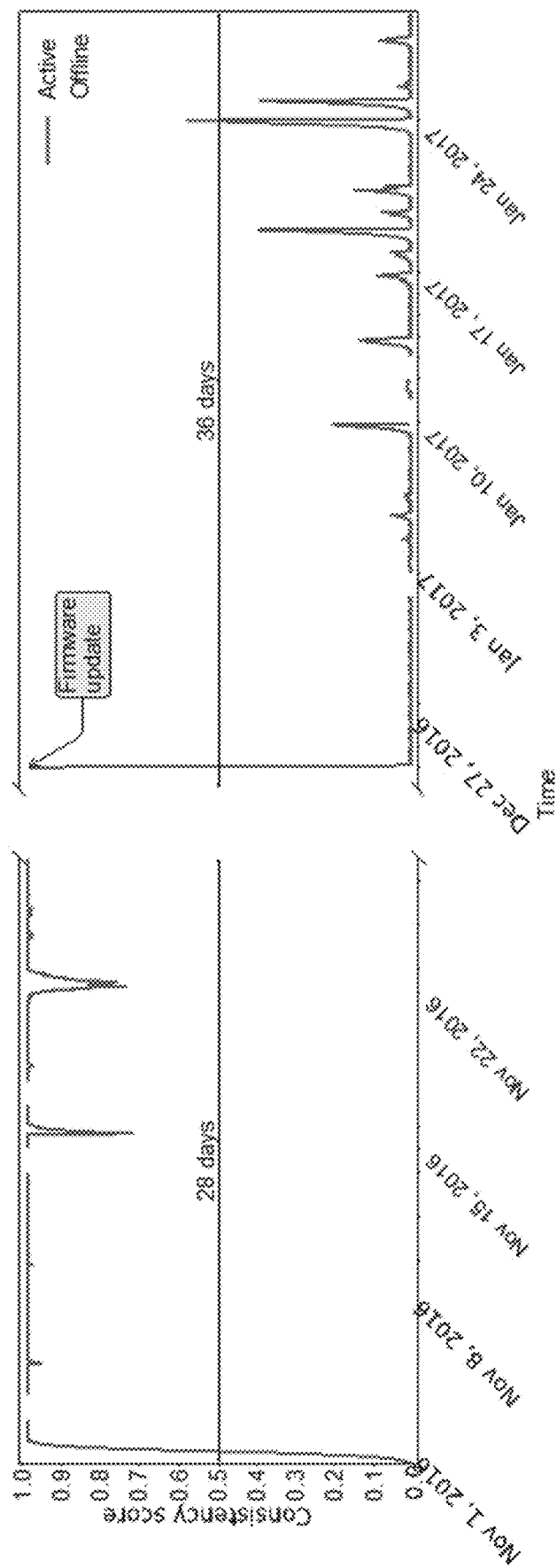
FIGS. 40 (a) and (b) are graphs showing respective time-traces of the consistency score of a Dropcam traffic: (a) showing a rapid drop of the score due to an automatic firmware upgrade, and (b) following the firmware upgrade and model retraining.
Figure 40B:
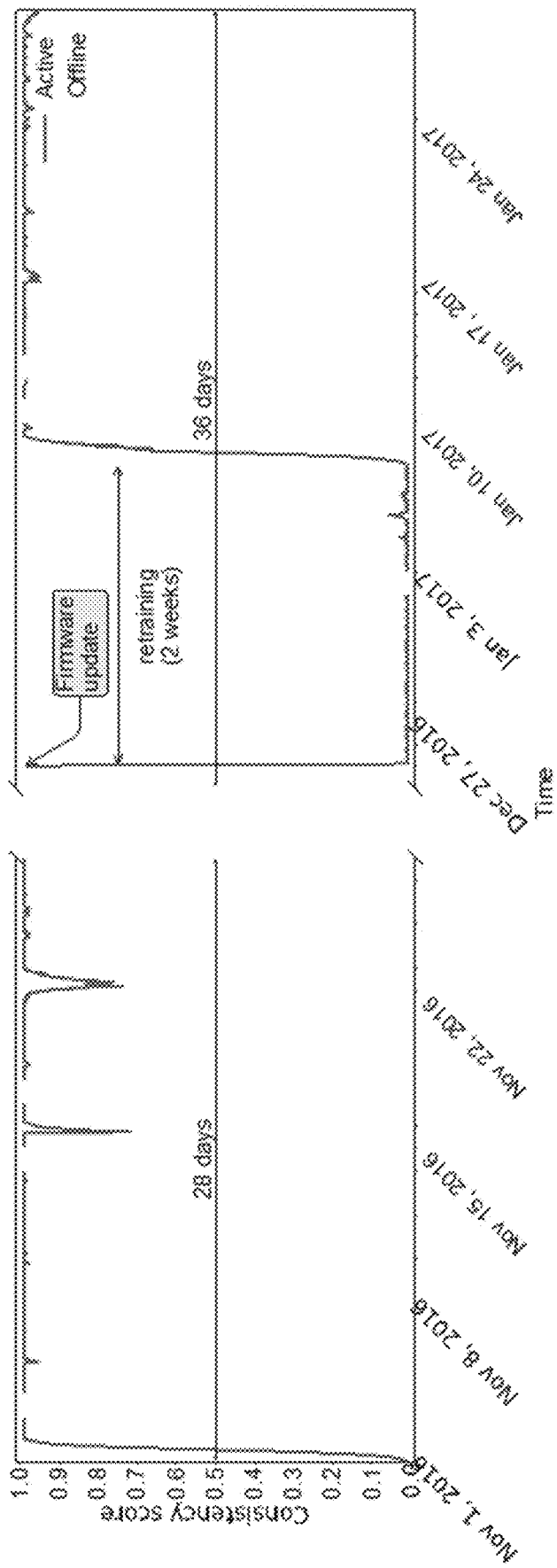

The behavior of a device can also change permanently due to a firmware upgrade. FIG. 40 (a) illustrates this scenario for a Dropcam device. The consistency score of the Dropcam model remains high throughout November 2016 until Dec. 5, 2016, when the device goes off-line, as shown by the dotted line. A couple of slight drops are observed on November 15 and November 22, but are restored fairly-quickly (infrequent mis-classification is not surprising due to minor overlaps between clusters of various models). However, once the Dropcam device comes back online on December 25, the score drops steeply to its lowest possible value of 0.01, and stays at that level during the whole of January. The score sometimes jumps up to 0.20 or even 0.30, but quickly drops back to its minimum value. The corresponding packet traces of the Dropcam device were manually inspected, and its behavior was found to have permanently changed. Dropcam network activity is dominated by a single TLS connection which the device establishes with its cloud server (*nexus*-usl.dropcam.com), typically sending packets of size 156 bytes and receiving packets of size 66 bytes. Manual inspection revealed that the rate of packets for this flow changed in both directions (while packet sizes remained unchanged), resulting in a decrease of upstream bitrate from 1896 bps to 1120 bps and a decrease of downstream bitrate from 584 bps to 424 bps. Firmware upgrades of the Dropcam device are performed automatically when it reboots. Once the firmware upgrade of the device was confirmed, the Dropcam model was retrained using an additional 2-weeks of data (between Dec. 25, 2016 and Jan. 7, 2017) following the firmware upgrade. Adding new instances to the training dataset resulted in an increase in the number of PCA components (from 9 to 11) for the Dropcam device, while the number of clusters remained the same. FIG. 40 (b) shows how the consistency score returns back to its perfect level after augmenting the Dropcam model with attributes of the upgraded firmware—the score is shown by dashed a gray line during the two week re-training period.

Many modifications will be apparent to those skilled in the art without departing from the scope of the present invention.

The invention claimed is:

1. A method for classifying Internet of Things (IoT) devices, the method comprising:
   receiving network flow counter data from at least one network traffic flow for at least one unknown IoT device in a network, wherein the at least one network flow counter data comprises data representing network traffic characteristics, wherein the at least one network flow counter data comprises: (1) Domain Name System (DNS), Network Time Protocol (NTP), or Simple Service Discovery Protocol (SSDP) data, (2) upstream local data, (3) upstream remote data, and (4) downstream remote data;
   constructing at least one waveform based on the network flow counter data and at least one network flow rule;
   computing at least one statistical attribute of the at least one waveform at one or more time intervals;
   applying one or more classifiers to the at least one statistical attribute, wherein the one or more classifiers function to identify the unknown IoT device as a reference IoT device type based on the at least one statistical attribute, wherein the unknown IoT device is classified as the reference IoT device type as corresponding to one of a plurality of reference IoT device types, wherein the reference IoT device types are associate with at least one of: a manufacturer or model number; and
   labeling the unknown IoT device as the reference device type if the one or more classifiers identifies the unknown IoT device as the reference IoT device type.

2. The method of claim 1, further comprising:
   classifying a corresponding operating state of a labeled IoT device based on the at least one statistical attribute of the at least one waveform at one or more time intervals.

3. The method of claim 2, wherein the operating state is based on network traffic behaviours.

4. The method of claim 3, wherein the network traffic behaviours indicate at least one of: a booting operating state, an active operating state, or an idle operating state.

5. The method of claim 1, wherein the at least one network flow rule is generated based on one or more of:
   an upstream and a downstream DNS flow;
   an upstream and a downstream NTP flow;
   at least one downstream SSDP flow;
   an upstream and a downstream remote network flow; or
   an upstream local network flow.

6. The method of claim 1, wherein the at least one network flow rule is stored in a flow table on a programmable network switch.

7. The method of claim 1, wherein the network flow counter data includes at least one of: a packet or a byte count of a network flow rule.

8. The method of claim 1, wherein the one or more time intervals are sampled at one or more of: equal time intervals, time intervals defined by a geometric sum, or a specified time interval.

9. The method of claim 1, wherein computing the at least one statistical attribute comprises reducing the dimensionality of the at least one statistical attribute by at least one of removing redundant statistical attributes or combining statistical attributes.

10. The method of claim 1, wherein the one or more classifiers includes at least one of: a one-class classifier or a multi-class classifier.

11. The method of claim 1, further comprising:
    generating a plurality of consistency scores of the one or more classifiers over time to determine whether a consistency score threshold has been reached.

12. A system for classifying Internet of Things (IoT) devices, the system comprising electronic circuitry configured to:
    receive network flow counter data from at least one network traffic flow for at least one unknown IoT device in a network, wherein the at least one network flow counter data comprises data representing network traffic characteristics, wherein the at least one network flow counter data comprises: (1) Domain Name System (DNS), Network Time Protocol (NTP), or Simple Service Discovery Protocol (SSDP) data, (2) upstream local data, (3) upstream remote data, and (4) downstream remote data;
    construct at least one waveform based on the network flow counter data and at least one network flow rule;
    compute at least one statistical attribute of the at least one waveform at one or more time intervals;
    apply one or more classifiers to the at least one statistical attribute, wherein the one or more classifiers functions to identify the unknown IoT device as a reference IoT device type based on the at least one statistical attribute, wherein the unknown IoT device is classified as the reference IoT device type as corresponding to one of a plurality of reference IoT device types, wherein the reference IoT device types are associate with at least one of: a manufacturer or model number; and
    label the unknown IoT device as the reference device type if the one or more classifiers identifies the unknown IoT device as the reference IoT device type.

13. The system of claim 12, wherein the electronic circuitry is further configured to:
    classify a corresponding operating state of a labeled IoT device based on the at least one statistical attribute of the at least one waveform at one or more time intervals.

14. The system of claim 13, wherein the operating state is based on network traffic behaviours.

15. The system of claim 14, wherein the network traffic behaviours indicate at least one of: a booting operating state, an active operating state, or an idle operating state.

16. The system of claim 12, wherein the at least one flow rule is generated based on one or more of:
    an upstream and a downstream DNS flow;
    an upstream and a downstream NTP flow;
    at least one downstream SSDP flow;
    an upstream and a downstream remote network flow; or
    an upstream local network flow.

17. The system of claim 12, wherein the at least one network flow rule is stored in a flow table on a programmable network switch.

18. The system of claim 12, wherein the network flow counter data includes at least one of: a packet or a byte count of a network flow rule packet or byte counts of network flows of the unknown IoT device at the one or more time intervals.

19. The system of claim 12, wherein the one or more time intervals are sampled at one or more of: equal time intervals, time intervals defined by a geometric sum, or a specified time interval.

20. The system of claim 12, wherein to compute at least one statistical attribute comprises circuitry operable to reduce the dimensionality of the at least one statistical attribute by at least one of removing redundant statistical attributes or combining statistical attributes.

21. The system of claim 12, wherein the one or more classifiers includes at least one of: a one-class classifier or a multi-class classifier.

22. The system of claim 12, wherein the electronic circuitry is further configured to:
   generate a plurality of consistency scores of the one or more classifiers over time to determine whether a consistency score threshold has been reached.

* * * * *

UNITED STATES PATENT AND TRADEMARK OFFICE
CERTIFICATE OF CORRECTION

PATENT NO. : 11,570,070 B2
APPLICATION NO. : 17/309678
DATED : January 31, 2023
INVENTOR(S) : Vijay Sivaraman et al.

It is certified that error appears in the above-identified patent and that said Letters Patent is hereby corrected as shown below:

In the Specification

In Column 6, Line 22 (Approx.), delete "1." and insert --1--.

In Column 11, Line 35, delete "r-500" and insert --~500--.

In Column 11, Line 37, delete "500" and insert --~500--.

In Column 12, Line 23, delete "8100" and insert --~8100--.

In Column 19, Line 26, delete "attributes," and insert --attributes--.

In Column 19, Line 33, delete "~4000" and insert --~1000--.

In Column 23, Line 1, delete "Tuning;" and insert --Tuning,--.

In Column 25, Line 32, delete "detection;" and insert --detection,--.

Signed and Sealed this
Twenty-seventh Day of June, 2023

Katherine Kelly Vidal
*Director of the United States Patent and Trademark Office*